US00RE44404E

(19) United States
(12) Reissued Patent
Golinveaux et al.

(10) Patent Number: US RE44,404 E
(45) Date of Reissued Patent: Aug. 6, 2013

(54) CEILING-ONLY DRY SPRINKLER SYSTEMS AND METHODS FOR ADDRESSING A STORAGE OCCUPANCY FIRE

(75) Inventors: James E. Golinveaux, N. Kingstown, RI (US); David J. Leblanc, Uxbridge, MA (US)

(73) Assignee: Tyco Fire Products LP, Lansdale, PA (US)

(21) Appl. No.: 13/214,039

(22) Filed: Aug. 19, 2011

Related U.S. Patent Documents

Reissue of:
(64) Patent No.: 7,793,736
Issued: Sep. 14, 2010
Appl. No.: 12/090,848
PCT Filed: Oct. 23, 2006
PCT No.: PCT/US2006/060170
§ 371 (c)(1),
(2), (4) Date: Aug. 21, 2008
PCT Pub. No.: WO2007/048144
PCT Pub. Date: Apr. 26, 2007

U.S. Applications:
(60) Provisional application No. 60/728,734, filed on Oct. 21, 2005, provisional application No. 60/744,644, filed on Feb. 21, 2006, provisional application No. 60/818,312, filed on Jul. 5, 2006.

(51) Int. Cl.
*A62C 35/62* (2006.01)
*A62C 3/00* (2006.01)
*A62C 35/58* (2006.01)
*A62C 35/00* (2006.01)

(52) U.S. Cl.
USPC ..... 169/46; 169/17; 169/20

(58) Field of Classification Search
USPC ..... 169/5, 16, 17, 19, 20, 43, 46, 56, 169/58
See application file for complete search history.

(56) References Cited

U.S. PATENT DOCUMENTS 1,958,288 A 5/1934 Tyden
3,743,022 A 7/1973 Livingston
(Continued)

FOREIGN PATENT DOCUMENTS

CA 2626801 4/2007
DE 10062674 A1 6/2002
(Continued)

OTHER PUBLICATIONS

Defendant Victaulic—First Amended Answer to Second Amended Complaint—First Amended Affirmative Defenses, and Counterclaims of the Defendant to the Second Amended Complaint (Served Apr. 26, 2011).

(Continued)

*Primary Examiner* — Darren W Gorman
(74) *Attorney, Agent, or Firm* — Perkins Coie LLP

(57) ABSTRACT

A ceiling-only dry sprinkler system configured to address a storage occupancy fire event with a sprinkler operational area sufficient in size to surround and drown *a* fire. The system and method preferably provide for the surround and *drown* effect by activating one or more initial sprinklers, delaying fluid flow to the initial activated sprinklers for a defined delay period to permit the thermal activation of a subsequent[-] one or more sprinklers so as[.] to form the preferred sprinkler [Operational] *operational* area. The sprinklers of the operational area are preferably[:] configured so as to [provider] *provide* sufficient fluid volume and cooling to address the fire event with a surround and drown configuration[.]. The defined delay period is of a defined period having a maximum and a minimum. The preferred sprinkler system is adapted for fire protection of storage commodities and provides a [ceiling only] *ceiling-only* system that eliminates or otherwise minimizes the economic [disadvantage] *disadvantages* and design penalties *of* current dry sprinkler system [design] *designs*.

88 Claims, 31 Drawing Sheets

U.S. PATENT DOCUMENTS

| | | | | |
|---|---|---|---|---|
| 4,359,097 | A | 11/1982 | Claussen | |
| 5,511,621 | A | 4/1996 | Yao | |
| 5,531,275 | A | 7/1996 | Sundholm | |
| 5,720,351 | A | 2/1998 | Beukema et al. | |
| 5,915,479 | A | 6/1999 | Ponte | |
| 5,971,080 | A * | 10/1999 | Loh et al. | 169/43 |
| 6,396,404 | B1 | 5/2002 | McHugh | |
| 6,567,772 | B1 | 5/2003 | Hoeft | |
| 6,701,288 | B1 | 3/2004 | Normann et al. | |
| 6,868,917 | B2 | 3/2005 | Meyer et al. | |
| 2002/0152818 | A1 | 10/2002 | Alpert et al. | |
| 2003/0079889 | A1 | 5/2003 | Meyer et al. | |
| 2005/0072580 | A1 | 4/2005 | Jackson | |
| 2005/0216242 | A1 | 9/2005 | Flax et al. | |
| 2006/0266961 | A1 | 11/2006 | Frenkel | |
| 2006/0289174 | A1 | 12/2006 | Yu | |
| 2007/0289751 | A1 | 12/2007 | Feenstra et al. | |
| 2008/0319716 | A1 | 12/2008 | Golinveaux et al. | |
| 2009/0288846 | A1 | 11/2009 | Leblanc | |
| 2010/0155087 | A1 | 6/2010 | Golinveaux et al. | |
| 2010/0155089 | A1 | 6/2010 | Golinveaux et al. | |
| 2011/0174508 | A1 | 7/2011 | Golinveaux et al. | |

FOREIGN PATENT DOCUMENTS

| | | | |
|---|---|---|---|
| EP | 0 630 688 | A2 | 12/1994 |
| JP | 2000-197714 | a | 7/2000 |
| MX | 291956 | | 11/2011 |
| RU | 2430762 | | 10/2011 |
| WO | WO2007/041455 | | 4/2007 |
| WO | WO2007/048144 | | 4/2007 |
| WO | WO2008/006029 | | 1/2008 |
| WO | WO 2008/051871 | | 5/2008 |

OTHER PUBLICATIONS

Defendant Victaulic—Defendant's Responses to Plaintiff's First Set of Interrogatories Directed to Defendant, (12 pages), (May 20, 2011).
Ronald Dean et al., "Technical Report—Dry Pipe Sprinkler Protection of Rack Stored Class II Commodity in 40-FT High Buildings", Factory Mutual Research Corporation, 34 pages, Jun. 1995, FMRC J.I.0Z0R6.RR prepared for Americold Corp.; USA.
J. Richard Brown et al., "Fire Tests to Compare Sprinkler Demands of Wet-Pipe and Dry-Pipe Systems", SFPE Technology Report 80-1, pp. 1-9, 1980.
Cheng Yao, "Early Suppression Fast Response Sprinkler Systems", Chemical Engineering Progress, pp. 38-43, Sep. 1988.
Cheng Yao et al., Effect of Drop Size on Sprinkler Performance, presented at the 74th Annual Meeting of the National Fire Protection Assoc., pp. 254-268, May 21, 1970.
Cheng Yao, "Applications of Sprinkler Technology—Early Suppression of High-Challenge Fires with Fast-Response", ASTM Special Technical Publication 882—Fire Safety: Science and Eng., pp. 354-376, 1985.
G. Heskestad et al., "Technical Report—Transient Response of Dry-Pipe Sprinkler Systems Progress Report No. 2", FMRC Serial No. 15918, RC71-T-30, pp. 1-52, Oct. 1971.
G. Heskestad et al., "Technical Report—Relative Water Demands of Wet and Dry-Pipe Sprinkler Systems", FMRC Serial No. 15918, RC73-T-34, pp. 1-85, Nov. 1973.
D.G. Goodfellow et al., "Progress Report—Transient Response of a Simple Dry Pipe Sprinkler System", FMRC Serial No. 15918, RC70-T-9, pp. 1 to Appendix C3, Apr. 1970.
Cheng Yao et al., "Early Suppression-Fast Response: A Revolution in Sprinkler Technology", Fire Journal, Jan. 1984, p. 42-46.
Cheng Yao, "Applications of Sprinkler Technology—Early Suppression of High-Challenge Fires with Fast-Response", A symposium sponsored by ASTM Committee E-5 on Fire Standards and by the Society of Fire Protection Engineers, Jun. 26-27, 1984, pp. 354-376.
Cheng Yao, "The ESFR Sprinkler System: A New Approach to High-Challenge Storage Protection", Fire Journal, Mar. 1985, pp. 30-32 and 70 to 72.
Cheng Yao, "The Development of the ESFR Sprinkler System", Fire Safety Journal, 14, (1988), pp. 65-73.
Cheng Yao, "Overview of Sprinkler Technology Research", Fire Safety Science Proceedings of the Fifth International Symposium, pp. 93-110, 1997.
G. Heskestad et al., "Technical Report—Sprinkler Performance as Related to Size and Design—vol. I—Laboratory Investigation", FMRC Serial No. 22437, RC79-T-1, pp. 1-116, Feb. 1979 (Please note that p. 110 is missing from the reference).
G. Heskestad et al., "Technical Report—Sprinkler Performance as Related to Size and Design—vol. II—Full-Scale Fire Tests", FMRC Serial No. 22437, RC79-T-36, pp. 1-167, Jun. 1979.
FM Global—FM Datasheet 8-9, Sep. 2005, 121 pages.
National Fire Protection Association, NFPA 13—Standard for the Installation of Sprinkler Systems , 2002 edition, USA, 334 pages.
Plaintiff Tyco—Plaintiff's Opening Claim Construction Brief; Oct. 28, 2011; 60 page brief and exhibits 1-22.
Defendant Victaulic—Defendant's Initial Claim Construction Brief; Oct. 28, 2011; 88 page brief and exhibits 1-27.
Plaintiff Tyco—Plaintiff's Opposition Claim Construction Brief; Nov. 22, 2011; 76 page brief and exhibits 23-43.
Defendant Victaulic—Defendant's Responsive Claim Construction Brief; Nov. 22, 2011; 72 page brief and exhibits 28-37.
Eastern District of Pennsylvania Civil Docket from Pacer for Case #: 5:10-cv-04645-ER dated Dec. 21, 2011. 14 pages.
Plaintiffs, Tyco Fire Products LP d/b/a Tyco Fire Suppression & Building Products, Claim Construction Hearing Presentation, Feb. 24, 2012, 122 pages.
Defendant's, The Victaulic Company, Claim Construction Hearing Presentation, Feb. 24, 2012, 113 pages.
United District Court for the Eastern District of Pennsylvania, Memorandum, Mar. 27, 2012, 105 pages.
United District Court for the Eastern District of Pennsylvania, Order, Mar. 27, 2012, 5 pages.
Examination Report issued in related co-pending European Application No. 06 839 509.4, Jan. 18, 2011.
Image File Wrapper (IFW) of European Application No. 06 839 509.4, May 3, 2012 from the EPO Patent Register.
Response to Nov. 18, 2009 Examination Report issued in related co-pending New Zealand Application No. 567607, May 6, 2011.
Examination Report issued in related co-pending New Zealand Application No. 567607, May 27, 2011.
Response to May 27, 2011 Examination Report filed in related co-pending New Zealand Application No. 567607, Jun. 3, 2011.
Intellectual Property of New Zealand—IP Database Extract and application as filed on Oct. 23, 2006 (National Phase of PCT/US2006/060170) for related co-pending New Zealand Application No. 567607, Apr. 30, 2012.
First Office Action issued in related co-pending Mexican Application No. MX/a/2008/005199 and English translation, Jan. 26, 2011.
Second Office Action issued in related co-pending Mexican Application No. MX/a/2008/005199, May 4, 2011.
Examiner's First Report for related co-pending Australian Application No. 2006304953, Jul. 14, 2011.
Notice of Reasons for Rejection for related co-pending Japanese Application No. 2008-536662 and English translation, May 18, 2011.
Argument and amended claims in English as filed in related co-pending Japanese Application No. 2008-536662, Nov. 24, 2011.
First Office Action issued in related co-pending Chinese Application No. 200680048696.9 and English translation, May 31, 2011.
Response and English-language amended claims as filed in related co-pending Chinese Application No. 200680048696.9, Dec. 12, 2011.
Official Action issued in related co-pending Russian Patent Application No. 2008120040/12 and English translation, Oct. 26, 2010.
Examiner's Report issued in related co-pending Canadian Patent Application No. 2,626,801, Mar. 25, 2011.
Response to the Mar. 25, 2011 Examiner's Report as filed in related co-pending Canadian Patent Application No. 2,626,801, Apr. 20, 2011.
Defendant's Supplemental Responses to Plaintiff's Second Set of Interrogatories Directed to Defendant, May 29, 2012, plus prior art invalidity chart for 7,793,736, 25 pages.

Notice of Reasons for Rejection for related co-pending Japanese Application No. 2008-536662 and English translation, Jul. 3, 2012, 8 pages.
Examination Report issued in related co-pending New Zealand Application No. 593232, Jun. 13, 2011, 3 pages.
Response to Jun. 13, 2011 Examination Report filed in related co-pending New Zealand Application No. 593232, Aug. 2, 2012, 28 pages.
Examination Report issued in related co-pending New Zealand Application No. 593232, Aug. 21, 2012, 2 pages.
Examination Report issued in related co-pending European Application No. 06 839 509.4, Sep. 10, 2012, 4 pages.
Communication Pursuant to Article 94(3) issued by EPC in related co-pending European Regional Patent Application No. 06839509.4, Jan. 15, 2010, 5 pages.
Examination Report issued in co-pending New Zealand Patent Application No. 567607, Nov. 19, 2009, 2 pages.
U.S. Appl. No. 12/718,928 (Publication No. 2010-0155089) co-pending related application to U.S. Appl. No. 12/090,848.
U.S. Appl. No. 12/718,941 (Publication No. 2010-0155087) co-pending related application to U.S. Appl. No. 12/090,848.
U.S. Appl. No. 12/126,613 (Publication No. 2008-0319716) co-pending related application to U.S. Appl. No. 12/090,848.
International Search Report and Written Opinion for International Application No. PCT/US06/60170 (Publication No. WO2007/048144); Mar. 19, 2008; 19 pages.
International Search Report, PCT/US2007/072871 (Publication No. WO2008/006029); 3 pages.
Written Opinion of the International Searching Authority, PCT/US2007/072871 (Publication No. WO2008/006029); 5 pages.
Factory Mutual Research Corporation; "Theoretical Prediction of Water Delay Time of Dry Pipe Sprinkler Systems in the Event of Fire"; 90 pages, Oct. 1993; Technical Report FMRC J.I.0T0R8.RA; S. Nam S. and H. C. Kung, H. C.; USA.
FM Global; FM Engineering Bulletin 01-06 Data Sheet of K16.8 (K235) Control Mode Specific Application Sprinkler; Feb. 20, 2006; 2 pages; Factory Mutual Insurance Company; Johnston, RI (Exhibit K of priority document U.S. Appl. No. 60/744,644).
H. Ingason; "Experimental and Theoretical Study of Rack Storage Fires"; Ph.D. dissertation; 1996; 146 pages; Lund University Institute of Technology, Department of Fire Safety Engineering; Sweden.
Swedish National Testing and Research Institute; "Fire Experiments in a Two Dimensional Rack Storage: BRANDFORSK project 701-917"; SP Report 1993:56; 25 pages; H. Ingason; Sweden.
Swedish National Testing and Research Institute; "Modelling of Two Dimensional Rack Storage Fires; BRANDFORSK project 701-917"; SP Report 1993:57; 35 pages; H. Ingason; Sweden.
VTT Technical Research Centre of Finland; "FDS simulation of fire spread—comparison of model results with experimental data"; 2004; 56 pages; VTT Working Papers 4; J. Hietaniemi, et al.; Finland.
NFPA 13—Standard for the Installation of Sprinkler Systems; 2002 edition; 76 pages; Chapter 12; National Fire Protection Association publication; USA.
P.A. Croce, et al.; "An Investigation of the Causative Mechanism of sprinkler Skipping"; Journal of Fire Protection Engineering, May 2005, 30 pages; vol. 15; Society of Fire Protection Engineers; USA.
The National Institute of Standards and Technology; Special Publication 1019: Fire Dynamics Simulator(Version 4) User's Guide; Sep. 2005; 104 pages; Washington, DC (Exhibit D of priority document U.S. Appl. No. 60/744,644).
The National Institute of Standards and Technology; Special Publication 1018: Fire Dynamics Simulator (Version 4) Technical Reference Guide; Sep. 2005; 115 pages, Washington, DC (Exhibit E of priority document U.S. Appl. No. 60/744,644).
Tyco Fire & Building Products; "A Technical Analysis: Variables That Affect the Performance of Dry Pipe Systems"; 2002; 24 pages; James Golinveaux; Lansdale, PA (Exhibit C of priority document U.S. Appl. No. 60/744,644).
Tyco Fire & Building Products; Data Sheet of Model DV-5 Deluge Valve, Diaphragm Style; 1½ thru 8 (DN 40 thru DN200), 250 psi (17.2 bar) Vertical or Horizontal Installation; Mar. 2006; 9 pages; TFP1305; USA (Exhibit I of priority document U.S. Appl. No. 60/744,644).
Tyco Fire & Building Products; Data Sheet of Model EC-25 Extended Coverage Area Density Sprinklers 25.2 K-factor; Sep. 2004; 4 pages; TFP213; USA (Exhibit H of priority document U.S. Appl. No. 60/744,644).
Tyco Fire & Building Products; Data Sheet of Model ESFR-1 Early Suppression Fast Response Pendent Sprinklers 14.0 K-factor; Jul. 2004; 8 pages; TFP318; USA (Exhibit H of priority document U.S. Appl. No. 60/744,644).
Tyco Fire & Building Products; Data Sheet of Model ESFR-17 Early Suppression Fast Response Upright Sprinklers 16.8 K-factor; Apr. 2004; 8 pages; TFP316; USA (Exhibit H of priority document U.S. Appl. No. 60/744,644).
Tyco Fire & Building Products; Data Sheet of Model ESFR-25 Early Suppression Fast Response Pendent Sprinklers 25.2 K-factor; Jan. 2005; 8 pages; TFP312: USA (Exhibit H of priority document U.S. Appl. No. 60/744,644).
Tyco Fire & Building Products; Data Sheet of Model ESFR-27 Early Suppression Fast Response Pendent Sprinklers 16.8 K-factor; Jan. 2005; 8 pages; TFP315; USA (Exhibit H of priority document U.S. Appl. No. 60/744,644).
Tyco Fire & Building Products; Data Sheet of Model K17-231—16.8 K-factor Upright and Pendent Sprinklers Standard Response, Standard Coverage; Jan. 2005; 4 pages; TFP332; USA (Exhibit H of priority document U.S. Appl. No. 60/744,644).
Tyco Fire & Building Products; Data Sheet of QUELL™ Systems Preaction and Dry Pipe Alternatives for Eliminating In-Rack Sprinklers; Draft Jun. 26, 2006; 96 pages; TFP370; USA (Exhibit J of priority document U.S. Appl. No. 60/744,644).
Tyco Fire & Building Products; Data Sheet of Series ELO-231™—11.2 K-factor Upright and Pendent Sprinklers Standard Response, Standard Coverage; Jan. 2005; 6 pages; TFP340; USA (Exhibit H of priority document U.S. Appl. No. 60/744,644).
Tyco Fire & Building Products; Data Sheet of Ultra K17-—16.8 K-factor Upright Specific Application Control Mode Sprinkler Standard Response, 286° F./141° C.; Mar. 2006; 4 pages; TFP331; USA (Exhibit H of priority document U.S. Appl. No. 60/744,644).
Tyco Fire Products R&D; "Dry Pipe Sprinkler Systems—Effect of Geometric Parameters on Expected Number of Sprinkler Operations"; Sep. 21, 2001; 73 pages; David LeBlanc; Tampa, FL (Exhibit B of priority document U.S. Appl. No. 60/744,644).
Factory Mutual Research Corporation; "K-25 Suppression Mode Sprinkler Protection for Areas Subject to Freezing"; 37 pages, Apr. 2000; Technical Report FMRC J.I.0003004619; S. J. de Ris, et al.; USA.
Bittern, Adam; "Analysis of FDS Predicted Sprinker Activation Times with Experiments"; 2004; 248 pages; available at Internet: <URL:http://www.civil.canterbury.ac.nz/fire/pdfreports/
Adam%20Bittern.pdf>; Fire Engineering Research Report 04/8; University of Canterbury; Christchurch, New Zealand.
International Preliminary Report on Patentability for corresponding International Application No. PCT/US06/60170 (Publication No. WO2007/048144); Apr. 7, 2009; 14 pages.
Friedman, Raymond, Factory Mutual Research Corporation, Norwood, MA, An International Survey of Computer Models for Fire and Smoke, Journal of Fire Protection Engineering, 4 (3), 1992, pp. 81-92.
International Preliminary Report on Patentability in International Application No. PCT/US07/72871; (Publication No. WO2008/006029) Jan. 6, 2009; 6 pages.
Factory Mutual Research Corporation; "K-25 Suppression Mode Sprinkler Protection for Areas Subject to Freezing"; 38 pages, Apr. 2000; Technical Report FMRC J.I.0003004619; S. J. de Ris, et al.; USA (previously cited in Information Disclosure Statement of May 8, 2009 at C26).

* cited by examiner

CEILING-ONLY DRY SPRINKLER SYSTEMS AND METHODS FOR ADDRESSING A STORAGE OCCUPANCY FIRE

Matter enclosed in heavy brackets [ ] appears in the original patent but forms no part of this reissue specification; matter printed in italics indicates the additions made by reissue.

PRIORITY DATA AND INCORPORATION BY REFERENCE

This application claims the benefit of priority to the following: (i) U.S. Provisional Patent Application No. 60/728,734, filed Oct. 21, 2005; (ii) U.S. Provisional Patent Application No. 60/818,312, filed on Jul. 5, 2006 (iii) U.S. Provisional Patent Application no. 60/744,644, filed on Feb. 21, 2006, each of which are incorporated by reference in their entirety. Further incorporated herein in their entirety by reference are the following: (i) PCT International Patent Application filed on Oct. 3, 2006 entitled, "System and Method for Evaluation of Fluid Flow in a Piping System," having Docket Number S-FB-0091WO (73434-029WO) which claims priority to (ii) U.S. Provisional Patent Application 60/722,401 filed on Oct. 3, 2005; (iii) U.S. patent application Ser. No. 10/942,817 filed Sep. 17, 2004, published as U.S. patent Publication No. 2005/0216242, and entitled "System and Method For Evaluation of Fluid Flow in a Piping System;" (iv) Tyco Fire & Building Prods., "SPRINKFDT™ SPRINKCALC™: SprinkCAD Studio User Manual" (September 2006); (v) Underwriters laboratories, Inc. (hereinafter "UL"), "Fire Performance Evaluation of Dry-pipe Sprinkler Systems for Protection of Class II, III and Group A Plastic Commodities Using K-16.8 Sprinkler: Technical Report Underwriters laboratories Inc. Project 06NK05814, EX4991 for Tyco Fire & Building Products 06-02-2006," (2006); (vi) Tyco Fire & Building Prods., Technical Data Sheet: TFP370; "Quell™ Systems: Preaction and Dry Alternatives For Eliminating In-Rack Sprinklers" (August 2006 Rev. A); (vii) The National Fire Protection Association (NFPA), NFPA-13 Standard for the Installation of Sprinkler Systems (2002 ed.) (hereinafter "NFPA-13"); and (viii) NFPA, NFPA-13 Standard for the Installation of Sprinkler Systems (2007 ed.). It should be understood that one of ordinary skill can correlate the citations from NFPA-13 to corresponding tables in the 2007 edition of NFPA-13 Standard for the Installation of Sprinkler Systems.

TECHNICAL FIELD

The invention relates generally to dry sprinkler fire protection systems and the method of their design and installation. More specifically, the present invention provides a dry sprinkler system, suitable for the protection of storage occupancies, which uses a surround and drown effect to address a fire event. The present invention is further directed to the method of designing and installing such systems.

BACKGROUND OF THE INVENTION

Dry sprinkler systems are well-known in the art. A dry sprinkler system includes a sprinkler grid having a plurality of sprinkler heads. The sprinkler grid is connected via fluid flow lines containing air or other gas. The fluid flow lines are coupled to a primary water supply valve which can include, for example, an air-to-water ratio valve, deluge valve or preaction valve as is known in the art. The sprinkler heads typically include normally closed temperature-responsive valves. The normally closed valves of the sprinkler heads open when sufficiently heated or triggered by a thermal source such as a fire. The open sprinkler head, alone or in combination with a smoke or fire indicator, causes the primary water supply valve to open, thereby allowing the service water to flow into the fluid flow lines of the dry pipe sprinkler grid (displacing the air therein), and through the open sprinkler head to control the fire, reduce the smoke source, and/or minimize any damage therefrom. Water flows through the system and out the open sprinkler head (and any other sprinkler heads that subsequently open), until the sprinkler head closes itself, if automatically resetting, or until the water supply is turned off.

In contrast, a wet pipe sprinkler system has fluid flow lines that are pre-filled with water. The water is retained in the sprinkler grid by the valves in the sprinkler heads. As soon as a sprinkler head opens, the water in the sprinkler grid immediately flows out of the sprinkler head. In addition, the primary water valve in the wet sprinkler system is the main shut-off valve, which is in the normally open state.

There are three types of dry sprinkler systems that contain air or gas as opposed to water or other fluid. These dry systems include: dry pipe, preaction, and deluge systems. A dry pipe system includes fluid flow pipes which are charged with air under pressure and when the dry pipe system detects heat from a fire, the sprinkler heads open resulting in a decrease in air pressure. The resultant decrease in air pressure activates the water supply source and allows water to enter the piping system and exit through the sprinkler heads.

In a deluge system, the fluid flow pipes remain free of water, employs sprinkler heads that remain open, and utilizes pneumatic or electrical detectors to detect an indication of fire such as, for example, smoke or heat. The network of pipes in a deluge system usually do not contain supervisory air, but will instead contain air at atmospheric pressure. Once the pneumatic or electrical detectors detect heat, the water supply source provides water to the pipes and sprinkler heads. A preaction system has pipes that are free of water, employs sprinkler heads that remain closed, has supervisory air, and utilizes pneumatic or electrical detectors to detect an indication of fire such as, for example, heat or smoke. Only when the system detects a fire is water introduced into the otherwise dry network of pipes, and sprinkler heads.

When a dry pipe sprinkler system goes "wet" (i.e., to cause the primary water supply valve to open and allow the water to fill the fluid flow supply lines), a sprinkler head opens, the pressure difference between the air pressure in the fluid flow lines and the water supply pressure on the wet side of the primary water supply valve or dry pipe air-to-water ratio valve reaches a specific hydraulic/pneumatic imbalance to open up the valve and release the water supply into the network of pipes. It may take up to 120 seconds to reach this state, depending upon the volume of the entire sprinkler system, water supply and air pressure. The larger the water supply, the larger the air supply is needed to hold the air-to-water ratio valve closed. Moreover, if the system is large and/or if the system is charged to a typical pressure such as 40 psig, a considerable volume of air must escape or be expelled from the open sprinkler head before the specific hydraulic imbalance is reached to open the primary water valve. The water supply travels through the piping grid displacing the pressurized gas finally discharge through the open sprinkler.

The travel time of both the escaping gas and the fluid supply through the network provides for a fluid delivery delay in dry sprinkler systems that is not present in wet sprinkler systems. Currently, there exists an industry-wide belief that in dry sprinkler systems it is best to minimize or if possible, avoid fluid delivery delay. This belief has led to an industry-side perception that dry sprinkler systems are inferior to wet systems. Current industry accepted design standards attempt to address or minimize the impact of the fluid delivery delay by placing a limit on the amount of delay that can be in the system. For example, NFPA-13, at Sections 7 and 11 that the water must be delivered from the primary water control valve to discharge out of the sprinkler head at operating pressure in under sixty seconds and more specifically under forty seconds. To promote the rapid delivery of water in dry sprinkler systems, Section 7 of the NFPA-13 further provides that, for dry sprinkler, systems having system volumes between 500 and 750 gallons, the discharge time-limit can be avoided provided the system includes quick-opening devices such as accelerators.

The NFPA standards provide other various design criteria, for both wet and dry sprinkler systems used in storage occupancies. Included in NFPA-13 are density-area curves and density-area points that define the requisite discharge flow rate of the system over a given design area. A density-area curve or point can be specified or limited in system design for protection of a given type of commodity classified by class or by groups as set forth in NFPA-13—Sections 5.6.3 and 5.6.4. For example, NFPA-13 provides criteria for the following commodity classes: Class I; Class II; Class III and Class IV. In addition, NFPA-13 provides criteria for the following groups to define the groups of plastics, elastomers or rubbers as Group A; Group B; and Group C.

NFPA-13 provides for additional provisions in the design of dry protection systems used for protecting stored commodities. For example, NFPA requires that the design area for a dry sprinkler system be increase in size as compared to a wet systems for protection of the same area or space. Specifically, NFPA-13—Section 12.1.6.1 provides that the area of sprinkler operation, the design area, for a dry system shall be increased by 30 percent (without revising the density) as compared to an equivalent wet system. This increase in sprinkler operational area establishes a "penalty" for designing a dry system; again reflecting an industry belief that dry sprinkler systems are inferior to wet.

For protection of some storage commodities, NFPA-13 provides design criteria for ceiling-only sprinkler systems, in which the design "penalty" is greater than thirty percent. For example, certain forms of rack storage require a dry ceiling sprinkler system to be supplemented or supported by in-rack sprinklers as are known in the art. A problem with the in-rack sprinklers are that they may be difficult to maintain and are subject to damage from forklifts or the movement of storage pallets. NFPA-13 does provide in NFPA-13—Section 12.3.3.1.5; FIG. 12.3.3.1.5(e). Note 4, standards for protection of Group A plastics using a dry ceiling-only system having appropriately listed K-16.8 sprinklers for ceilings not exceeding 30 ft. in height. The design criteria for ceiling only storage wet sprinkler system is 0.8 gpm/ft$^2$ per 2000 ft$^2$. However, NFPA adds an additional penalty for dry system ceiling-only sprinkler systems by increasing the design criteria to 0.8 gpm/ft$^2$ per 4500 ft$^2$. This increased area requirement is a 125% density penalty over the wet system design criteria. As noted, the design penalties of NFPA-13 are believed to be provided to compensate for the inherent fluid delivery delay in a dry sprinkler system following thermal sprinkler activation. Moreover, NFPA 13 provides limited ceiling-only protection in limited rack storage configurations, and otherwise require in-rack sprinklers.

In complying with the thirty percent design area increase and other "penalties", fire protection system engineers and designers are forced to anticipate the activation of more sprinklers and thus perhaps provide for larger piping to carry more water, larger pumps to properly pressurize the system, and larger tanks to make-up for water demand not satisfied by the municipal water supply. Despite the apparent economic design advantage of wet systems over dry systems, certain storage configurations prohibit the use of wet systems or make them otherwise impractical. Dry sprinkler systems are typically employed for the purpose of providing automatic sprinkler protection in unheated occupancies and structures that may be exposed to freezing temperatures. For example, in warehouses using high rack storage, i.e. 25 ft. high storage beneath a 30 ft. high ceiling, such warehouses may be unheated and therefore susceptible to freezing conditions making wet sprinkler systems undesirable. Freezer storage presents another environment that cannot utilize wet systems because water in the piping of the protection system located in the freezer system would freeze. One solution to the problem that has been developed is to use sprinklers in combination with antifreeze. However, the use of antifreeze can raise other issues such as, for example, corrosion and leakage in the piping system. In addition, the high viscosity of antifreeze may require increased piping size. Moreover, propylene glycol (PG) antifreeze has been shown not to have the fire-fighting characteristics of water and in some instances has been known to momentarily accelerate fire growth.

Generally, dry sprinkler system for storage occupancies are configured for fire control in which a fire is limited in size by the distribution of water from one or more thermally actuated sprinkler located above the fire to decrease the heat release rate and pre-wet adjacent combustibles, while controlling ceiling gas temperatures to avoid structural damage. However, with this mode of addressing a fire, hot gases may be entrained or maintained in the ceiling area above the fire and allowed to migrate radially. This may result in additional sprinklers being activated remotely from the fire and thus not impact the fire directly. In addition, the discharge of fluid from a given sprinkler cap result in the impingement of water droplets and/or the build up of condensation of water vapor on adjacent and unactuated sprinklers. The resultant effect of unactuated sprinklers inter-dispersed between actuated sprinklers is known as sprinkler skipping. One definition of sprinkler skipping is the "significantly irregular sprinkler operating sequence when compared to the expected sequence dictated by the ceiling flow behavior, assuming no sprinkler system malfunctions." See Paul A. Croce et al., An Investigation of the Causative Mechanism of Sprinkler Skipping, 15, J. Fire Prot. Engr. 107, 107 (May 2005). Due to the actuation of additional remote sprinklers, current design criteria may require enlarged piping, and thus, the volume of water discharge into the storage area may be larger than is adequately necessary to address the fire. Moreover, because fire control merely reduces heat release rate, a huge number of sprinkles may be activated in response to the fire in order to maintain the heat release rate reduction.

Despite the availability of immediate fluid delivery from each sprinkler in a wet sprinkler system, wet sprinkler systems can also experience sprinkler skipping. However, wet sprinkler systems can be configured for fire suppression which sharply reduces the heat release rate of a fire and prevents its regrowth by means of direct and sufficient application of water through the fire plume the burning fuel surface. For example, a wet system can be configured to use early suppression fast-response (ESFR) Sprinklers. The use of ESFR sprinklers is generally not available in dry sprinklers systems, to do so would require a specific listing for the sprinkler as is required under Section 8.4.6.1 of NFPA-13.

Thus, to configure a dry sprinkler system for fire suppression may require overcoming the additional penalty of a specific listing for an ESFR sprinkler. Moreover, to hydraulically configure a dry system for suppression may require adequately sized piping and pumps whose costs may prove economically prohibitive as these design constraints may require hydraulically sizing the system beyond the demands already imposed by the design "penalties."

The fire tests were conducted to determine the ability of a tree-type dry pipe or double-interlock preaction system employing ceiling-only Large Drop sprinklers to provide adequate fire protection for rack storage of Class II commodity at a storage height of thirty-four feet (34 ft.) beneath a ceiling having a ceiling height of forty feet. One fire test showed that the system, employing a thirty second (30 sec.) or less water delay time, could provide adequate fire control with a discharge water pressure of 55 psi. However, in addition to the high operating pressure of 55 psi., such a system required a total of twenty-five (25) sprinkler operations actuated over a seventeen minute period. The second fire test employed a sixty-second (60 sec.) water delay time, however such a delay time proved to be too long as the fire developed to such a severity that adequate fire control could not be achieved. In the second fire test, seventy-one (71) sprinklers operated resulting in a maximum discharge pressure of 37 psi., and thus, the target pressure of 75 psi. could not be attained. The tests and their results are described in Factory Mutual Research Technical Report: FMRC J.I. 0Z0R6.RR NS entitled, "Dry Pipe Sprinkler Protection of Rack Stored Class II Commodity In 40-Ft. High Buildings," prepared for Americold Corp. and published June 1995.

In an attempt to understand and predict fire behavior, The National Institute of Standards and Technology (NIST) has developed a software program entitled Fire-Dynamics Simulator (FDS), currently available from the NIST website, Internet:<URL:http://fire.nist.gov/fds/, that models the solution of fire driven flows, i.e., fire growth, including but not limited to flow velocity, temperature, smoke-density and heat release rate. These variables are further used in the FDS to model sprinkler system response to a fire.

FDS can be used to model sprinkler activation or operation of a dry sprinkler system in the presence of a growing fire for a stored commodity. One particular study has been conducted using FDS to predict fire growth size and the sprinkler activation patterns for two standard commodities and a range of storage heights, ceiling heights and sprinkler installation locations. The findings and conclusions of the study are discussed in a report by David LeBlanc of Tyco Fire Products R&D entitled, Dry Pipe Sprinkler systems—Effect of Geometric Parameters on Expected Number of sprinkler Operation (2002) (hereinafter "FDS Study") which is incorporated in its entirety by reference.

The FDS Study evaluated predictive models for dry sprinkler systems protecting storage arrays of Group A and Class II commodities. The FDS Study generated a model that simulated fire growth and sprinkler activation response. The study further verified the validity of the prediction by comparing the simulated results with actual experimental tests. As described in the FDS study, the FDS simulations can generate predictive heat release profiles for a given stored commodity, storage configuration and commodity height showing in particular the change in heat release over time and other parameters such as temperature and velocity within the computational domain for an area such as, for example, an area near the ceiling. In addition, the FDS simulations can provide sprinkler activation profiles for the simulated sprinkler network modeled above the commodity showing in particular the predicted location and time of sprinkler activation.

DISCLOSURE OF INVENTION

An innovative sprinkler system is provided to address fires in a manner which is heretofore unknown. More specifically, the preferred sprinkler system is a non-wet, preferably dry pipe and more preferably dry preaction sprinkler system configured to address a fire event with a sprinkler operational area sufficient in size to surround and drown the fire. The preferred operational area is preferably generated by activating one or more initial sprinklers, delaying fluid flow to the initial activated sprinkler for a defined delay period to permit the thermal activation of a subsequent one or more sprinklers so as to form the preferred sprinkler, operational area. The sprinklers of the operational area are preferably configured so as to provide the sufficient fluid volume and cooling to address the fire-event in a surround and drown fashion. More preferably, the sprinklers are configured so as to have a K-factor of about eleven (11) or greater and even more preferably a K-factor of about seventeen (17). The defined delay period is of a defined period having a maximum and a minimum. By surrounding and drowning the fire event, the fire is effectively overwhelmed and subdued such that the heat release from the fire event is rapidly reduced. The sprinkler system is preferably adapted for fire protection of storage commodities and provides a ceiling only system that eliminates or otherwise minimizes the economic disadvantages and design penalties of current dry sprinkler system design. The preferred sprinkler system does so by minimizing the overall hydraulic demand of the system.

More specifically, the hydraulic design area for the preferred ceiling-only sprinkler system can be configured smaller than hydraulic design areas for dry sprinkler systems as specified under NFPA-13, thus eliminating at least one dry sprinkler design "penalty." More preferably, the sprinkler systems can be designed and configured with a hydraulic design areas at least equal to the sprinkler operational design areas for wet piping systems currently specified under NFPA-13. The hydraulic design area preferably defines an area for system performance through which the sprinkler system preferably provides a desired or predetermined flow characteristic.

For example, the design area can define the area through which a preferred dry pipe sprinkler system, must provide a specified water or fluid discharge density. Accordingly, the preferred design area defines design criteria for dry pipe sprinkler systems around winch a design methodology is provided. Because the design area can provide for a system design parameter at least equivalent to that of a wet system, the design area can avoid the over sizing of system components that is believed to occur in the design and construction of current dry pipe sprinkler systems. A preferred sprinkler system that utilizes a reduced hydraulic design area can incorporate smaller pipes or pumping components as compared to current dry sprinkler systems protecting a similarly configured storage occupancy, thereby potentially realizing economic savings. Moreover, the preferred design methodology incorporating a preferred hydraulic design area and a system constructed in accordance with the preferred methodology, can demonstrate that dry pipe fire protection systems can be designed and installed without incorporation of the design penalties, previously perceived as a necessity, under NFPA-13. Accordingly, applicant asserts that the need for penalties in designing dry pipe system has been eliminated or otherwise greatly minimized.

To minimize the hydraulic demand of the sprinkler system, a minimized sprinkler operational area effective to overwhelm and subdue is employed to respond to a fire growth in the storage area. To minimize the number of sprinkler activations in response to the fire growth, the sprinkler system employs mandatory fluid delivery delay period which delays fluid or water discharge from one or more initial thermally activated sprinklers to allow for the fire to grow and thermally activate the minimum number of sprinklers to form the preferred sprinkler operational area effective to surround and drown the fire with a fluid discharge that overwhelms and subdues. Because the number of activated, sprinklers is preferably minimized in response to the fire, the discharge water volume may also be minimized, so as to avoid unnecessary water discharge into the storage area. The preferred sprinkler, operational area can further overwhelm and subdue a fire growth by minimizing the amount of sprinkler skipping and thereby concentrate the actuated sprinklers to an area immediate or to the locus of the fire plume. More preferably, the amount of sprinkler skipping in the dry sprinkler system, may be comparatively less than the amount of sprinkler skipping in the wet system.

A preferred embodiment of a ceiling-only dry system for protection of a storage occupancy and commodity includes piping network having a wet portion a dry portion connected to the wet portion. The dry portion is preferably configured to respond to a fire with at least a first activated sprinkler to initiate delivery of fluid from the wet portion to the at least one thermally activated sprinkler. The system further includes a mandatory fluid delivery delay period configured to delay discharge from the at least first activated sprinkler such that the fire grows to thermally activate at least a second sprinkler in the dry portion. Fluid discharge from the first and at least second sprinkler defines a sprinkler operational area sufficient to surround and drown a fire event. In another preferred, embodiment the first activated, sprinkler preferably includes more than one initially activated sprinkler to initiate the fluid delivery.

In another preferred embodiment of the ceiling only dry sprinkler system, the system includes a primary water control valve and the dry portion includes at least one hydraulically remote sprinkler and at least one hydraulically close sprinkler relative to the primary water control valve. The system is further preferably configured such that fluid delivery to the hydraulically remote sprinkler defines the maximum fluid deliver delay period for the system and fluid delivery to the hydraulically close sprinkler defines the minimum fluid delivery delay period for the system. The maximum fluid delivery delay period is preferably configured so as to permit the thermal activation of a first plurality of sprinklers so/as to form a maximum sprinkler operational area to address a fire event with a surround and drown effect. The minimum fluid delivery delay period is preferably configured so as to permit the thermal activation of a second plurality of sprinklers so as to form a minimum sprinkler operational area sufficient to address a fire event with a surround and drown effect.

In one aspect of the ceiling-only dry sprinkler system, the system is configured such that all the activated sprinklers in response to a fire growth are activated within a predetermined time period. More specifically, the sprinkler system is configured such that the last activated sprinkler occurs within ten minutes following the first thermal sprinkler activation in the system. More preferably, the last sprinkler is activated within eight minutes and more preferably, the last sprinkler is activated within five minutes of the first sprinkler activation in the system.

Another embodiment of a ceiling-only dry sprinkler system provides protection of a storage occupancy having a ceiling height and configured to store a commodity of a given classification and storage height. The dry sprinkler system includes a piping network having a wet portion configured to deliver a supply of fluid and a dry portion having a network of sprinklers each having an operating pressure. The piping network further includes a dry portion connected to the wet portion so as to define at least one hydraulically remote sprinkler. The system further includes a preferred hydraulic design area defined by a plurality of sprinklers in the dry portion including the at least one hydraulically remote sprinkler to support responding to a fire event with a surround and drown effect. The system further includes a mandatory fluid delivery delay period defined by a lapse of time following activation of a first sprinkler in the preferred hydraulic design area to the discharge of fluid at operating pressure from substantially all sprinklers in the preferred hydraulic design area. Preferably, the hydraulic design area for a system employing a surround and drown effect is smaller than a hydraulic design area as currently required by NFPA-13 for the given commodity class and storage height.

A preferred method of designing a sprinkler system that employs a surround and drown effect to overwhelm and subdue a fire is provided. The method includes determining a mandatory fluid delivery delay period for the system following thermal activation of a sprinkler. More preferably, the method includes determining a maximum fluid deliver delay period for fluid delivery to the most hydraulically remote sprinkler and further includes determining the minimum fluid delivery delay period to the most hydraulically close sprinkler. The method of determining the maximum and minimum fluid delivery delay period further preferably includes modeling a fire scenario for a ceiling-only dry sprinkler system in a storage space including a network of sprinklers and a stored commodity below the network. The method further includes a determining the sprinkler activation for each sprinkler in response to the scenario and preferably graphing the activation times to generate a predictive sprinkler activation profile.

The method also includes determining preferred maximum and minimum sprinkler operational areas for the systems capable of addressing a fire event with surround and drown effect. The preferred maximum sprinkler operational area is preferably equivalent to a minimized hydraulic design area for the system which is defined by a number of sprinklers. More preferably, the hydraulic design area is equal to or smaller than the hydraulic design area specified by NFPA-13 for the same commodity being protected. The preferred minimum sprinkler operational area is preferably defined by a critical number of sprinklers. The critical number of sprinklers is preferably two to four sprinklers depending upon the ceiling height and the class of commodity or hazard being protected.

The method further provides identifying minimum and maximum fluid delivery delay periods from the predictive sprinkler activation profile. Preferably, the minimum fluid delivery delay period is defined by time lapse between the first sprinkler activation to the activation time of the last in the critical number of sprinklers. The maximum fluid delivery delay period is preferably defined by the time lapse between the sprinkler activation and the time at which the number of activated sprinklers is equal to at least eighty percent of the defined preferred maximum sprinkler operational area. The minimum and maximum fluid delivery delay periods define a range of available fluid delivery delay periods which can be implemented in the designed ceiling-only dry sprinkler system to bring about a surround and drown effect.

To design the preferred ceiling-only dry sprinkler system, the method further provides iteratively designing a sprinkler system having a wet portion and a dry portion having network of sprinklers with a hydraulically remote sprinkler and a hydraulically close sprinkler relative to the wet portion. The method preferably includes iteratively designing the system such that the hydraulically remote sprinkler experiences the maximum fluid delivery delay period and the hydraulically close sprinkler experiences the minimum fluid delivery delay period. Iteratively designing the system further preferably includes verifying that each sprinkler disposed between the hydraulically remote sprinkler and hydraulically close sprinkler experience a fluid delivery delay period that is between the minimum and maximum fluid delivery delay period for the system.

The preferred methodology of can provide criteria for designing a preferred ceiling-only dry sprinkler system to address a fire event with a surround and drown effect. More specifically, the methodology can provide for a mandatory fluid delivery delay period and hydraulic design area to support the surround and drown effect and which can be further incorporated into a dry sprinkler system design so to define a hydraulic performance criteria where no such criteria is currently known. In another preferred embodiment of a method for designing the preferred sprinkler system can provide applying the fluid delivery delay period to a plurality of initially thermally actuated sprinklers that are thermally actuated in a defined sequence. More preferably, the mandatory fluid delivery delay period is applied to the four most hydraulically remote sprinklers in the system.

In one preferred embodiment, a fire protection system for a storage occupancy is provided. The system preferably includes a wet portion and a thermally rated dry portion in fluid communication with the wet portion. Preferably the dry portion is configured to delay discharge of fluid from the wet portion into the storage occupancy for a defined time delay following thermal activation of the dry portion. In another embodiment, the system preferably includes a plurality of thermally rated sprinklers coupled to a fluid source. The plurality of sprinklers can be located in the storage occupancy such that each of the plurality of sprinklers are positioned within the system so that fluid discharge into the storage occupancy is delayed for a defined period thermal activation. In yet another embodiment of a preferred system, the system preferably has a maximum delay and a minimum delay for delivery of fluid into the storage occupancy. The preferred system includes a plurality of thermally rated sprinklers coupled to a fluid source, the plurality of sprinklers are positioned such that each of the plurality of sprinklers delay discharging fluid into the storage occupancy following thermal activation. The delay is preferably in the range between the maximum and minimum delay for the system.

In another preferred embodiment, a ceiling-only dry sprinkler system for fire protection of a storage occupancy includes a grid of sprinklers having a group of hydraulically remote sprinklers relative to a source of fluid. The group of hydraulically remote sprinklers are preferably configured to thermally actuate in a sequence in response to a fire event, and more preferably discharge fluid in a sequence following a mandatory fluid delay for each sprinkler. The fluid delivery delay period is preferably configured to promote thermal activation of sufficient number of sprinklers adjacent the group of hydraulically remote sprinklers to effectively surround and drown the fire.

Another embodiment of fire protection system for a storage occupancy provides a plurality of thermally rated sprinklers coupled to a fluid source. The plurality of sprinklers are each preferably positioned to delay discharge of fluid into the storage occupancy for a defined period following an initial thermal activation in response to a fire event. The defined period is of a sufficient length to permit a sufficient number of subsequent thermal activations to form a discharge area to surround and drown and thereby overwhelm and subdue the fire event.

In another aspect of the preferred embodiment, another fire protection system for a storage occupancy is provided. The preferred system includes a plurality of thermally rated sprinklers coupled to a fluid source. The plurality of sprinklers are preferably interconnected by a network of pipes. The network of pipes are arranged to delay discharge of fluid from any thermally actuated sprinkler for a defined period following thermal activation of at least one sprinkler. In another embodiment, a fire protection system is provided for a storage occupancy. The system preferably includes a fluid source and a riser assembly in communication with the fluid source. Preferably included is a plurality of sprinklers disposed in the storage occupancy and coupled to the riser assembly for controlled communication with the fluid source. The riser assembly is preferably configured to delay discharge of fluid from the sprinklers into the storage occupancy for a defined period following thermal activation of at least one sprinkler.

Another embodiment provides a fire protection system for a storage occupancy which preferably includes a fluid source, a control panel, and a plurality of sprinklers positioned in the storage occupancy and in controlled communication with fire fluid source. Preferably, the control panel is configured to delay discharge of fluid from the sprinklers into the storage occupancy for a defined period following thermal activation of at least one sprinkler.

In yet another preferred embodiment, a fire protection system that preferably includes a fluid source and a control valve in communication with the fluid source. A plurality of sprinklers is preferably disposed in the storage occupancy and coupled to the control valve for controlled communication with the fluid source. The control valve is preferably configured to delay discharge of fluid from the sprinklers into the storage occupancy for a defined period following thermal activation of at least one sprinkler.

The present invention provides dry ceiling-only sprinkler protection for rack storage where only wet systems or dry systems with in-rack sprinklers were permissible. In yet another aspect of the preferred embodiment of a dry fire protection system, a dry ceiling-only fire protection system is provided having a mandatory fluid delivery delay disposed above rack storage having a storage height. Preferably, the rack storage includes encapsulated storage having a storage height twenty feet or greater. Alternatively, the rack storage includes non-encapsulated storage of at least one of Class I, II, or III commodity or Group A, Group B or Group C plastics having a storage height greater than twenty-five feet. Alternatively, the rack storage includes Class IV commodity having a storage height greater than twenty-two feet. In yet another aspect, the dry fire protection system is preferably provided so as to include a dry ceiling-only fire protection system disposed above at least one of single-row, double-row and multiple-row rack storage.

In yet another embodiment, a dry fire protection system is provided; the system preferably includes a dry ceiling-only fire protection system for storage occupancy having a ceiling height ranging from about twenty-five to about forty-five feet including a plurality of sprinklers disposed above at least one of single-row, double-row and multiple-row rack storage having a storage height ranging from greater than twenty feet to about forty feet and is preferably at least one of Class I, II, III and IV commodity. The plurality of sprinklers are preferably positioned so as to effect a mandatory fluid delivery delay. In an alternative embodiment, a dry/preaction fire protection system is provided. The system preferably includes a dry ceiling-only fire protection system comprising a plurality of sprinklers disposed above at least one of single-row, double-row and multiple-row rack storage having a storage height of about twenty feet or greater and is made of a plastic commodity. In another aspect of the preferred system, a dry ceiling-only fire protection system is provided comprising a plurality of sprinklers disposed above at least one of single-row, double-row and multiple-row rack storage having a storage height of greater than twenty-five feet and a ceiling-to-storage clearance height of about five feet. The storage is preferably at least one of Class III, Class IV and Group A plastic commodity.

A ceiling-only dry sprinkler protection system includes a fluid source and a plurality of sprinklers in communication with the fluid source. Each sprinkler preferably is configured to thermally activate within a time ranging between a maximum fluid delivery delay period and a minimum fluid delivery delay period to deliver a flow of fluid following a minimum designed delay for the sprinkler.

In another aspect, a ceiling-only dry sprinkler system for a storage occupancy is provided defining a ceiling height in which the storage occupancy houses a commodity having a commodity configuration and a storage configuration at a defined storage height. The storage configuration can be a storage array arrangement of any one of rack, palletized, bin box, and shelf storage. Wherein the storage array arrangement is rack storage, the arrangement can be further configured as any one of single-row, double-row and multi-row storage. The system preferably includes a riser assembly disposed between the first network nod the second network, the riser having a control valve having an outlet and an inlet.

A first network of pipes preferably contains a gas and in communication with the outlet of the control valve. The gas is preferably provided by a pressurized air or nitrogen source. The first network of pipes further includes a first plurality of sprinklers including at least one hydraulically remote sprinkler relative to the outlet of the control valve and at least one hydraulic close sprinkler relative to the outlet of the control valve. The first network of pipes can be configured in a loop conjuration and is more preferably configured in a tree configuration. Each of the plurality of sprinklers is preferably thermally rated to thermally trigger the sprinkler from an inactivated state to an activated state. The first plurality of sprinklers further preferably define a designed area of sprinkler operation having a defined sprinkler-to-sprinkler spacing and a defined operating pressure. The system also includes a second network of pipes having a wet main in communication with the inlet of the control valve to provide controlled fluid delivery to the first network of pipes.

The system further includes a first mandatory fluid delivery delay which is preferably defined as a time for fluid to travel from the outlet of the control valve to the at least hydraulically remote sprinkler wherein if the fire event initially thermally activates the at least one hydraulically remote sprinkler, the first mandatory fluid delivery delay is of such a length that a second plurality of sprinklers proximate the at least one hydraulically remote sprinkler are thermally activated by the fire event so as to define a maximum sprinkler operational area to surround and drown the fire event. The system also provides for a second mandatory fluid delivery delay to define a time for fluid to travel from the outlet of the control valve to the at least one hydraulically close sprinkler wherein if the fire event initially thermally activates the at least one hydraulically close sprinkler, the second mandatory fluid delivery delay is of such a length that a third plurality of sprinklers proximate the at least one hydraulically close sprinkler are thermally activated by the fire event so as to define a minimum sprinkler operational area to surround and drown the fire event.

The system is further preferably configured such that the plurality of sprinklers further defines a hydraulic design area and a design density wherein the design area includes the at least one hydraulically remote sprinkler. In one preferred embodiment, the hydraulic design area is preferably defined by a grid of about twenty-five sprinklers on a sprinkler-to-sprinkler spacing ranging from about eight feet to about twelve feet. Accordingly, a preferred embodiment of the present invention provides novel hydraulic design area criteria for ceiling-only dry-sprinkler fire protection where none bad previously existed. In another preferred aspect of the system, the hydraulic design area is a function of at least one of ceiling height, storage configuration, storage height, commodity classification and/or sprinkler-to-storage clearance height. Preferably, the hydraulic design area is about 2000 square feet (2000 $ft.^2$), and in another preferred aspect, the hydraulic design area is less than 2600 square feet (2600 $ft.^2$) so as to reduce the overall fluid demand of known dry sprinkler systems for storage occupancies. More preferably, the system is designed such that the sprinkler operation area is less than an area than that of a dry sprinkler system sized to be thirty-percent greater than the sprinkler area of a wet system sized to protect the same sized storage occupancy.

The system is preferably configured for ceiling-only protection of a storage occupancy in which the ceiling height ranges from about thirty feet to about forty-five feet, and the storage height can range accordingly from about twenty feet to about forty feet such that the sprinkler-to-storage clearance height ranges from about five feet to about twenty-five feet. Accordingly, in one preferred aspect, the ceiling height is about equal to or less than 40 feet, and the storage height ranges from about twenty-feet to about thirty-five feet. In another preferred aspect, the ceiling height is about equal to or less than thirty-five feet and the storage height ranges from about twenty feet to about thirty feet. In yet another preferred aspect, the ceiling height is about equal to thirty feet and the storage height ranges from about twenty feet to about twenty-five feet. Moreover, the first and second fluid delivery delay periods are preferably function of at least the ceiling height and the storage height, such that wherein when the ceiling height ranges from about thirty feet to about forty-five feet (30 ft.-45 ft.) and the storage height ranges from about twenty feet to about thirty-feet (20 ft.-40ft.), the first mandatory fluid delivery delay is preferably less than thirty seconds and the second mandatory fluid delivery period ranges from about four to about ten seconds (4 sec.-10 sec.).

The ceiling-only system is preferably configured as at least one of a double-interlock preaction, single-interlock preaction and dry pipe system. Accordingly, where the system is configured as a double-interlocked system, the system further includes one or more fire detectors spaced relative to the plurality of sprinklers such that in the event of a fire, the fire detectors activate before any sprinkler activation. To facilitate the interlock and the preaction characteristics of the system, the system further preferably includes a releasing control panel in communication with the control valve. More preferably, where the control valve is a solenoid actuated control valve, the releasing control panel is configured to receive signals of either a pressure decay or fire detection to appropriately energize the solenoid valve for actuation of the control valve. The system further preferably includes a quick release device in communication with the releasing control panel and capable of detecting a small rate of decay of gas pressure in the first network of pipes to signal the releasing control panel of such a decay. The preferred sprinkler for use in the dry ceiling-only system has a K-factor of at least eleven, preferably greater than eleven, more preferably ranging from about eleven to about thirty-six, even more preferably about seventeen and yet even more preferably about 16.8. The thermal rating of the sprinkler is preferably about 286° F. or greater. In addition, the preferred sprinkler has an operating pressure ranging from about 15 psi. to about 60 psi., more preferably ranging from about 15 psi. to about 45 psi., even more preferably ranging from about 20 psi. to about 35 psi., and yet even more preferably ranging from about 22 psi. to about 30 psi.

Accordingly, another embodiment according to the present invention provides a sprinkler having a structure and a rating. The sprinkler preferably includes a structure having an inlet and an outlet with a passageway disposed therebetween defining the K-factor of eleven (11) or greater. A closure assembly is provided adjacent the outlet and a thermally rated trigger assembly is preferably provided to support the closure assembly adjacent the outlet. In addition, the preferred sprinkler includes a deflector disposed spaced adjacent from the outlet. The rating of the sprinkler preferably provides that the sprinkler is qualified for use in a ceiling-only fire-protection storage application including a dry sprinkler system configured to address a fire event with a surround and drown effect for protection of rack storage of a commodity stored to a storage height of at least twenty feet (20 ft.), where the commodity being stored is at least one of Class I, II, III, IV and Group A commodity. More preferably, the sprinkler is listed as defined in NFPA 13, Section 3.2.3 (2002), for use in a dry ceiling only fire protection application of a storage occupancy.

Accordingly, the preferred qualified sprinkler is preferably a tested sprinkler fire tested above a storage commodity within a sprinkler grid of one hundred sprinklers in at least one of a tree, looped and grid piping system configuration. Thus, a method is further preferably provided for qualifying and more preferably listing a sprinkler, as defined in NFPA 13, Section 3.2.3 (2002), for use in a dry ceiling only fire protection application of a storage occupancy, having a commodity stored to a storage height equal to or greater than about twenty feet (20 ft.) and less than about forty-five five feet (45 ft.). The sprinkler preferably has an inlet and an outlet with a passageway therebetween to define the K-factor of at least 11 or greater. Preferably, the sprinkler include a designed operating pressure and a thermally rated trigger assembly to actuate the sprinkler and a deflector spaced adjacent the outlet. The method preferably includes fire testing a sprinkler grid formed from the sprinkler to be qualified. The grid is disposed above a stored commodity configuration of at least twenty-feet. The method further includes discharging fluid at the desired pressure from a portion of the sprinkler grid to overwhelm and subdue the test fire, the discharge occurring at the designed operational pressure.

More specifically, the fire testing preferably includes igniting the commodity, thermally actuating at least one initial sprinkler in the grid above the commodity, and delaying the delivery of fluid following the thermal actuation of the at least one initial actuated sprinkler for a period so as to thermally actuate a plurality of subsequent sprinklers adjacent the at least one initial sprinkler such that the discharging is from the initial and subsequently actuated sprinklers. Preferably, the fire testing is conducted at preferred ceiling heights and for preferred storage heights.

Another preferred method according to the present invention provides a method for designing a dry ceiling-only fire protection system for a storage occupancy in which the system addresses a fire with a surround and drown effect. The preferred method includes defining at least one hydraulically remote sprinkler and at least one hydraulically close sprinkler relative to a fluid source, and defining a maximum fluid delivery delay period to the at least one hydraulically remote sprinkler and defining a minimum fluid delivery delay period to the at least one hydraulically close sprinkler to generate sprinkler operational areas for surrounding and drowning a fire event. Defining the at least one hydraulically remote and at least one hydraulically close sprinkler further preferably includes defining a pipe system including a riser assembly coupled to the fluid source, a main extending from the riser assembly and a plurality of branch pipes the plurality of branch pipes and locating the at least one hydraulically remote and at least hydraulically close sprinkler along the plurality of branch pipes relative to the riser assembly. The method can further include defining the pipe system at least one of a loop and tree configuration. Defining the piping system further includes defining a hydraulic design area to support a surround and drown effect, such as for example, providing the number of sprinklers in the hydraulic area and the sprinkler-to-sprinkler spacing. Preferably, the hydraulic design area is defined as a function of at least one parameter characterizing the storage area, the parameters being: ceiling height, storage height, commodity classification, storage configuration and clearance height.

In one preferred embodiment, defining the hydraulic design area can include reading a look-up table and identifying the hydraulic design area based upon at least one of the storage parameters. In another aspect of the preferred method, defining the maximum fluid delivery delay period preferably includes computationally modeling a 10×10 sprinkler grid having the at least one hydraulically remote sprinkler and the at least one hydraulically close sprinkler above a stored commodity, the modeling including simulating a free burn of the stored commodity and the sprinkler activation sequence in response to the free burn. Preferably, the maximum delivery delay period is defined as the time lapse between the first sprinkler activation to about the sixteenth sprinkler activation. Furthermore, the minimum fluid delivery delay period is preferably defined as the time lapse between the first sprinkler activation to about the fourth sprinkler activation. The preferred method can also include iteratively designing the sprinkler system such that the maximum fluid delivery delay period is experienced at the most hydraulically remote sprinkler, and the minimum fluid delivery delay period is experienced at the most hydraulically close sprinkler. More preferably, the method includes performing a computer simulation of the system including sequencing the sprinkler activations of the at least one hydraulically remote sprinkler and preferably four most hydraulically remote sprinklers, and also sequencing the sprinkler activations of the at least one hydraulically close sprinkler and preferably for most hydraulically close sprinklers. The computer simulation is preferably configured to calculate fluid travel time from the fluid source to the activated sprinkler.

In one preferred embodiment of the method simulating the ceiling-only dry sprinkler system, configured to surround and drown a fire event, includes simulating the first plurality of sprinklers so as to include four hydraulically remote sprinklers having an activation sequence so as to define a first hydraulically remote sprinkler activation, a second hydraulically remote sprinkler activation, a third hydraulically remote sprinkler activation, and a fourth hydraulically remote sprinkler activation, the second through fourth hydraulically close sprinkler activations occurring within ten seconds of the first hydraulically remote sprinkler activation. Moreover, the simulation defines a first mandatory fluid delivery delay such that no fluid is discharged at the designed operating pressure from the first hydraulically remote sprinkler at the moment the first hydraulically remote sprinkler actuates, no fluid is discharged at the designed operating pressure from the second hydraulically remote sprinkler at the moment the second hydraulically remote sprinkler actuates, no fluid is discharged at the designed operating pressure from the third hydraulically remote sprinkler at the moment the third hydraulically remote sprinkler actuates, and no fluid is discharged at the designed operating pressure from the fourth hydraulically remote sprinkler at the moment the fourth hydraulically remote sprinkler actuates. More specifically, the first, second, third and fourth sprinklers are configured, positioned and/or otherwise sequenced such that none of the four hydraulically remote sprinklers experience the designed operating pressure prior to or at the moment of the actuation of the fourth most hydraulically remote sprinkler.

Additionally, the system is further preferably simulated such that the first plurality of sprinklers includes four hydraulically close sprinklers with an activation sequence so as to define a first hydraulically close sprinkler activation, a second hydraulically close sprinkler activation, a third hydraulically close sprinkler activation, and a fourth hydraulically close sprinkler activation, the second through fourth hydraulically close sprinkler activations occurring within ten seconds of the first hydraulically remote sprinkler activation. Moreover, the system is simulated to define a second mandatory fluid delivery delay is such that no fluid is discharged at the designed operating pressure front the first hydraulically close sprinkler at the moment the first hydraulically remote sprinkler actuates, no fluid is discharged at the designed operating pressure from the second hydraulically close sprinkler at the moment the second hydraulically close sprinkler actuates, no fluid is discharged at the designed operating pressure from the third hydraulically close sprinkler at the moment the third hydraulically close sprinkler actuates, and no fluid is discharged at the designed operating pressure from the fourth hydraulically close sprinkler at the moment the fourth hydraulically close sprinkler actuates. More specifically, the first, second, third and fourth sprinklers are configured, positioned and/or otherwise sequenced such that none of the four hydraulically close sprinklers experience the designed operating pressure prior to or at the moment of the actuation of the fourth most hydraulically close sprinkler.

Accordingly, another preferred embodiment of the present invention provides a database, look-up table or a data table for designing a dry ceiling-only sprinkler system for a storage occupancy. The data-table preferably includes a first data array characterizing the storage occupancy, a second data array characterizing sprinkler, a third data array identifying a hydraulic design area as a function of the first and second data arrays, and a fourth data array identifying a maximum fluid delivery delay period and a minimum fluid delivery delay period each being a function of the first, second and third data arrays. Preferably, the data table is configured such that the data table is configured as a look-up table in which anyone of the firsts second, and third data arrays determine the fourth data array. Alternatively, the database can be a single specified maximum fluid delivery delay period to be incorporated into a ceiling-only dry sprinkler system to address a fire in a storage occupancy with a sprinkler operational areas having surround and drown configuration about the fire event for a given ceiling height, storage height, and/or commodity classification.

The present invention can provided one or more systems, subsystems, components and or associated methods of fire protection. Accordingly, a process preferably provides systems and/or methods for fire protection. The method preferably includes obtaining a sprinkler qualified for use in a dry ceiling-only fire protection system for a storage occupancy having at least one of: (i) Class I-III, Group A, Group B or Group C with a storage height greater than twenty-five feet; and (ii) Class IV with a storage height greater than twenty-two feet. The method further preferably includes distributing to a user the sprinkler for use in a storage occupancy fire protection application. In addition or alternatively, to the process can include obtaining a qualified system, subsystem, component or method of dry ceiling-only fire protection for storage systems and distributing the qualified system, subsystem, component or method to from a first party to a second party for use in the fire protection application.

Accordingly, the present invention can provide for a kit for a dry ceiling-only sprinkler system for fire protection of a storage occupancy. The kit preferably includes a sprinkler qualified for use in a dry ceiling-only sprinkler system for a storage occupancy having ceiling heights up to about forty-five feet and commodities having storage heights up to about forty feet. In addition, the kit preferably includes a riser assembly for controlling fluid delivery to the at least one sprinkler. The preferred kit further provides a data sheet for the kit in which the data sheet identifies parameters for using the kit, the parameters including a hydraulic design area, a maximum fluid delivery delay period for a most hydraulically remote sprinkler and a minimum fluid delivery delay period to a most hydraulically close sprinkler. Preferably, the kit includes an upright sprinkler having a K-factor of about seventeen and a temperature rating of about 286° F. More preferably, the sprinkler is qualified for the protection of the commodity being at least one of Class I, II, III, IV and Group A plastics. The riser assembly preferably includes a control valve having an inlet and an outlet, the riser assembly further comprises a pressure switch for communication with the control valve. In another preferred embodiment of the kit, a control panel is included for controlling communication between the pressure switch and the control valve. Additionally, at least one shut off valve is provided for coupling to at least one of the inlet and outlet of the control valve, and a check valve is further preferably provided for coupling to the outlet of the control valve. Alternatively, an arrangement can be provided in which the control valve and/riser assembly can be configured with an intermediate chamber so as to eliminate the need for a check valve. In yet another preferred embodiment of the kit, a computer program or software application is provided to model, design and/or simulate the system to determine and verify the fluid delivery delay period for one or more sprinklers in the system. More preferably, the computer program or software application can simulate or verify, that the hydraulically remote sprinkler experiences the maximum fluid delivery delay period and the hydraulically close sprinkler experiences the minimum fluid delivery delay period. In addition, the computer program or software is preferably configured to model and simulate the system including sequencing the activation of one or more sprinklers and verifying the fluid delivery to the one or more activated sprinklers complies with a desired mandatory fluid delivery delay period. More preferably, the program can sequence the activation of at least four hydraulically remote or alternatively four hydraulically close sprinklers in the system, and verify the fluid delivery to the four sprinklers.

The preferred process for providing systems and/or methods of fire protection more specifically can include distributing to from a first party to a second party installation criteria for installing the sprinkler in a dry ceiling-only fire protection system for a storage occupancy. Providing installation criteria preferably includes specifying at least one of commodity classification and storage configuration, specifying a minimum clearance height between the storage height and a deflector of the sprinkler, specifying a maximum coverage area and a minimum coverage area on a per sprinkler basis in the system, specifying sprinkler-to-sprinkler spacing requirements in the system, specifying a hydraulic design area and design operating pressure; and specifying a designed fluid delivery delay period. In another preferred embodiment, specifying a fluid delivery delay can includes specifying the delay so as to promote a surround and drown effect to address a fire event in the storage occupancy. More preferably, specifying a designed fluid delivery delay includes specifying a fluid delivery delay falling between a maximum fluid delivery delay period and a minimum fluid delivery delay period, where, more preferably the maximum and minimum fluid delivery delay periods are specified to occur at the most hydraulically remote and most hydraulically close sprinklers respectively.

In another preferred aspect of the process, specification of a design fluid delivery delay is preferably a function of at least one of the ceiling height, commodity classification, storage configuration, storage height, and clearance height. Accordingly, specifying the designed fluid delivery delay period preferably includes providing a data table of fluid delivery delay times as a function at least one of the ceiling height, commodity classification, storage configuration, storage height, and clearance height.

In another preferred aspect of the process, the providing the installation criteria further includes specifying system components for use with the sprinkler, the specifying system components preferably includes specifying a riser assembly for controlling fluid flow to the sprinkler system and specifying a control mechanism to implement the designed fluid delivery delay. Moreover, the process can further include specifying a fire detection device for communication with the control mechanism to provide preaction installation criteria. The process can also provide that installation criteria be provided in a data sheet, which can further include publishing the data sheet in at least one of paper media and electronic media.

Another aspect of the preferred process preferably includes obtaining a sprinkler for use in a dry ceiling-only sprinkler system for a storage occupancy In one embodiment of the process, the obtaining preferably includes providing the sprinkler. Providing the sprinkler, preferably includes providing a sprinkler body having an inlet and an outlet with a passageway therebetween so as to define a K-factor of about eleven or greater, preferably about seventeen, and more preferably 16:8, and further providing a trigger assembly having a thermal rating of about 286° F.

Another aspect preferably provides that the obtaining includes qualifying the sprinkler and more preferably listing the sprinkler with an organization acceptable to an authority having jurisdiction over the storage occupancy, such as for example, Underwriters Laboratories, Inc. Accordingly, obtaining the sprinkler can include fire testing the sprinkler for qualifying. The testing preferably includes defining acceptable test criteria including fluid demand and designed system operating pressures. In addition, the testing include locating a plurality of the sprinkler in a ceiling sprinkler grid on a sprinkler-to-sprinkler spacing at a ceiling height, the grid further being located above a stored commodity having a commodity classification, storage configuration and storage height. Preferably, the locating of the plurality of the sprinkler includes locating one hundred sixty-nine (169) sprinklers in a grid on eight foot-by-eight foot spacing (8 ft.×8 ft.) or alternatively one hundred (100) of the sprinkler in the ceiling sprinkler grid on a ten foot-by-ten foot spacing (10 ft.×10 ft.). Alternatively, any number of sprinklers can form the grid provided the sprinkler-to-sprinkler spacing can provide at least one sprinkler for each sixty-four square feet (1 sprinkler per 64 $ft.^2$) or alternatively, one sprinkler for each one hundred square feet (1 sprinkler per 100 $ft.^2$). More generally, the locating of the plurality of sprinkler preferably provides locating a sufficient number of sprinklers so as to provide at least a ring of unactuated sprinklers bordering the actuated sprinklers during the test. Further included in the testing is generating a fire event in the commodity, and delaying fluid discharge from the sprinkler grid so as to activate a number of sprinklers and discharge a fluid from any one activated sprinkler at the designed system operating pressure to address the fire event in a surround surround and drown configuration. In addition, defining the acceptable test criteria preferably includes defining fluid demand as a function of designed sprinkler activations to effectively overwhelm and subdue a fire with a surround and drown configuration. Preferably, the designed sprinkler activations are less than forty percent of the total sprinklers in the grid. More preferably, the designed sprinkler activations are less than thirty-seven percent of the total sprinklers in the grid, even more preferably less than twenty percent of the total sprinklers in the grid.

In a preferred embodiment of the process, delaying fluid discharge includes delaying fluid discharge for a period of time as a function of at least one of commodity classification, storage configuration, storage height, and a sprinkler-to-storage clearance height. The delaying fluid discharge can further include determining the period of fluid delay from a computation model of the commodity and the storage occupancy, in which the model solves for free-burn sprinkler activation times such that the fluid delivery delay is the time lapse between a first sprinkler activation and at least one of: (i) a critical number of sprinkler activations and (ii) a number of sprinklers equivalent to an operational area capable of surrounding and drowning a fire event.

The distribution from a first party to a second party of any one of the preferred system, subsystem, component, preferably sprinkler and/or method can include transfer of the preferred system, subsystem, component, preferably sprinkler and/or method to at least one of a retailer, supplier, sprinkler system installer, or storage operator. The distributing can include transfer by way of at least one of ground distribution, air distribution, overseas distribution and on-line distribution.

Accordingly, the present invention further provides a method of transferring a sprinkler for use in a dry ceiling-only sprinkler system to protect a storage occupancy from a first party to a second party. The distribution of the sprinkler can include publishing information about the qualified sprinkler in at least one of a paper publication and an on-line publication. Moreover, the publishing in an on-line publication preferably includes hosting a data array about the qualified sprinkler on a first computer processing device such as, for example, a server preferably coupled to a network for communication with at least a second computer processing device. The hosting can further include configuring the data array so as to include a listing authority element, a K-factor data element, a temperature rating data element and a sprinkler data configuration element. Configuring the data array preferably includes configuring the listing authority element as at least one of UL and or Factory Mutual (FM) Approvals (hereinafter "FM"), configuring the K-factor data element as being about seventeen, configuring the temperature rating data element as being about 286° F., and configuring the sprinkler configuration data element as upright. Hosting a data array can further include identifying parameters for the dry ceiling-only sprinkler system, the parameters including: a hydraulic design area including a number of sprinklers and/or sprinkler-to-sprinkler spacing, a maximum fluid delivery delay period to a most hydraulically remote sprinkler, and a minimum fluid delivery delay period to the most hydraulically close sprinkler.

Further provided by a preferred embodiment of the present invention is a sprinkler system for delivery of a fire protection arrangement. The system preferably includes a first computer processing device in communication with at least a second computer processing device over a network, and a database stored on the first computer processing device. Preferably, the network is at feast one of a WAN (wide-area-network), LAN (local-area-network) and Internet. The database preferably includes a plurality of data arrays. The first data array preferably identifies a sprinkler for use in a dry ceiling-only fire protection systems for a storage occupancy. The first data array preferably includes a K-factor, a temperature rating, and a hydraulic design area. The second data array preferably identifies stored commodity, the second data array preferably including a commodity classification, a storage configuration and a storage height. The third data array preferably identifies a maximum fluid delivery delay period for the delivery time to the most hydraulically remote sprinkler, the third data element being a function of the first and second data arrays. A fourth data array preferably identifies a minimum fluid delivery delay period for the delivery time to the most hydraulically close sprinkler, the fourth data array being a function of the first and second data arrays. In one preferred embodiment, the database is configured as an electronic data sheets, such as for example, at least one of an .html file, .pdf, or editable text file. The database can further include a fifth data array indentifying a riser assembly for use with the sprinkler of the first data array, and even further include a sixth data array identifying a piping system to couple the control valve of the fifth data array to the sprinkler of the first data array.

BRIEF DESCRIPTION OF THE DRAWINGS

The accompanying drawings, which are incorporated herein and constitute part of this specification, illustrate exemplary embodiments of the invention, and together, with the general description given above and the detailed description given below, serve to explain the features of the invention. It should be understood that the preferred embodiments are not the totality of the invention but are examples of the invention as provided by the appended claims.

MODE(S) FOR CARRYING OUT THE INVENTION

Figure 1:
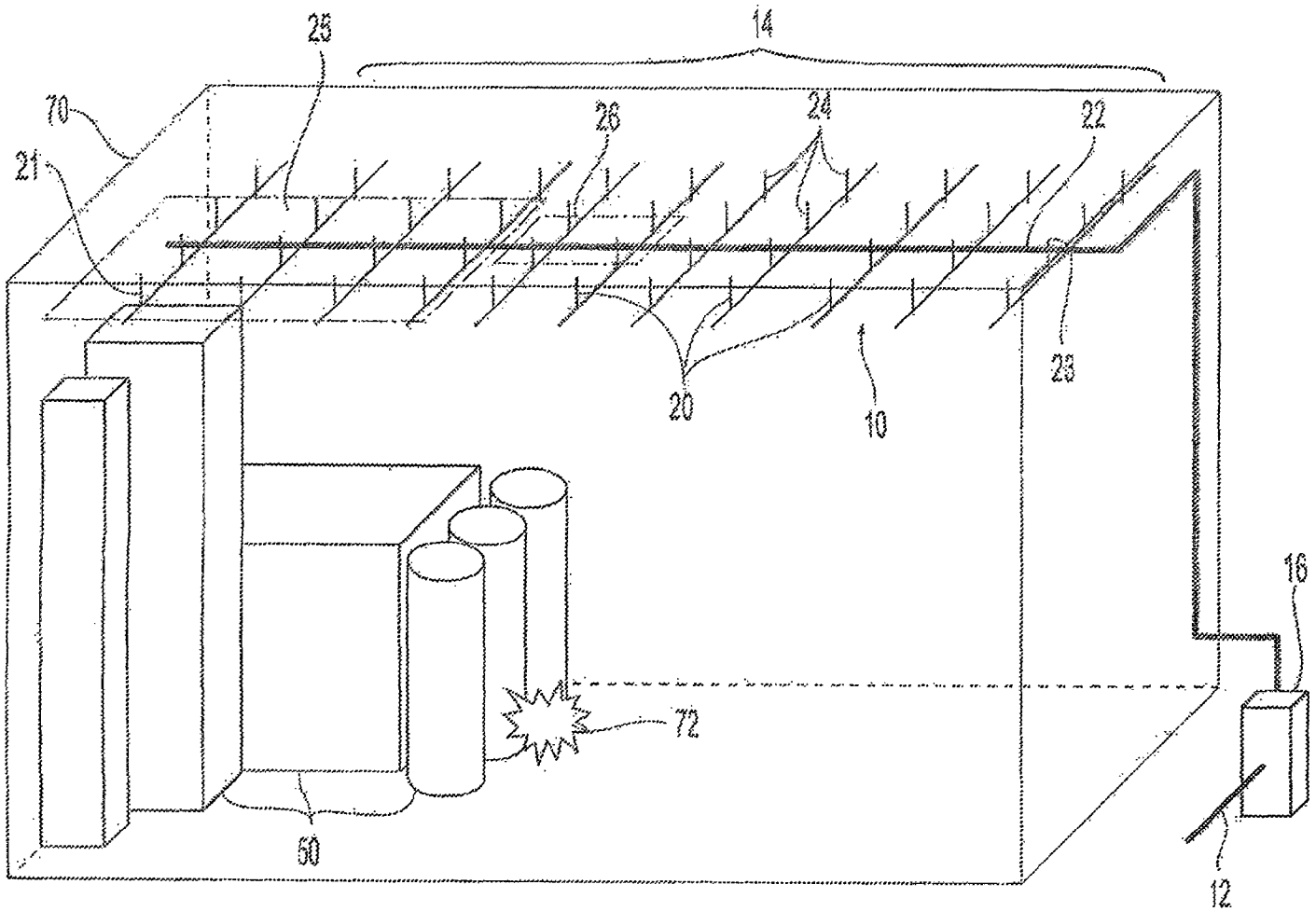
FIG. 1 is an illustrative embodiment of a preferred dry sprinkler system located in a storage area having a stored commodity.

Fire Protection System configured to Address a Fire With a Surround & Drown Configuration A preferred dry sprinkler system 10, as seen in FIG. 1, is configured for protection of a stored commodity 50 in a storage area or occupancy 70. The system 10 includes a network of pipes having a wet portion 12 and a dry portion 14 preferably coupled to one another by a primary water control valve 16 which is preferably a deluge or preaction valve or alternatively, an air-to-water ratio valve. The wet portion 12 is preferably connected to a supply of fire lighting liquid such as, for example, a water main. The dry portion 14 includes a network of sprinklers 20 interconnected by a network of pipes filled with air or other gas. Air pressure within the dry portion alone or in combination with another control mechanism controls the open/closed state of the primary water control valve 16. Opening the primary water control valve 16 releases water from the wet portion 12 into the dry portion 14 of the system to be discharged through an open sprinkler 20. The wet portion 12 can further include additional devices (not shown) such as, for example, fire pumps, or backflow preventers to deliver the water to the dry portion 14 at a desired flow rate and/or pressure.

The preferred sprinkler system 10 is configured to protect the stored commodity 50 by addressing a fire growth 72 in the storage area 70 with a preferred sprinkler operational area 26, as seen in FIG. 1. A sprinkler operational area 26 preferably defined by a minimum number of activated sprinklers thermally triggered by the fire growth 72 which surround and drown a fire event or growth 72. More specifically, the preferred sprinkler operational area 26 is formed by a minimum number of activated and d appropriately spaced sprinklers configured to deliver a volume of water or other fire fighting fluid having adequate flow characteristics, i.e. flow rate and/or pressure, to overwhelm and subdue the fire from above. The number of thermally activated sprinklers 20 defining the operational area 26 is preferably substantially smaller than the total number of available sprinklers 20 in the dry portion 14 of the system 10. The number of activated sprinklers forming the sprinkler operational area 26 is minimized both to effectively address a fire and further minimize the extent of water discharge from the system. "Activated" used herein means that the sprinkler is in an open state for the delivery of water.

In operation, the ceiling-only dry sprinkler system 10 is preferably configured to address a fire, with a surround and drown effect, would initially respond to a fire below with at least one sprinkler thermal activation. Upon activation of the sprinkler 20, the compressed air or other gas in the network of pipes would escape, and alone or in combination with a smoke of fire indicator, trip open the primary water control valve 16. The open primary water control valve 16 permits water or other fire fighting fluid to fill the network of pipes and travel to the activated sprinklers 20. As the water travels through the piping of the system 10, the absence of water, and more specifically the absence of water at designed operating discharge pressure, in the storage area 70 permits the fire to grow releasing additional heat into the storage area 70. Water eventually reaches the group of activated sprinklers 20 and begins to discharge over the fire from the preferred operational area 26 building-up to operating pressure yet permitting a continued increase in the heat release rate. The added heat continues the thermal trigger of additional sprinklers proximate the initially triggered sprinkler to preferably define the desired sprinkler operational area 26 and configuration to surround and drown the fire. The water discharge reaches full operating pressure out of the operational area 26 in a surround and drown configuration so as to overwhelm and subdue the fire. As used herein, "surround and drown" means to substantially surround a burning area with a discharge of water to rapidly reduce the heat release rate. Moreover, the system is configured such that all the activated sprinklers forming the operating area 26 are preferably activated within a predetermined time period. More specifically, the last activated sprinkler occurs within ten minutes following the first thermal sprinkler activation in the system 10. More preferably, the last sprinkler is activated within eight minutes and more preferably, the last sprinkler is activated within five minutes of the first sprinkler activation in the system 10.

To minimize or eliminate the fluid delivery delay period could introduce water into the storage area 70 prematurely, inhibit fire growth and prevent formation of the desired sprinkler operational area 26. However, to introduce water too late into the storage area 70 could permit the fire to grow so large such that the system 10 could not adequately overwhelm and subdue the fire, or at best may only serve to slow the growth of the heat release rate. Accordingly, the system 10 necessarily requires a water or fluid delivery delay period of an adequate length to effectively form a sprinkler operational area 26 sufficient to surround and drown the fire. To form the desired sprinkler operation area 26, the sprinkler system 10 includes at least one sprinkler 20 with an appropriately configured fluid delivery delay period. More preferably, to ensure that a sufficient number of sprinklers 20 are thermally activated to form a sprinkler operational area 26 anywhere in the system 10 sufficient to surround and drown the fire growth 72, each sprinkler in the system 10 has a properly configured fluid delivery delay period. The fluid delivery delay period is preferably measured from the moment following thermal activation of at least one sprinkler 20 to the moment of fluid discharge from the one or more sprinklers forming the desired sprinkler operational area 26, preferably at system operating pressure. The fluid delivery delay period, following the thermal activation of at least one sprinkler 20 in response to a fire below the sprinkler, allows for the fire to grow unimpeded by the introduction of the water or other fire-fighting fluid. The inventors have discovered that the fluid delivery delay period can be configured such that the resultant growing fire thermally triggers additional sprinklers adjacent, proximate or surrounding the initially triggered sprinkler 20. Water discharge from fire resultant sprinkler activations define the desired sprinkler operational area 26 to surround and drown and thereby overwhelm and subdue the fire. Accordingly, the size of an operational area 26 is preferably directly related to the length of the fluid delivery delay period. The longer the fluid delivery delay period, fire larger the fire growth resulting in more sprinkler activations to form a larger resultant sprinkler operational area 26. Conversely, the smaller the fluid delivery delay period, the smaller the resulting operational area 26.

Because the fluid delivery delay period is preferably a function of fluid travel time following first sprinkler activation, the fluid delivery delay period is preferably a function the trip time for the primary water control valve 16, the water transition time through the system, and compression. These factors of fluid delivery delay are more thoroughly discussed in a publication from TYCO FIRE & BUILDING PRODUCTS entitled A Technical Analysis: Variables That Affect The Performance of Dry Pipe Systems (2002) by James Golinveaux which is incorporated in its entirety by reference. The valve trip time is generally controlled by the air pressure in the line, the absence or presence of an accelerator, and in the case of an air-to-water ratio valve, the valve trip pressure. Further impacting the fluid delivery delay period is the fluid transition time from the primary control valve 16 to the activated sprinklers. The transition time is dictated by fluid supply pressure, air/gas in the piping, and system piping volume and arrangement. Compression is the measure of time from water reaching the activated sprinkler to the moment the discharging wafer or fire-fighting fluid pressure is maintained at about or above the minimum operating pressure for the sprinkler.

It should be understood that because the preferred fluid delivery delay period is a designed or mandatory delay, preferably of a defined duration, it is distinct from whatever randomized and/or inherent delays that may be experienced in current dry sprinkler systems. More specifically, the dry portion 14 can be designed and arranged to effect the desired delay, for example, by modifying or configuring the system volume, pipe distance and/or pipe size.

The dry portion 14 and its network of pipes preferably includes a main riser pipe, connected to the primary water control valve 16, and a main pipe 22 to which are connected one or more spaced-apart branch pipes 24. The network of pipes can further include pipe fittings such as connectors, elbows and risers, etc. to connect portions of the network and form loops and/or tree branch configurations in the dry portion 14. Accordingly, the dry portion 14 can have varying elevations or slope transitions from one section of the dry portion to another section of the dry portion. The sprinklers 20 are preferably mounted to and spaced along the spaced-apart branch pipes 24 to form a desired sprinkler spacing.

The sprinkler-to-sprinkler spacing can be six feet-by-six feet (6 ft.×6 ft.); eight feet-by-eight feet (8 ft.×8 ft.), ten feet-by-ten feet (10 ft.×10 ft.), twenty feet-by-twenty feet (20 ft.×20 ft. spacing) and any combinations thereof or range in between, depending upon the system hydraulic design requirements. Based upon the configuration of the dry portion 14, the network of sprinklers 20 includes at least one hydraulically remote or hydraulically most demanding sprinkler 21 and at least one hydraulically close or hydraulically least demanding sprinkler 23, i.e., the least remote sprinkler, relative to the primary water control valve 16 separating the wet portion 12 from the dry portion 14. Generally, a suitable sprinkler for use in a dry sprinkler system configured provides sufficient volume, cooling and control for addressing a fire with a surround and drown effect. More specifically, the sprinklers 20 are preferably upright specific application storage sprinklers having a K-factor ranging from about 11 to about 36; however alternatively, the sprinklers 20 can be configured as dry pendant sprinklers. More preferably, the sprinklers have a nominal K-factor of 16.8. As is understood in the art, the nominal K-factor identifies sprinkler discharge characteristics as provided in Table 6.2.3.1 of NFPA-13 which is specifically incorporated herein by reference. Alternatively, the sprinklers 20 can be of any nominal K-factor provided they are installed and configured in a system to deliver allow of fluid in accordance with the system requirements. More specifically, the sprinkler 20 can have a nominal K-factor of 11.2; 14.0; 16.8; 19.6: 22.4; 25.2; 28.0; 36 or greater provided that if the sprinkler has a nominal K-factor greater than 28, the sprinkler increases the flow by 100 percent increments when compared with a nominal 5.6 K-factor sprinkler as required by NFPA-13 Section 6.2.3.3 which is specifically incorporated herein by reference. Moreover, the sprinklers 20 can be specified in accordance with Section 12.1.13 of NFPA-13 which is specifically incorporated by reference. Preferably, the sprinklers 20 are configured to be thermally triggered at 286° F. however the sprinklers can be specified to have a temperature rating suitable for the given storage application including temperature ratings greater than 286° F. The sprinklers 20 can thus be specified within the range of temperature ratings and classifications as listed in Table 6.2.5.1 of NFPA-13 which is specifically incorporated herein by reference. In addition, the sprinklers 20 preferably have an operating pressure greater than 15 psi, preferably ranging from about 15 psi. to about 20 psi. more preferably ranging from about 15 psi. to about 45 psi., even more preferably ranging from about 20 psi. to about 35 psi., and yet even more preferably ranging from about 22 psi. to about 30 psi.

Figure 1A:
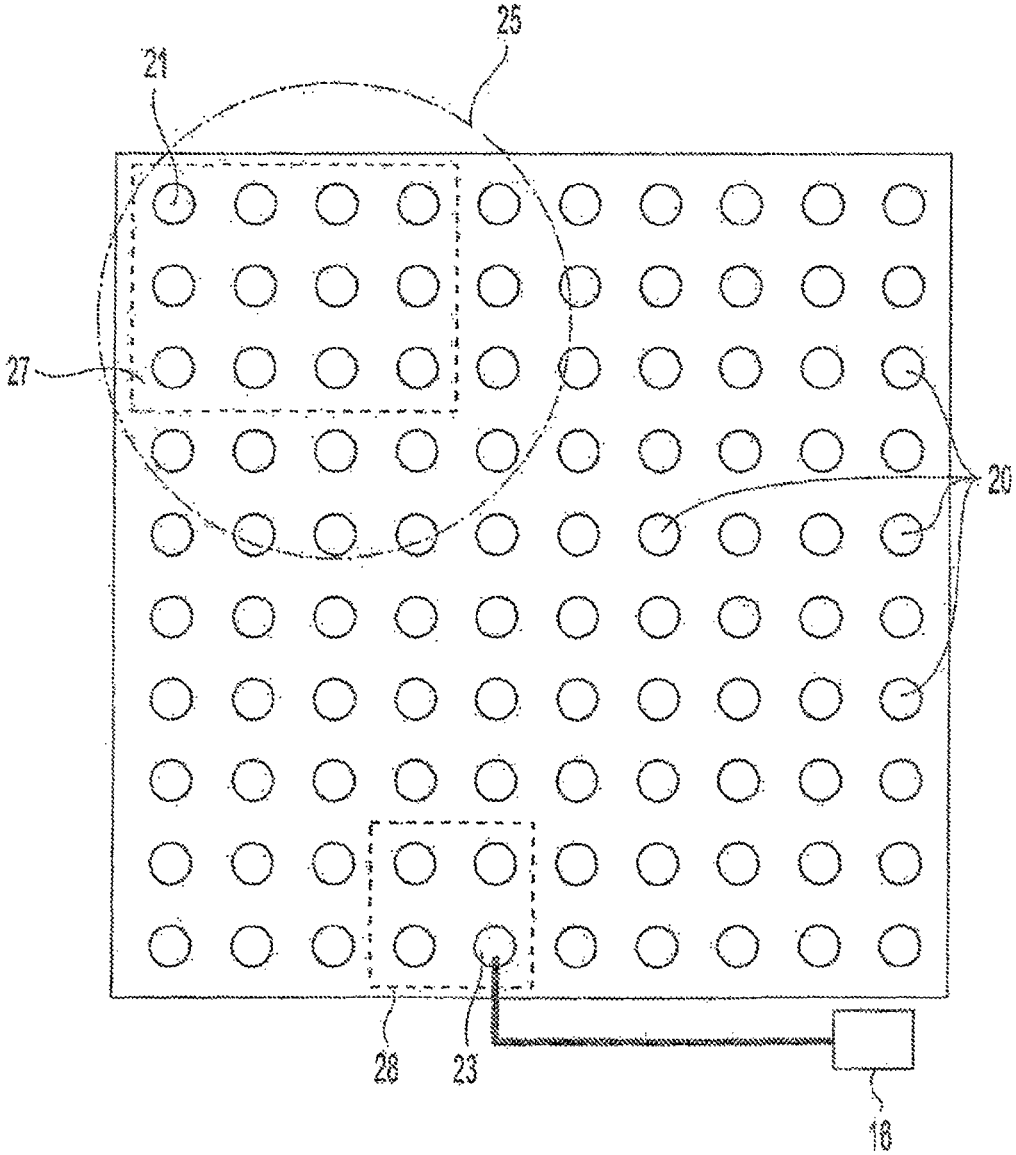
FIG. 1A is an illustrative schematic of the dry portion of the system of FIG. 1

Preferably, the system 10 is configured so as to include a maximum mandatory fluid delivery delay period and a minimum mandatory fluid delivery delay period. The minimum and maximum mandatory fluid delivery delay periods can be selected from a range of acceptable delay periods as described in greater detail herein below. The maximum mandatory fluid delivery delay period is the period of time following thermal activation of the at least one hydraulically remote sprinkler 21 to the moment of discharge from the at least one hydraulically remote sprinkler 21 at system operating pressure. The maximum mandatory fluid delivery delay period is preferably configured to define a length of time following the thermal activation of the most hydraulically remote sprinkler 21 that allows the thermal activation of a sufficient number of sprinklers surrounding the most hydraulically remote sprinkler 21 that together form the maximum sprinkler operational area 27 for the system 10 effective to surround and drown a fire growth 72 as schematically shown in FIG. 1A.

The minimum mandatory fluid delivery delay period is the period of time following thermal activation to the at least one hydraulically close sprinkler 23 to the moment of discharge from the at least one hydraulically close sprinkler 23 at system operating pressure. The minimum mandatory fluid delivery delay period is preferably configured to define a length of time following the thermal activation of the most hydraulically close sprinkler 23 that allows the thermal activation of a sufficient number of sprinklers surrounding the most hydraulically close sprinkler 23 to together form the minimum sprinkler operational area 28 for the system 10 effective to surround and drown a fire growth 72. Preferably, the minimum sprinkler operational area 28, is defined by a critical number of sprinklers including the most hydraulically close sprinkler 23. The critical number of sprinklers can be defined as the minimum number of sprinklers that can introduce water into the storage area 70, impact the fire growth, yet permit the fire to continue to grow and trigger an additional number of sprinklers to form the desired sprinkler operational area 26 for surrounding and drowning the fire growth.

With the maximum and minimum fluid delivery delay periods affected at the most hydraulically remote and close sprinklers 21, 23 respectively, each sprinkler 20 disposed between the most hydraulically remote sprinkler 21 and the most hydraulically close sprinkler 23 has a fluid delivery delay period in the range between the maximum mandatory fluid delivery delay period and the minimum mandatory fluid delivery delay period. Provided the maximum and minimum fluid delivery delay periods result respectively in the maximum and minimum sprinkler operational areas 27, 28, the fluid delivery delay periods of each sprinkler facilitates the formation of a sprinkler operational area 26 to address a fire growth 72 with a surround and drown configuration.

The fluid delivery delay period of a sprinkler 20 is preferably a function of the sprinkler distance or pipe length from the primary water control valve 16 and can further be a function of system volume (trapped air), and/or pipe size. Alternatively, the fluid delivery delay period may be a function of a fluid control device configured to delay the delivery of wafer from the primary water control valve 16 to the thermally activated sprinkler 20. The mandatory fluid delivery delay period can also be a function of several other factors of the system 10 including, for example, the water demand and flow requirements of water supply pumps or other components throughout the system 10. To incorporate a specified fluid delivery delay period into the sprinkler system 10, piping of a determined length and cross-sectional area is preferably built into the system 10 such that the most hydraulically remote sprinkler 21 experiences the maximum mandatory fluid delivery delay period and the most hydraulically close sprinkler 23 experiences the minimum mandatory fluid delivery delay period. Alternatively, the piping system 10 can include any other fluid control device such as, for example, an accelerator or accumulator in order that the most hydraulically remote sprinkler 21 experiences the maximum mandatory fluid delivery delay period and the most hydraulically close sprinkler 23 experiences the minimum mandatory fluid delivery delay period.

Alternatively, to configuring the system 10 such that the most hydraulically remote sprinkler 21 experiences the maximum mandatory fluid delivery delay period and the most hydraulically close sprinkler 23 experiences the minimum mandatory fluid delivery delay period, the system 10 can be configured such that each sprinkler in the system 10 experiences a fluid delivery delay period that falls between or within the range of delay defined by the maximum mandatory fluid delivery delay period and the minimum fluid delivery delay period. Accordingly, the system 10 may form a maximum sprinkler operational area 27 smaller than expected than if incorporating the maximum fluid delivery delay period. Furthermore, the system 10 may experience a larger minimum sprinkler operational area 28 than expected had the minimum fluid delivery delay period been employed.

Figure 2A:
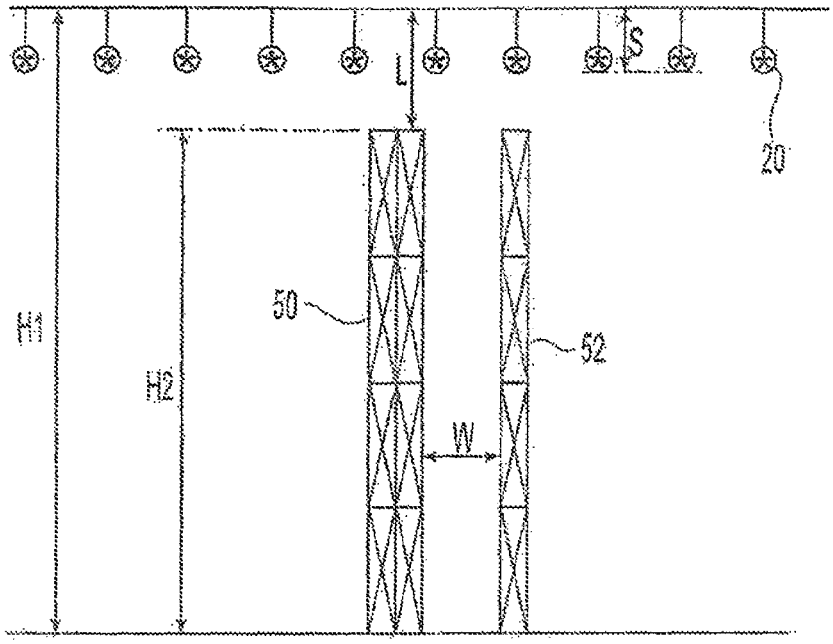
FIGS. 2A-2C are respective plan, side and overhead schematic views of the storage area of FIG. 1.
Figure 2B:
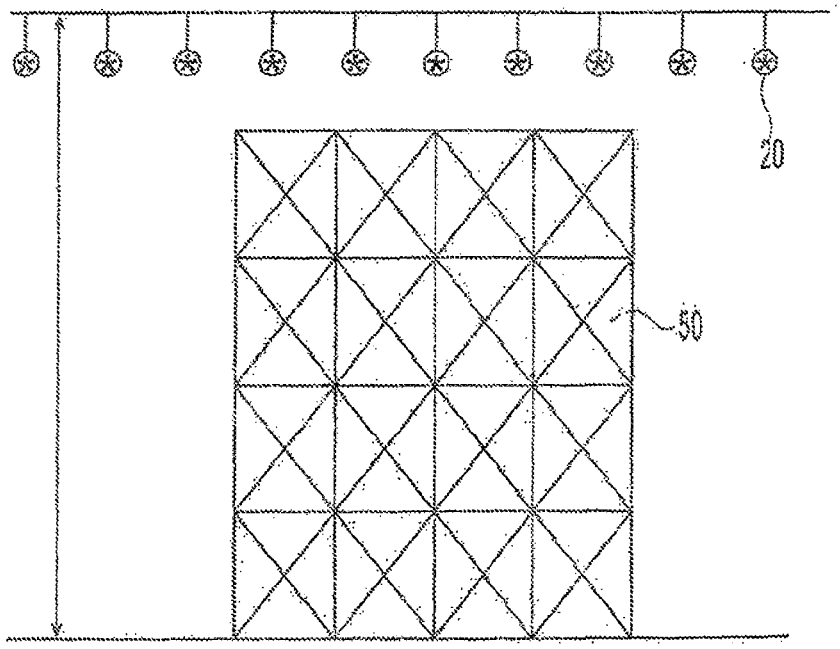
Figure 2C:
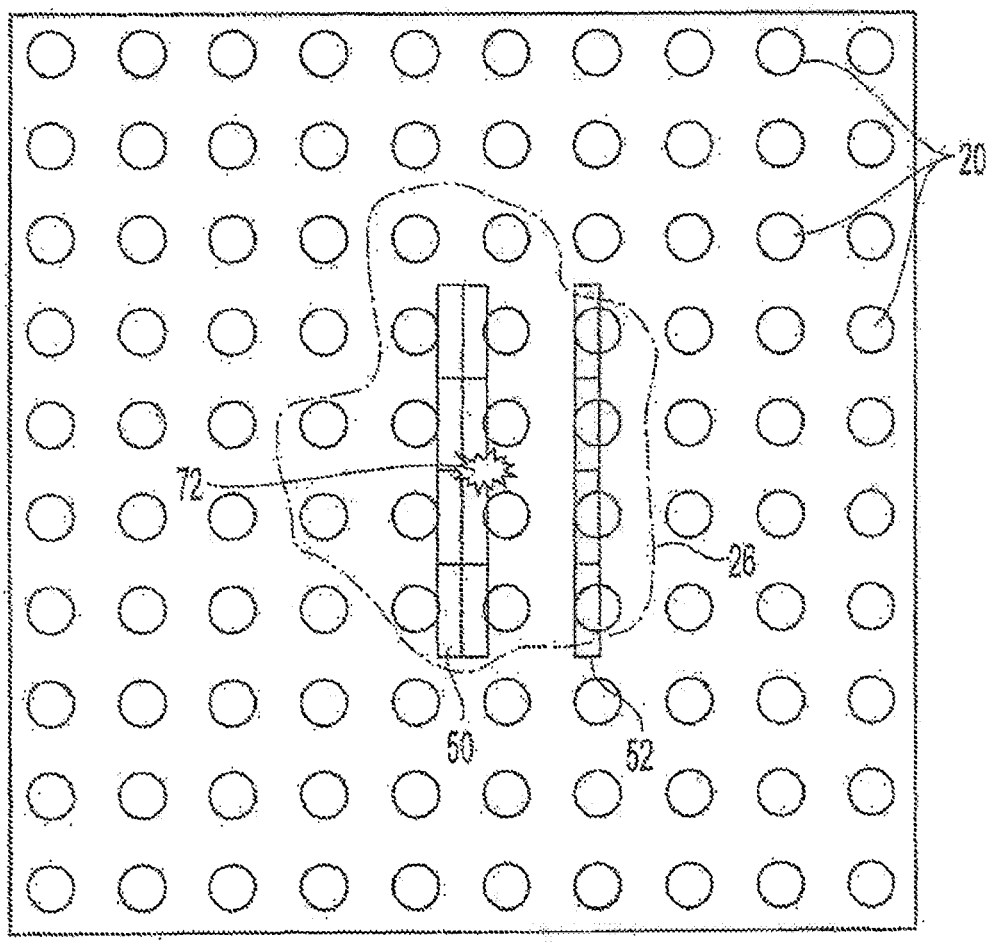

Shown schematically in FIGS. 2A-2C are respective plan, side and overhead views of the system 10 in the storage area 70 illustrating various factors that can impact fire growth 72 and sprinkler activation response. Thermal activation of the sprinklers 20 of the system 10 can be a function of several factors including, for example, heat release from the fire growth, ceiling height of the storage area 70, sprinkler location relative to the ceiling, the classification of the commodity 50 and the storage height of the commodity 50. More specifically, shown is the dry pipe sprinkler system 10 installed in the storage area 70 as a ceiling-only dry pipe sprinkler system suspended below a ceiling having a ceiling height of H1. The ceiling can be of any configuration including any one of: a flat ceiling, horizontal ceiling, sloped ceiling or combinations thereof. The ceiling height is preferably defined by the distance between the floor and the underside of the ceiling above (or roof deck) within the area to be protected, and more preferably defines the maximum height between the floor and the underside of the ceiling above (or roofdeck). The individual sprinklers preferably include a deflector located from the ceiling at a distance S. Located in the storage area 70 is the stored commodity configured as a commodity array 50 preferably of a type which can include any one of NFPA-13 defined Class I, II, III or IV commodities, alternatively Group A, Group B, or Group C plastics, elastomers, and rubbers, or further in the alternative any type of commodity capable of having its combustion behavior characterized. The array 50 can be characterized by one or more of the parameters provided and defined. In Section 3.9.1 of NFPA-13 which is specifically incorporated herein by reference. The array 50 can be stored to a storage height H2 to define a ceiling clearance L. The storage height preferably defines the maximum height of the storage. The storage height can be alternatively defined to appropriately characterize the storage configuration. Preferably the storage height H2 is twenty feet or greater. In addition, the stored array 50 preferably defines a multi-row rack storage arrangement; more preferably a double-row rack storage arrangement but other storage configurations are possible such as, for example, on floor, rack without solid shelves, palletized, bin box, shelf or single-row rack. The storage area can also include additional storage of the same or different commodity spaced at an aisle width W in the same or different configuration.

Figure 4:
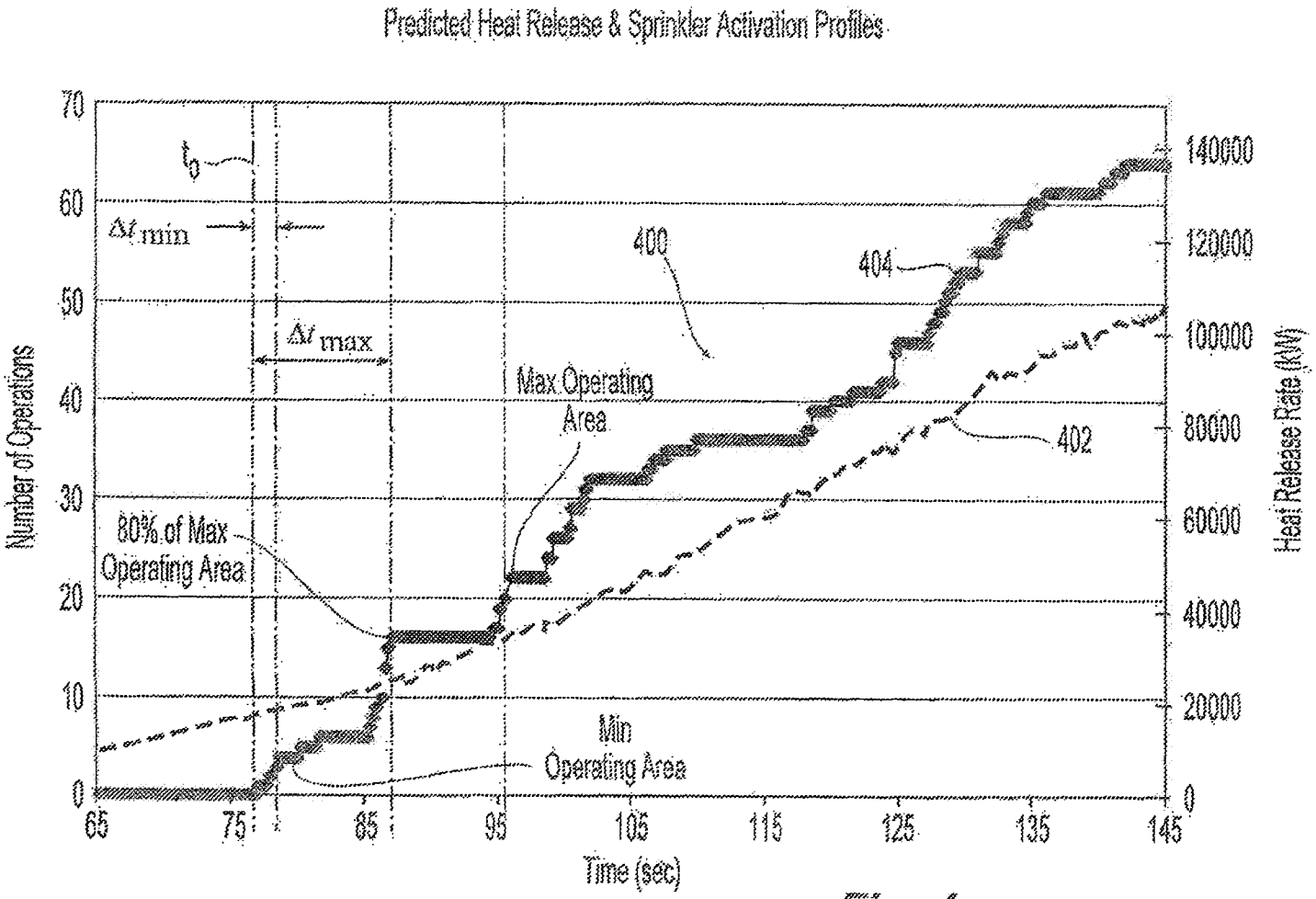
FIG. 4 is an illustrative heat release and sprinkler activation predictive profile.

To identify the minimum and maximum fluid delivery delay periods for incorporation into the system 10 and the available ranges in between, predictive sprinkler activation response profiles can be utilized for a particular sprinkler system, commodity, storage height, and storage area ceiling height. Preferably, the predictive sprinkler activation response profile for a dry sprinkler system 10 in a storage space 70, for example as seen in FIG. 4, show the predicted thermal activation times for each sprinkler 20 in the system 10 in response to a simulated fire growth burning over a period of time without the introduction of water to alter the heat release profile of the fire growth 72. From these profiles, a system operator or sprinkler designer can predict or approximate how long it takes to form the maximum and minimum sprinkler operational areas 27, 28 described above following a first sprinkler activation for surrounding and drowning a fire event. Specifying the desired maximum and minimum sprinkler operating areas 27, 28 and the development of the predictive profiles are described in greater detail herein below.

Because the predictive profiles indicate the time to thermally activate any number of sprinklers 20 in system 10, a user can utilize a sprinkler activation profile to determine the maximum and minimum fluid delivery delay periods. In order to identify the maximum fluid delivery delay period, a designer or other user can look to the predictive sprinkler activation profile to identify the time lapse between the first sprinkler activation to the moment the number of sprinklers forming the specified maximum sprinkler operational area 27 are thermally activated. Similarly, to identify the minimum fluid delivery delay period, a designer or other user can look to the predictive sprinkler activation profile to identify the time lapse between the first sprinkler activation to the moment the number of sprinklers forming the specified minimum sprinkler operational area 28 are thermally activated. The minimum and maximum fluid delivery delay periods define a range of fluid delivery delay periods which can be incorporated into the system 10 to form at least one sprinkler operational area 26 in the system 10.

The above described dry sprinkler system 10 is configured to form sprinkler operational areas 26 for overwhelming and subduing fire growths in the protection of storage occupancies. The inventors have discovered that by using a mandatory fluid delivery delay period in a dry sprinkler system, a sprinkler operational area can be configured to respond to a fire with a surround and drown configuration. The mandatory fluid delivery delay period is preferably a predicted or designed time period during which the system delays the delivery of water or other fire-fighting fluid to any activated sprinkler. The mandatory fluid delivery delay period for a dry sprinkler system configured with a sprinkler operational area is distinct from the maximum water times mandated under current dry pipe delivery design methods. Specifically, the mandatory fluid delivery delay period ensures water is expelled from an activated sprinkler at a determined moment or defined time period so as to form a surround and drown sprinkler operational area.

Generating Predictive Heat Release and Sprinkler Activation Profiles

Figure 3:
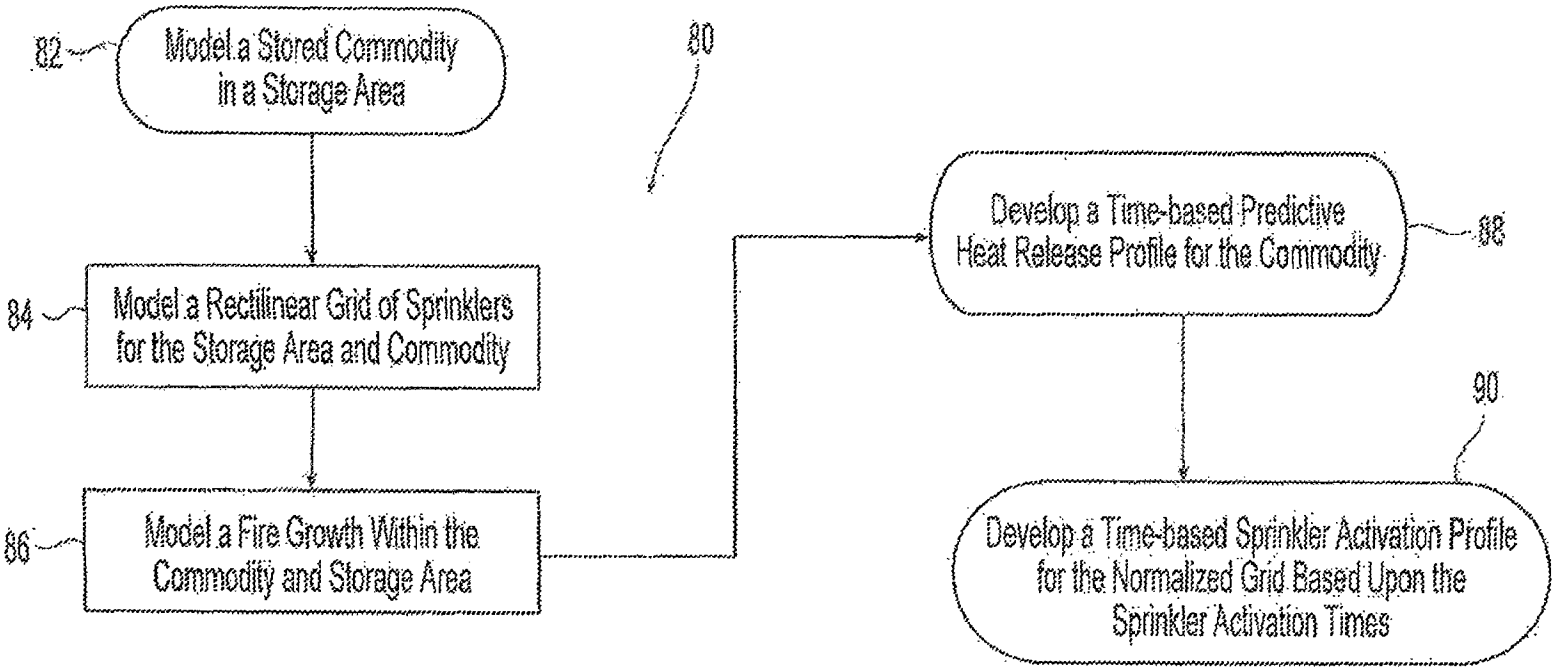
FIG. 3 is an illustrative flowchart for generating predictive heat release and sprinkler activation profiles.

To generate the predictive sprinkler activation profiles to identify the maximum and minimum fluid delivery delay periods for a given sprinkler system located in a storage space 70, a fire growth can be modeled in the space 70 and the heat release from the fire growth can be profiled over time. Over the same time period, sprinkler activation responses can be calculated, solved and plotted. The flowchart of FIG. 3 shows a preferred process 80 for generating the predictive profiles of heat releases and sprinkler activations used in determining fluid delivery delay periods and FIG. 4 shows the illustrative predictive heat release and sprinkler activation profile 400. Developing the predictive profiles includes modeling the commodity to be protected in a simulated fire scenario sprinkler system. To model the fire scenario, at least three physical aspects of the system to be model are considered: (i) the geometric arrangement of the scenario being modeled; (ii) the fuel characteristics of the combustible materials involved in the scenario; and (iii) sprinkler characteristics of the sprinkler system protecting the commodity. The model is preferably developed computationally and therefore to translate the storage space from the physical domain into the computation domain, nonphysical numerical characteristics must also be considered.

Computation modeling is preferably performed using FDS, as described above, which can predict heat release from a fire growth and further predict sprinkler activation time. NIST publications are currently available which describe the functional capabilities and requirements for modeling fire scenarios in FDS. These publications include: NIST Special Publication 1019: Fire Dynamics Simulator (Version 4) User's Guide (March 2006) and NIST Special Publication 1018: Fire Dynamics Simulator (Version 4) Technical Reference Guide (March 2006) each of which is incorporated in its entirety by reference. Alternatively, any other fire modeling simulator can be used so long the simulator can predict sprinkler at activation or detection.

As is described in the FDS Technical Reference Guide, FDS is a Computational Fluid Dynamics (CFD) model of fire-driven fluid flow. The model solves numerically a form of the Navier-Stokes equations for low-speed, thermally driven flow with an emphasis on smoke and heat transportation from fires. The partial derivatives of the conservation of mass equations of mass, momentum, and energy are approximated as fine differences, and the solution is updated in time on a three-dimensional, rectilinear grid. Accordingly, included among the input parameters required by FDS is information about the numerical grid. The numerical grid is one or more rectilinear meshes to which all geometric features must conform. Moreover, the computational domain is preferably more refined in the areas within the fuel array where burning is occurring. Outside of this region, in areas were the computation is limited to predicted heat and mass transfer, the grid can be less refined. Generally, the computational grid should be sufficiently resolved to allow at least one, or more preferably two or three complete computational elements within the longitudinal and transverse flue spaces between the modeled commodities. The size of the individual elements of the mesh grid can be uniform, however preferably, the individual elements are orthogonal elements with the largest side having a dimension of between 100 and 150 millimeters, and an aspect ratio of less than 0.5.

In the first step 82 of the predictive modeling method, the commodity is preferably modeled in its storage configuration to account for the geometric arrangement parameters of the scenario. These parameters preferably include locations and sizes of combustible materials, the ignition location of the fire growth, and other storage space variables, such as ceiling height and enclosure volume. In addition, the model preferably includes variables describing storage array configurations including the number of array rows, array dimensions including commodity array height and size of an individual commodity stored package, and ventilation configurations.

In one modeling example, as described in the FDS study, an input model for the protection of Group A plastics included modeling a storage area of 110 ft. by 110 ft; ceiling heights ranging from twenty feet to forty feet. The commodity was modeled as a double row rack storage commodity measuring 33 ft. long by 7-½ wide. The commodity was modeled at various heights including between twenty-five feet and forty feet.

In the modeling step 84 the sprinkler system is modeled so as to include sprinkler characteristics such as sprinkler type, sprinkler location and spacing, total number of sprinklers, and mounting distance from the ceiling. The total physical size of the computational domain is preferably dictated by the anticipated number of sprinkler operations prior to fluid delivery. Moreover, the number of simulated ceiling and associated sprinklers are preferably large enough such that there remains at least one continuous ring of inactivated sprinklers around the periphery of the simulated ceiling. Generally, exterior walls can be excluded from the simulation such that the results apply to an unlimited volume, however if the geometry under study is limited to a comparatively small volume, then the walls are preferably included. Thermal properties of the sprinkler are also preferably included such as, for example, functional response time index (RTI) and activation temperature. More preferably, the RTI for the thermal element of the modeled sprinkler is known prior to its installation in the sprinkler. Additional sprinkler characteristics can be defined for generating the model including details regarding the water spray structure and flow fate from the sprinkler. Again referring to the FDS Study, for example, a sprinkler system was modeled with a twelve by twelve grid of Central Sprinkler ELO-231 sprinklers on 10 ft. by 10 ft. spacing for a total of 144 sprinklers. The sprinklers were modeled with an actuation temperature of 286° F. with an RTI of 300 $(\text{ft-sec})^{1/2}$. The sprinkler grid in the FDS Study was disposed at two different heights from the ceiling: 10 inches and 4 inches.

A third aspect 86 to developing the predictive heat release and sprinkler activation profiles preferably provides simulating a fire disposed in the commodity storage array over a period of time. Specifically, the model can include fuel characteristics to describe the ignition and burning behavior of the combustible materials to be modeled. Generally, to describe the behavior of the description of heat transfer into the fuel is required.

Simulated fuel masses can be treated either as thermally thick, i.e. a temperature gradient is established through the mass of the commodity, or thermally thin, i.e. a uniform temperature is established through the mass of the commodity. For example, in the case of cardboard boxes, typical of warehouses, the wall of the cardboard box can be assumed to have a uniform temperature through its cross section, i.e. thermally thin. Fuel parameters, characterizing thermally thin, solid, Class A fuels such as the standard Class II, Class III and Group A plastics, preferably include: (i) heat release per unit Area; (ii) specific heat; (iii) density; (iv) thickness; and (v) ignition temperature. The heat release per unit area parameter permits the specific details of the internal structure of the fuel to be ignored and the total volume of the fuel to be treated as a homogeneous mass with a known energy output based upon the percentage of fuel surface area predicted to be burning. Specific heat is defined as the amount of heat required to raise the temperature of one unit mass of the fuel by one unit of temperature. Density is the mass per unit volume of the fuel, and thickness is the thickness of the surface of the commodity. Ignition temperature is defined as the temperature at which the surface will begin burning in the presence of an ignition source.

For fuels which cannot be treated as thermally thin, such as a solid bundle of fuel, additional or alternative parameters may be required. The alternative or additional parameters can include thermal conductivity which can measure the ability of a material to conduct heat. Other parameters may be required depending on the specific fuel that is being characterized. For example, liquid fuels need to be treated in a very different manner than solid fuels, and as a result the parameters are different. Other parameters which may be specific for certain fuels or fuel configurations include: (i) emissivity, which is the ratio of the radiation emitted by a surface to the radiation emitted by a blackbody at the same temperature and (ii) heat of vaporization which is defined as the amount of heat required to convert a unit mass of a liquid at its boiling point into vapor without an increase in temperature. Any one of the above parameters may not be fixed values, but instead may vary depending on time or other external influence such as heat flux or temperature. For these cases, the fuel parameter can be described in a manner compatible with the known variation of the property, such as in a tabular format or by fitting a (typically) linear mathematical function to the parameter.

Generally, each pallet of commodity can be treated as homogeneous package of fuel, with the details of the pallet and physical racks omitted. Exemplary combustion parameters, based on commodity class, are summarized in the Combustion Parameter Table below.

Combustion Parameter Table

| | Class II | Class III | Group A Plastic |
|---|---|---|---|
| Heat Release per Unit Area (kW/m2) | 170-180 | 180-190 | 500 |
| specific heat * density * thickness (m) | 1 | 0.8 | 1 |
| Ignition Temperature (° C.) | 370 | 370 | 370 |

From the fire simulation, the FDS software or other computational code solves for the heat release and resulting heat effects including one or more sprinkler activations for each unit of time as provided in steps 88, 90. The sprinkler activations may be simultaneous or sequential. It is to be further understood that the heat release solutions define a level of fire growth through the stored commodity. It is further understood that the modeled sprinklers are thermally activated in response to the heat release profile. Therefore, for a given fire growth there is a corresponding number of sprinklers that are thermally activated or open. Again, the simulation preferably provides that upon sprinkler activation no water is deliverer. Modeling the sprinklers without the discharge of water ensures that the heat release profile and therefore fire growth is not altered by the introduction of water. The heat release and sprinkler activation solutions are preferably plotted as time-based predictive heat release and sprinkler activation profiles 400 in steps 88, 90 as seen, for example, in FIG. 4. Alternatively or in addition to the heat release and sprinkler activation profile, a schematic plot of the sprinkler activations can be generated showing locations of activated sprinklers relative to the storage array and ignition point time of activation and heat release at time of activation.

Predictive profiles 400 of FIG. 4 provide illustrative examples of predictive heat release profile 402 and predictive sprinkler activation profile 404. Specifically, predictive heat release profile 402 shows the amount of anticipated heat release in the storage area 70 over time, measured in kilowatts (KW), from the stored commodity in a modeled fire scenario. The heat release profile provides a characterization of a fire's growth as it burns through the commodity and can be measured in other units of energy such as, for example, British Thermal Units (BTUs). The fire model preferably characterizes a fire growth burning through the commodity 50 in the storage area 70 by solving for the change in anticipated or calculated heat release over time. Predictive sprinkler activation profile 404 is shown to preferably include a point defining a designed or user specified maximum sprinkler operational area 27. A specified maximum sprinkler operational area 27 can, for example, be specified to be about 2000 square feet, which is the equivalent to twenty (20) sprinkler activations based upon a ten-by-ten foot sprinkler spacing. Specifying the maximum sprinkler operational area 27 is described in greater detail herein below. Sprinkler activation profile 404 shows the maximum fluid delivery delay period $\Delta t_{max}$. Time zero, $t_o$, is preferably define by the moment of initial sprinkler activation, and preferably, the maximum fluid delivery delay period $\Delta t_{max}$ is measured from time zero $t_o$ to the moment at which eighty percent (80%) of the user specified maximum sprinkler operational area 27 is activated, as seen in FIG. 4. In this example, eighty percent of maximum sprinkler operational area 27 occurs at the point of sixteen (16) sprinkler activations. Measured from time zero $t_o$, the maximum fluid delivery delay period $\Delta t_{max}$ is about twelve seconds. Setting the maximum fluid delivery delay period at the point of eighty percent maximum sprinkler operational area provides for a buffering time to allow for water introduction into the system 10 and for build-up of system pressure upon discharge from the maximum sprinkler operational area 27, i.e. compression. Alternatively, the maximum fluid delivery delay period $\Delta t_{max}$ can be defined at the moment of 100% thermal activation of the specified maximum sprinkler operational area 27.

The predictive sprinkler activation 402 also defines the point at which a minimum sprinkler operation area 28 is formed thereby further defining the minimum fluid delivery delay period $\Delta t_{min}$. Preferably, the minimum sprinkler operational area 28 is defined by a critical number sprinkler activations for the system 10. The critical number of sprinkler activations are preferably defined by a minimum initial sprinkler operation area that addresses afire with a water or liquid discharge to which the fire continues to grow in response such that an additional number of sprinklers are thermally activated to form a complete sprinkler operational area 26 for a surround and drown configuration. To introduce water into the storage area prior to the formation of the critical number of sprinklers may perhaps impede the fire growth thereby preventing thermal activation of all the critical sprinklers in the minimum sprinkler operational area. The critical number of sprinkler activations are preferably dependent upon the height of the sprinkler system 10. For example, where the height to the sprinkler system is less than thirty feet, the critical number of sprinkler activations is about two to four (2-4) sprinklers. In storage areas where the sprinkler system is installed at a height of thirty feet or above, the critical number of sprinkler activations is about four sprinklers. Measured from the first predicted sprinkler activation at time zero $t_o$, the time to predicted critical sprinkler activation, i.e. two to four sprinkler activations preferably defines the minimum mandatory fluid delivery delay period $\Delta t_{min}$. In the example of FIG. 4, the minimum sprinkler operational area is defined by four sprinkler activations which is shown as being predicted to occur following a minimum fluid delivery delay period $\Delta t_{min}$ of about two to three seconds.

As previously described above, the minimum and maximum fluid delivery delay periods for a given system 10 can be selected from a range of acceptable fluid delivery delay periods. More specifically, selection of a minimum and a maximum fluid delivery period for incorporation into a physical system 10 can be such that the minimum and maximum fluid delivery delay periods fall inside the range of the $\Delta t_{min}$ and $\Delta t_{max}$ determined from the predictive sprinkler activation profiles. Accordingly, in such a system, the maximum water delay, being less than $\Delta t_{max}$ under the predictive sprinkler activation profile, would result in a maximum sprinkler operational area less than the maximum acceptable sprinkler operational area under the predictive sprinkler activation profile. In addition, the minimum fluid delivery delay period being greater than $\Delta t_{min}$ under the predictive sprinkler activation profile, would result in a minimum sprinkler operational area greater than the minimum acceptable sprinkler operational area under the predictive sprinkler activation profile.

Testing to Verify System Operation Based Upon Mandatory Fluid Delivery Delay Period The inventors have conducted fire tests to verify that dry sprinkler systems configured with a mandatory fluid delivery delay resulted in the formation of a sprinkler operational area 26 to successfully address the test fire in a surround and drown configuration. These tests were conducted for various commodities, storage configurations and storage heights. In addition, the tests were conducted for sprinkler systems installed beneath ceilings over a range of ceiling heights.

Again referring to FIGS. 2A, 2B and 2C, an exemplary test plant of a stored commodity and dry sprinkler system can be constructed as schematically shown. Simulating a storage area 70 as previously described, the test plant includes a dry pipe sprinkler system 10 installed as a ceiling-only dry pipe sprinkler system supported from a ceiling at a height of H1. The system 10 preferably constructed with a network of sprinkler heads 12 designed on a grid spacing so as to deliver a specified nominal discharge density D at a nominal discharge pressure P. The individual sprinklers 20 preferably include a deflector located from the ceiling at a distance S. Located in the exemplary plant is a stored commodity array 50 of a type C which can include any one of NFPA-13 defined Class I, II, or III commodities or alternatively Group A, Group B, or Group C plastics, elastomers, and rubbers. The array 50 can be stored to a storage height H2 to define a ceiling clearance L. Preferably, the stored array 50 defines a multi-row rack storage arrangement; more preferably a double-row storage arrangement but other storage configurations are possible. Also included is at least one target array 52 of the same or other stored commodity spaced about or adjacent the array 50 at an aisle distance W. As seen more specifically in FIG. 2C, the stored array 50 is stored beneath the sprinkler system 10 preferably beneath four sprinklers 20 in an off-set configuration.

Predictive heat release and sprinkler activation profiles can be generated for the test plant to identify minimum and maximum fluid delivery delay periods and the range in between for the system 10 and the given storage occupancy and stored commodity conjurations. A single fluid delivery delay period $\Delta t$ can be selected for testing to evaluate whether incorporating the selected test fluid delivery delay into the system 10 generated at least one sprinkler operational area 26 over the test fire effective to overwhelm and subdue the test fire in a surround and drown configuration.

The fire test can be initiated in the stored array 50 and permitted to run for a test period T. During the test period T the array 50 burns to thermally activate one or more sprinklers 12. Fluid delivery to any of the activated sprinklers is delayed for the selected fluid delivery delay period $\Delta t$ to permit the fire to burn and thermally activate a number of sprinklers. If the test results in the successful surround and drown of the fire, the resulting set of activated sprinklers at the end of the fluid delivery delay period define the sprinkler operational area 26. At the end of the test period T, the number of activated sprinklers forming the sprinkler operational area 26 can be counted and compared to the number of sprinklers predicted to be activated at time $\Delta t$ from the predictive sprinkler activation profile. Provided below is a discussion of eight test scenarios used to illustrate the effect of the fluid delivery delay to effectively form a sprinkler operational area 26 for addressing a fire with a surround and drown configuration. Details of the tests, their set-up and results are provide in the U.L. test report entitled, "Fire Performance Evaluation of Dry-pipe Sprinkler Systems for Protection of Class II, III and Group A Plastic Commodities Using K-16.8 Sprinkler: Technical Report Underwriters Laboratories Inc. Project 06NK05814, EX4991 for Tyco Fire & Building Products 06-02-2006," which is incorporated herein in its entirety by reference.

EXAMPLE 1

A sprinkler system 10 for the protection of Class II storage commodity was constructed as a test plant and modeled to generate the predictive heat release and sprinkler activation profiles. The test plant room measured 120 ft.×120 ft. and 54 ft. high. The test plant included a 100 ft.×100 ft. adjustable height ceiling which permitted the ceiling height of the plant to be variably set. The system parameters included Class II commodity in multiple-row rack arrangement stored to a height of about thirty-four (34 ft.) located in a storage area having a ceiling height of about forty feet (40 ft.). The dry sprinkler system 10 included one hundred 16.8 K-factor upright specific application storage sprinklers 20 having a nominal RTI of 190 $(\text{ft-sec.})^{1/2}$ and a thermal rating of 286° F. on ten foot by ten foot spacing. The sprinkler system 10 was located about seven inches (7 in.) beneath the ceiling and supplied with a looped piping system. The sprinkler system 10 was configured to provide a fluid delivery having a nominal discharge density of about 0.8 $\text{gpm/ft}^2$ at a nominal discharge pressure of about 22 psi.

Figure 5:
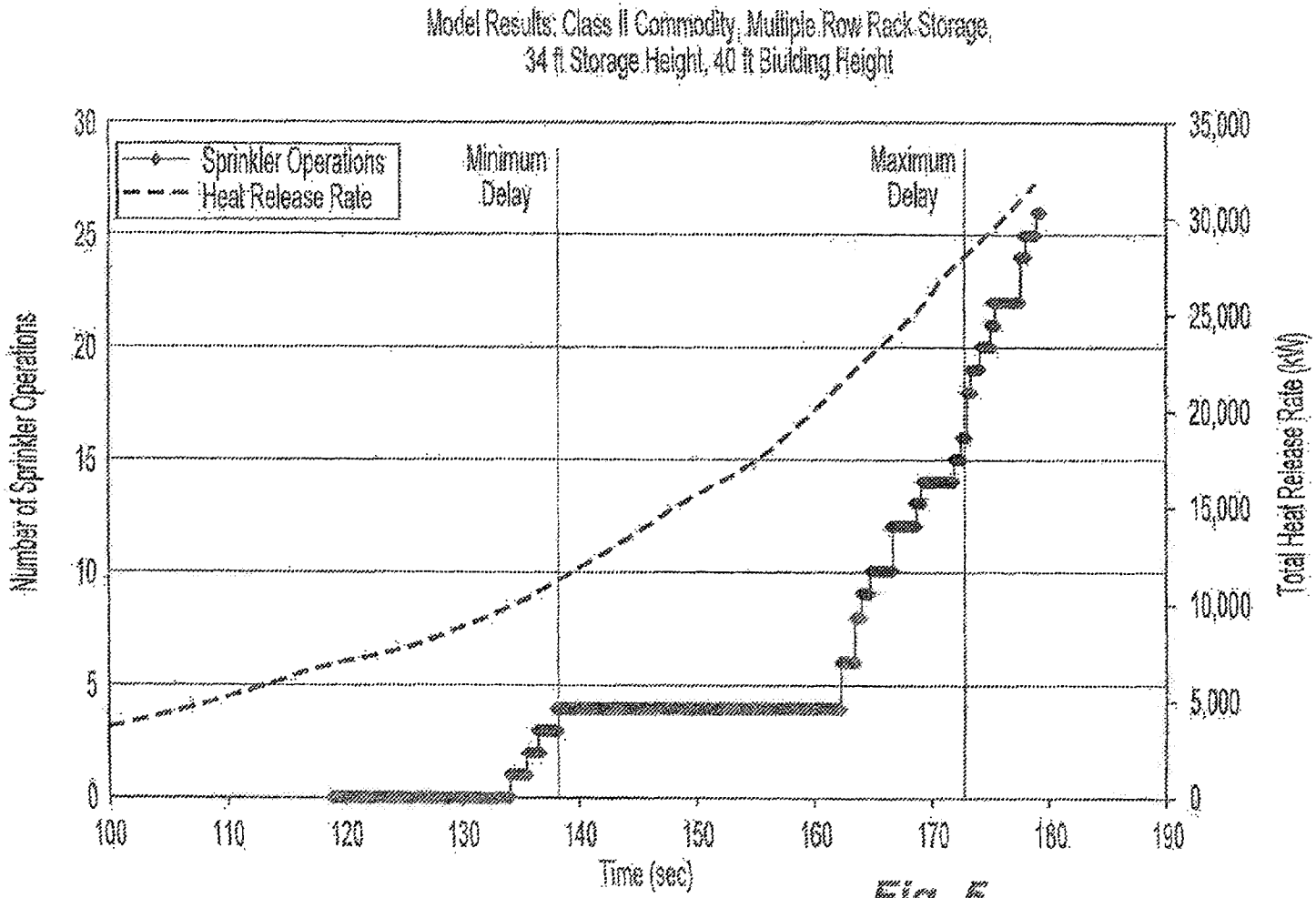
FIG. 5 is a predictive heat release and sprinkler activation profile for a stored commodity in a test storage area.

The test plant was modeled to develop the predictive heat release and sprinkler activation profile as seen in FIG. 5. From the predictive, profiles, eighty percent of the specified maximum sprinkler operational area 26 totaling about sixteen (16) sprinklers was predicted to form following a maximum fluid delivery delay period of about forty seconds (40 s.). A minimum fluid delivery delay period of about four seconds (4 s.) was identified as the time lapse to the predicted thermal activation of the minimum sprinkler operational area 28 formed by four critical sprinklers for the given ceiling height H1 of forty feet (40 ft.). The first sprinkler activation was predicted to occur at about two minutes and fourteen seconds (2:14) after ignition. A fluid-delivery delay period of thirty seconds (30 s.) was selected from the ranges between the maximum and minimum fluid delivery delay periods for testing.

In the test plant, the main commodity array 50 and its geometric center was stored beneath four sprinklers in an off-set configuration. More specifically, the main array 54 of Class II commodity was stored upon industrial racks utilizing steel upright and steel beam construction. The 32 ft. long by 3 ft. wide rack members were arranged to provide a multiple-row main rack with four 8 ft. bays and seven tiers in four rows. Beam tops were positioned in the racks at vertical tier heights of 5 ft. increments above the floor. A single target array 52 was spaced at a distance of eight feet (8 ft.) from the main array. The target array 52 consisted of industrial, single-row rack utilizing steel upright and steel beam construction. The 32 ft. long by 3 ft. wide rack system was arranged to provide a single-row target rack with three 8 ft. bays. The beam tops of the rack of the target array 52 were positioned on the floor and at 5 ft. increments above the floor. The bays of the main and target arrays 14, 16 were loaded to provide a nominal six inch longitudinal and transverse flue space throughout the array. The main and target array racks were approximately 33 feet tall and consisted of seven vertical bays. The Class II commodity was constructed from double tri-wall corrugated cardboard cartons with five sided steel stiffeners inserted for stability. Outer carton measurements were a nominal 42 in. side×42 in long×42 in tall on a single nominal 42 in wide×42 in. long×5 in. tall hardwood two-tray entry pallet. The double tri-wall cardboard carton weighed about 84 lbs. and each pallet weighed approximately about 52 lbs. The overall storage height was 34 ft.-2 in. (nominally 34 ft.), and the movable ceiling was set to 40 ft.

An actual fire test was initiated twenty-one inches off-center from the center of the main array 54 and the test was run for a test period T of thirty minutes (30 min). The ignition source were two half-standard cellulose cotton igniters. The igniters were constructed from a three inch by three inch (3 in×3 in) long cellulose bundle soaked with 4-oz. of gasoline and wrapped in a polyethylene bag. Following thermal activation of the first sprinkler in the system 10, fluid delivery and discharge was delayed for a period of thirty seconds (30 s.) by way of a solenoid valve located after the primary water control valve. Table 1 below provides a summary table of both the model and test parameters. In addition Table 1 provides the predicted sprinkler operational area and fluid delivery delay period next to the measured results from the test.

TABLE 1

| PARAMETERS | MODEL | TEST |
|---|---|---|
| Storage Type | Multiple Row Rack | Multiple Row Rack |
| Commodity Type | Class II | Class II |
| Nominal Storage Height (H2) | 34 ft | 34 ft |
| Nominal Ceiling Height (H1) | 40 ft | 40 ft |
| Nominal Clearance (L) | 6 ft | 6 ft |
| Ignition Location | Under 4, Offset | Under 4, Offset |
| Temperature Rating ° F. | 286 | 286 |
| Nominal 5 mm. Glass Bulb - Response Time Index $(ft\text{-}sec)^{1/2}$ | 190 | 190 |
| Deflector to Ceiling (S) | 7 in | 7 in |
| Nominal Sprinkler Discharge Coefficient $K(gpm/psi^{1/2})$ | 16.8 | 16.8 |
| Nominal Discharge Pressure (psi) | 22 | 22 |
| Nominal Discharge Density $(gpm/ft^2)$ | 0.79 | 0.79 |
| Aisle Width (W) | 8 ft | 8 ft |
| Sprinkler Spacing (ft × ft) | 10 × 10 | 10 × 10 |
| Fluid delivery Delay Period (Δt) | 30 sec | 30 sec |
| RESULTS | | |
| Length of Test (min:s) | 30:00 | 30:00 |
| First Ceiling Sprinkler Operation (min:s) | 2:14 | 2:31 |

TABLE 1-continued

| PARAMETERS | MODEL | TEST |
|---|---|---|
| Water to Sprinklers (min:s) | | 3:01 |
| Number of Sprinklers at Time of Fluid delivery | Approx 10 | 10 |
| Last Ceiling Sprinkler Operation (min:s) | | 3:11 |
| System Pressure at 22 psi | | 3:11 |
| Number of Operated Ceiling Sprinklers at Time of System Pressure | 19 | 14 |
| Peak Gas Temperature at Ceiling Above Ignition ° F. | | 1763 |
| Maximum 1 Minute Average Gas Temperature at Ceiling Above Ignition ° F. | | 1085 |
| Peak Steel Temperature at Ceiling Above Ignition ° F. | | 455 |
| Maximum 1 Minute Average Steel Temperature Above Ignition ° F. | | 254 |
| Fire Spread Across Aisle | | No |
| Fire Spread Beyond Extremities | | No |

The test results verify that a specified fluid delivery of thirty seconds (30 sec.) can modify a fire growth to activate a set of sprinklers and form a sprinkler operational area 26 to address a fire in a surround and drown configuration. More specifically, the predictive sprinkler activation profile identified a fire growth resulting in about ten (10) sprinkler activations, as shown in FIG. 5, immediately following the thirty second fluid delivery delay period. In the actual fire test, ten (10) sprinkler activations resulted following the thirty second (30 sec.) fluid delivery delay period, as predicted. An additional four sprinklers were activated in the following ten seconds (10 sec.) at which point the sprinkler system achieved the discharge pressure of 22 psi. to significantly impact fire growth. Accordingly, a total of fourteen sprinklers were activated to form a sprinkler operational area 26 forty seconds (40 sec.) following the first sprinkler activation. The model predicted over the same forty second period a sprinkler activation total of about nineteen sprinklers. The correspondence between the modeled and actual sprinkler activations is closer than would appear due to the fact that the final three of the nineteen activated Sprinklers in the model were predicted to activate in the thirty-ninth second of the forty second period. Further, the model provides a conservative result in that the model does not account for the transition period between the arrival of delivered water at the sprinkler operational area to the time fall discharge pressure is achieved.

The test results show that a correctly predicted fluid delivery delay results in the formation of an actual sprinkler operational area 26 made up of fourteen activated sprinklers which effectively addressed the fire as predicted as evidenced by the fact that the last thermal activation of a sprinkler occurred in just over 3 minutes from the moment of ignition and no additional sprinkler activations occurred for the next 26 minutes of the test period. Additional features of dry sprinkler system 10 performance were observed such as, for example, the extent of the damage to the commodity of the behavior of the fire relative to the storage. For the test summarized in Table 1, it was observed that the fire and damage remained limited to the main commodity array 50.

Figure 5A:
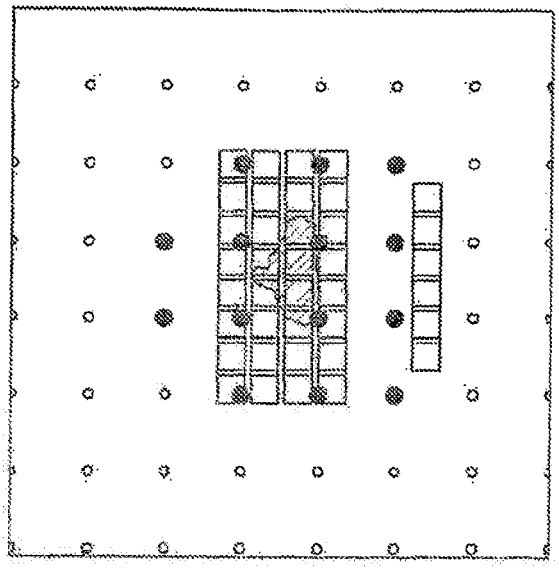
FIG. 5A is a sprinkler activation profile from an actual fire test of the stored commodity of FIG. 5.

Shown in FIG. 5A is a graphical plot of the sprinkler activations indicating the location of each actuated sprinkler relative to the ignition locus. The graphical plot provides an indicator of the amount of sprinkler skipping, if any. More specifically, the plot graphically shows the concentric rings of sprinkler activations proximate the ignition locus, and the location of unactuated sprinklers within one or more rings to indicate a sprinkler skip. According to the plot of FIG. 5A corresponding to Table 1 there was no skipping.

EXAMPLE 2

In a second fire test, a sprinkler system 10 for the protection of Class III storage commodity was modeled and tested in the test plant room. The system parameters included Class III commodity in a double-row rack arrangement stored to a height of about thirty feet (30 ft.) located in a storage area having a ceiling height of about thirty-five feet (35 ft.). The dry sprinkler system 10 included one hundred 16.8 K-factor upright specific application storage sprinklers having a nominal RTI of 190 (ft-sec.)$^{1/2}$ and a thermal rating of 286° F. on ten foot by ten foot (10 ft.×10 ft.) spacing. The sprinkler system was located about seven inches (7 in.) beneath the ceiling.

Figure 6:
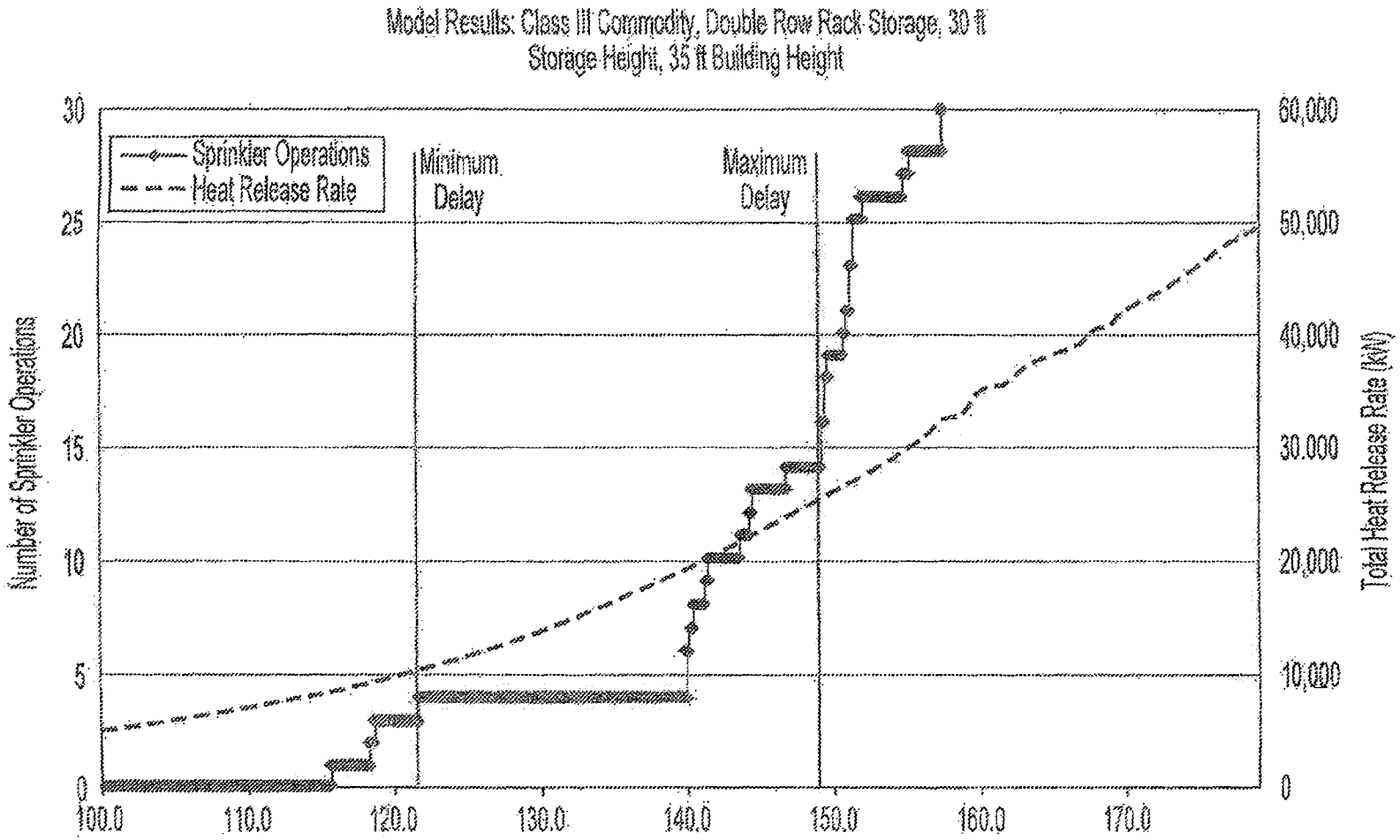
FIG. 6 is another predictive heat release and sprinkler activation profile for another stored commodity in a test storage area.

The system 10 was modeled as normalized to develop a predictive heat release and sprinkler activation profile as seen in FIG. 6. From the predictive profiles, eighty percept Of the maximum sprinkler operational area 27, totaling about sixteen (16) sprinklers was predicted to occur following a maximum fluid delivery delay period of about thirty-five seconds (35 s.). A minimum fluid delivery delay period of about five seconds (5 s.) was identified as the time lapse to the predicted thermal activation of the four critical sprinklers for the given ceiling height H1 of thirty-five feet. (35 ft.). The first sprinkler activation was predicted to occur at about one minute and fifty-five seconds (1:55) after ignition. A fluid delivery delay period Of thirty-three seconds (33 s.) was selected from the range between the maximum and minimum fluid delivery delay periods for testing.

In the test plant, the main commodity array 50 and its geometric center was stored beneath four sprinklers in an off-set configuration. More specifically, the main array 54 of Class III commodity was stored upon industrial racks utilizing steel upright and steel beam contraction. The 32 ft. long by 3 ft. wide rack members were arranged to provide a double-row main rack with four 8 ft. bays. Beam tops were positioned in the racks at vertical tier heights of 5 ft. increments above the floor. Two target arrays 52 were each spaced at a distance of eight feet (8 ft.) about the main array. Each target array 52 consisted of industrial singled-row rack utilizing steel upright and steel beam construction. The 32 ft. long by 3 ft. wide rack system was arranged to provide a single-row target rack with three 8 ft. bays. The beam tops of the rack of the target array 52 were positioned on the floor and at 5 ft. increments above the floor. The bays of the main and target arrays 14, 16 were loaded to provide a nominal six inch longitudinal and transverse flue space throughout the array. The main and target array racks were approximately 29 feet tall and consisted of six vertical bays. The standard Class III commodity was constructed from paper cups (empty, 8 oz. size) compartmented in single wall, corrugated cardboard cartons measuring 21 in.×21 in.×21 in. Each carton contains 125 cups, 5 layers of 25 cups. The compartmentalization was accomplished with single-wall corrugated cardboard sheets to separate the five layers and vertical interlocking single wall corrugated cardboard dividers to separate the five rows and five columns of each layer. Eight cartons are loaded on a two-way hardwood pallet, approximately. 42 in.×42 in.×5 in. The pallet weighs approximately 119 lbs. of which about 20% is paper cups, 43% is wood and 37% is corrugated cardboard. The overall storage height was 30 ft., and the movable ceiling was set to 35 ft.

An actual fire test was initiated twenty-one inches off-center from the center of the main array 114 and the test was run for a test period T of thirty minutes (30 min). The ignition source were two half-standard cellulose cotton igniters. The igniters were constructed from a three inch by three inch (3 in×3 in) long cellulose bundle soaked with 4-oz. of gasoline and wrapped in a polyethylene bag. Following thermal activation of the first sprinkler in the system 10, fluid delivery and discharge was delayed for a period thirty-three seconds (33 s.) by way of a solenoid valve located after the primary water control valve. Table 2 below provides a summary table of both the model and test parameters. In addition, Table 2 provides the predicted sprinkler operational area 26 and selected fluid delivery delay period next to the measured results from the test.

TABLE 2

| PARAMETERS | MODEL | TEST |
|---|---|---|
| Storage Type | Row Double Rack | Double Row Rack |
| Commodity Type | Class III | Class III |
| Nominal Storage Height (H2) | 30 ft | 30 ft |
| Nominal Ceiling Height (H1) | 35 ft | 35 ft |
| Nominal Clearance (L) | 5 ft | 5 ft |
| Ignition Location | Under 4, Offset | Under 4, Offset |
| Temperature Rating ° F. | 286 | 286 |
| Nominal 5 mm. Glass Bulb - Response Time Index (ft-sec)$^{1/2}$ | 190 | 190 |
| Deflector to Ceiling (S) | 7 in | 7 in |
| Nominal Sprinkler Discharge Coefficient K (gpm/psi$^{1/2}$) | 16.8 | 16.8 |
| Nominal Discharge Pressure (psi) | 22 | 22 |
| Nominal Discharge Density (gpm/ft$^2$) | 0.79 | 0.79 |
| Aisle Width (W) | 8 ft | 8 |
| Sprinkler Spacing (ft × ft) | 10 × 10 | 10 × 10 |
| Fluid delivery Delay Period (Δt) | 33 sec | 33 sec |
| RESULTS | | |
| Length of Test (min:s) | 30:00 | 30:00 |
| First Ceiling Sprinkler Operation (min:s) | 1:55 | 2:03 |
| Water to Sprinklers (min:s) | | 2:36 |
| Number of Sprinklers at Time of Fluid delivery | Approx 16 | 16 |
| Last Ceiling Sprinkler Operation (min:s) | | 2:03 |
| System Pressure at 22 psi | | 2:40 |
| Number of Operated Ceiling Sprinklers at Time of System Pressure | 16 | 16 |
| Peak Gas Temperature at Ceiling Above Ignition ° F. | | 1738 |
| Maximum 1 Minute Average Gas Temperature at Ceiling Above Ignition ° F. | | 1404 |
| Peak Steel Temperature at Ceiling Above Ignition ° F. | | 596 |
| Maximum 1 Minute Average Steel Temperature Above Ignition ° F. | | 466 |
| Fire Spread Across Aisle | | No |
| Fire Spread Beyond Extremities | | No |

The predictive profiles identified a fire growth corresponding to a prediction of about fourteen (14) sprinkler activations following a thirty-three second fluid delivery delay. The actual fire test resulted in 16 sprinkler activations immediately following the thirty-three second (33 sec.) fluid delivery delay period. No additional sprinklers were activated in the subsequent two seconds (2 sec.) at which point the sprinkler system achieved the discharge pressure of 22 psi. to significantly impact fire growth. Accordingly, a total of sixteen sprinklers were activated to form a sprinkler operational area 26, thirty-five seconds (35 sec.) following the first sprinkler activation. The model predicted over the same thirty-five second period, a sprinkler activation total also of about sixteen sprinklers as indicated in FIG. 6.

Employing a fluid delivery delay period in the system 10 resulted in the formation of an actual sprinkler operational area 26, made up of sixteen (16) activated sprinklers, which effectively addressed the fire as predicted as evidenced by the fact that the last thermal activation of a sprinkler occurred in just under three minutes from the moment of ignition and no additional sprinkler activations occurred for the next twenty-seven minutes of the test period. Additional of dry sprinkler system 10 performance were observed such as, for example, the extent of the damage to the commodity or the behavior of the fire relative to the storage. For the test summarized in Table 2, it was observed that the fire and damage remained limited to the main commodity array 54.

Figure 6A:
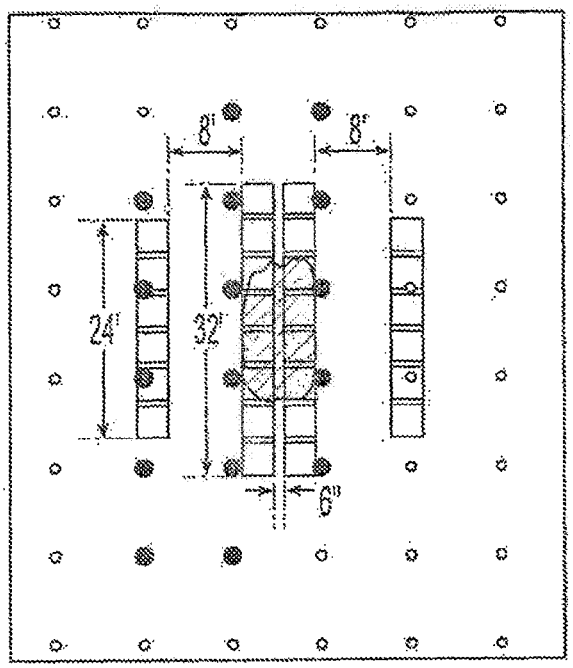
FIG. 6A is a sprinkler activation profile from an actual fire test of the stored commodity of FIG. 6.

Shown in FIG. 6A is the graphical plot of the sprinkler actuations indicating the location of each actuated sprinkler relative to the ignition locus. The graphical plot shows two concentric rings of sprinkler activation radially emanating from the ignition locus. No sprinkler skipping is observed.

EXAMPLE 3

In a third fire test, a sprinkler system 10 for the protection of Class III storage commodity was modeled and tested in the test plant room. The system parameters included Class III commodity in a double-row rack arrangement stored to a height of about forty feet (40 ft.) located in a storage area having a ceiling height of about forty-three feet (43 ft.). The dry sprinkler system 10 included one hundred 16.8 K-factor upright specific application storage sprinklers having a nominal RTI of 190 $(\text{ft-sec.})^{1/2}$ and a thermal rating of 286° F. on ten foot by ten foot (10 ft.×10 ft.) spacing. The sprinkler system was located about seven inches (7 in.) beneath the ceiling.

Figure 7:
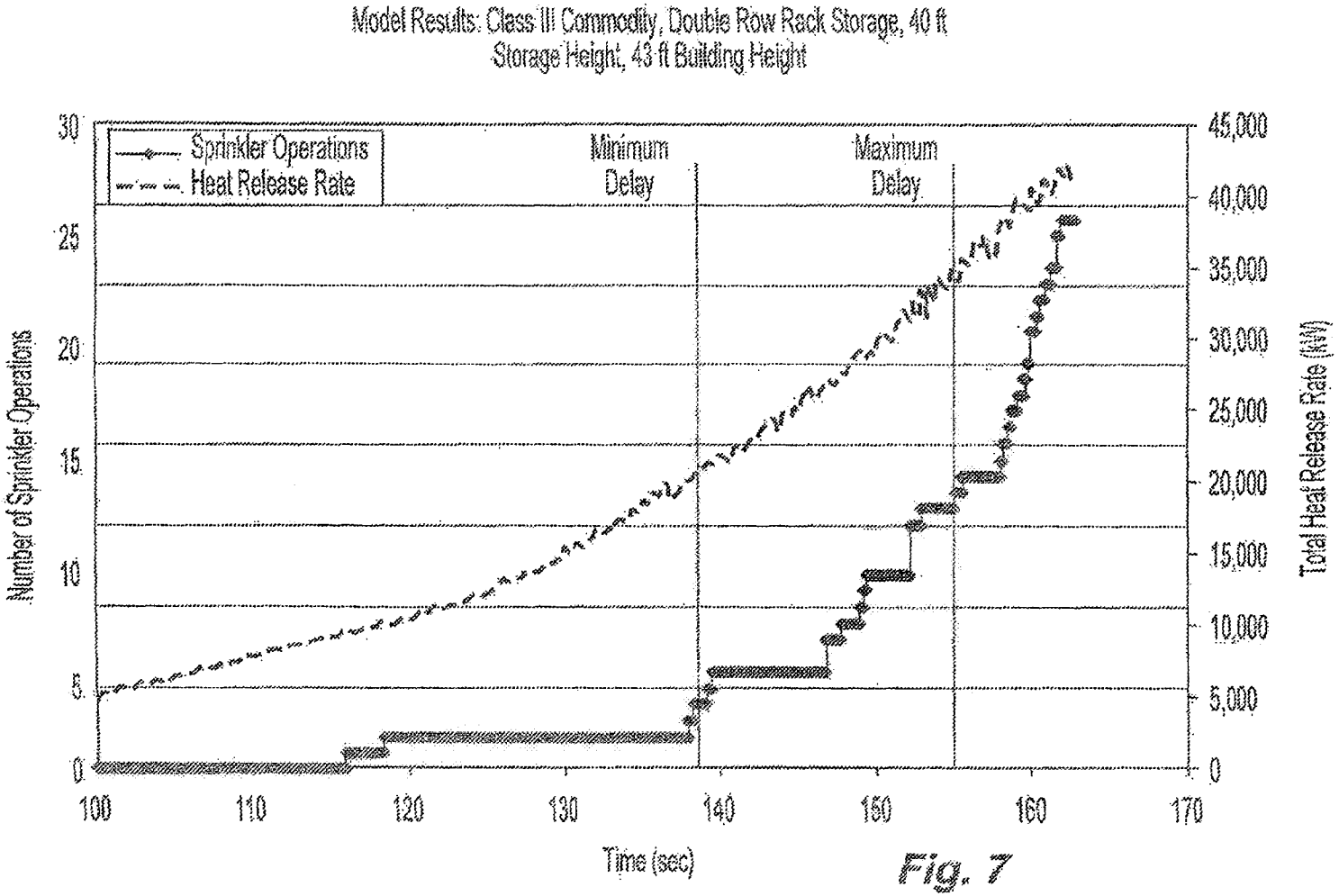
FIG. 7 is yet another predictive heat release and sprinkler activation profile for yet another a stored commodity in a test storage area.

The test plant was modeled as normalized to develop a predictive heat release and sprinkler activation profile as seen in FIG. 7. From the predictive profiles, eighty percent of the specified maximum sprinkler operational area 27, totaling of about sixteen (16) sprinklers, was predicted to occur following a maximum fluid delivery delay period of about thirty-nine seconds (39 s.). A minimum fluid delivery delay period of about twenty to about twenty-three seconds (20-23 s.) was identified as the time lapse to the predicted thermal activation of the four critical sprinklers for the given ceiling height H1 of forty-three feet (43 ft.). The first sprinkler activation was predicted to occur at about one minute fifty-five seconds (1:55) after ignition. A fluid delivery delay period of twenty-one seconds (21 s.) was selected from the range between the maximum and minimum fluid delivery delay periods for testing.

In the test plant, the main commodity array 30 and its geometric center was stored beneath four sprinklers in an off-set configuration. More specifically, the main array 54 of Class III commodity was stored upon industrial racks utilizing steel upright and steel beam construction. The 32 ft. long by 3 ft. wide rack members were arranged to provide a double-row main rack with four 8 ft. bays. Beam tops were positioned in the racks at vertical tier heights of 5 ft. increments above the floor. Two target arrays 52 were each spaced at a distance of eight feet (8 ft.) about the main array. Each target array 52 consisted of industrial, single-row rack utilizing steel upright and steel beam construction. The 32 ft. long by 3 ft wide rack system was arranged to provide a single-row target rack with three 8 ft. bays. The beam tops of the rack of the target array 52 were positioned on the floor and at 5 ft. increments above the floor. The bays of the main and target arrays 14, 16 were loaded to provide a nominal six-inch longitudinal and transverse flue space throughout the array. The main and target array racks were approximately 38 feet tall and consisted of eight vertical bays. The standard Class III commodity was constructed from paper cups (empty, 8 oz. size) compartmented in single wall, corrugated cardboard cartons measuring 21 in.×21 in.×21 in. Each carton contains 125 cups, 5 layers of 25 cups. The compartmentalization was accomplished with single wall corrugated cardboard sheets to separate the five layers and vertical interlocking single wall corrugated cardboard dividers to separate the five rows and five columns of each layer. Eight cartons are loaded on a two-way hardwood pallet, approximately 42 in.×42 in.×5 in. the pallet weighs approximately 119 lbs. of which about 20% is paper cups, 43% is wood and 37% is corrugated cardboard. The overall storage height was 39 ft.-1 in. (nominally 40 ft.), and the movable ceiling was set to 43 ft.

An actual fire test was imitated twenty-one inches off-center from the center of the main array 114 and the test was fun for a test period T of thirty minutes (30 min). The ignition source were two half-standard cellulose cotton igniters. The igniters were constructed from a three inch by three inch (3 in×3 in) long cellulose bundle soaked with 4-oz. of gasoline, and wrapped in a polyethylene bag. Following thermal activation of the first sprinkler in the system 10, fluid delivery and discharge was delayed for a period of twenty-one seconds (21 s.) by way of a solenoid valve located after the primary water control valve. Table 3 below provides a summary table of both the model and test parameters. In addition, Table 3 provides the predicted sprinkler operational area 26 and selected fluid delivery delay results from the test.

TABLE 3

| PARAMETERS | MODEL | TEST |
|---|---|---|
| Storage Type | Double Row Rack | Double Row Rack |
| Commodity Type | Class III | Class III |
| Nominal Storage Height (H2) | 40 ft | 40 ft |
| Nominal Ceiling Height (H1) | 43 ft | 43 ft |
| Nominal Clearance (L) | 3 ft | 3 ft |
| Ignition Location | Under 4, Offset | Under 4, Offset |
| Temperature Rating ° F. | 286 | 286 |
| Nominal 5 mm. Glass Bulb - Response Time Index $(\text{ft-sec})^{1/2}$ | 190 | 190 |
| Deflector to Ceiling (S) | 7 in | 7 in |
| Nominal Sprinkler Discharge Coefficient K $(\text{gpm/psi}^{1/2})$ | 16.8 | 16.8 |
| Nominal Discharge Pressure (psi) | 30 | 30 |
| Nominal Discharge Density $(\text{gpm/ft}^2)$ | 0.92 | 0.92 |
| Aisle Width (W) | 8 ft | 8 |
| Sprinkler Spacing (ft × ft) | 10 × 10 | 10 × 10 |
| Fluid delivery Delay Period (Δt) | 21 sec | 21 sec |
| RESULTS | | |
| Length of Test (min:s) | 30:00 | 30:00 |
| First Ceiling Sprinkler Operation (min:s) | 1:55 | 1:54 |
| Water to Sprinklers (min:s) | | 2:15 |
| Number of Sprinklers at Time of Fluid delivery | Approx 12 | — |
| Last Ceiling Sprinkler Operation (min:s) | | 2:33 |
| System Pressure at 22 psi | | 2:40 |
| Number of Operated Ceiling Sprinklers at Time of System Pressure | 16 | 21 |
| Peak Gas Temperature at Ceiling Above Ignition ° F. | | 1432 |
| Maximum 1 Minute Average Gas Temperature at Ceiling Above Ignition ° F. | | 1094 |
| Peak Steel Temperature at Ceiling Above Ignition ° F | | 496 |
| Maximum 1 Minute Average Steel Temperature Above Ignition ° F. | | 383 |
| Fire Spread Across Aisle | | No |
| Fire Spread Beyond Extremities | | No |

The predictive profiles identified a fire growth resulting in about two (2) to three (3) predicted sprinkler activations following a twenty-one second fluid delivery delay. No additional sprinklers were activated in the subsequent two seconds (2 sec.) at which point the sprinkler system achieved the discharge pressure of 22 psi. to significantly impact fire growth. Accordingly, a total of twenty (20) sprinklers were activated to form a sprinkler operational area 26, thirty seconds (30 sec.) following the first sprinkler activation. The model predicted over the same thirty second period a sprinkler activation total also of about six (6) sprinklers as indicated in FIG. 7.

Figure 7A:
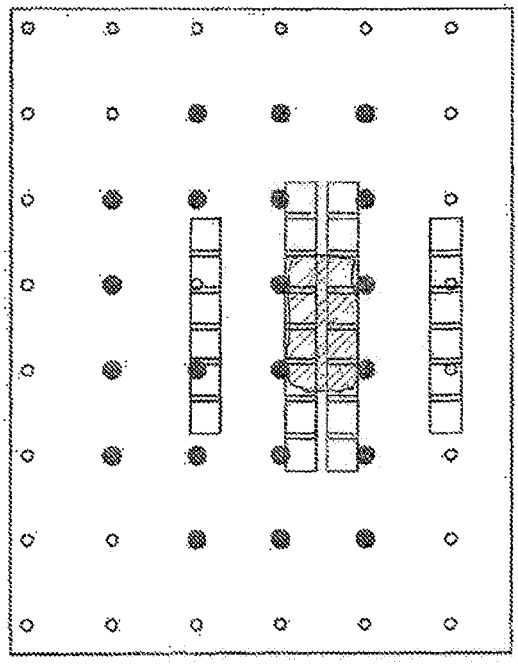
FIG. 7A is a sprinkler activation profile from an actual fire test of the stored commodity of FIG. 7.

Shown in FIG. 7A is the graphical plot of the sprinkler actuations indicating the location of each actuated sprinkler relative to the ignition locus. The graphical plot shows two concentric rings of sprinkler activation radially emanating from the ignition locus. A single sprinkler skip in the first ring is observed.

EXAMPLE 4

In a fourth fire test, a sprinkler system 10 for the protection of Class III storage commodity was modeled and tested. The system parameters included Class III commodity in a double-row rack arrangement stored to a height of about forty feet (40 ft.) located in a storage area having a ceiling height of about forty-five feet (45.25 ft.). The dry sprinkler system 10 included one hundred 16.8 K-factor upright specific application storage sprinklers having a nominal RTI of 190 (ft-sec.)$^{1/2}$ and a thermal rating of 286° F. on ten foot by ten foot (10 ft.×10 ft.) spacing. The sprinkler system was located about seven inches (7 in.) beneath the ceiling.

Figure 8:
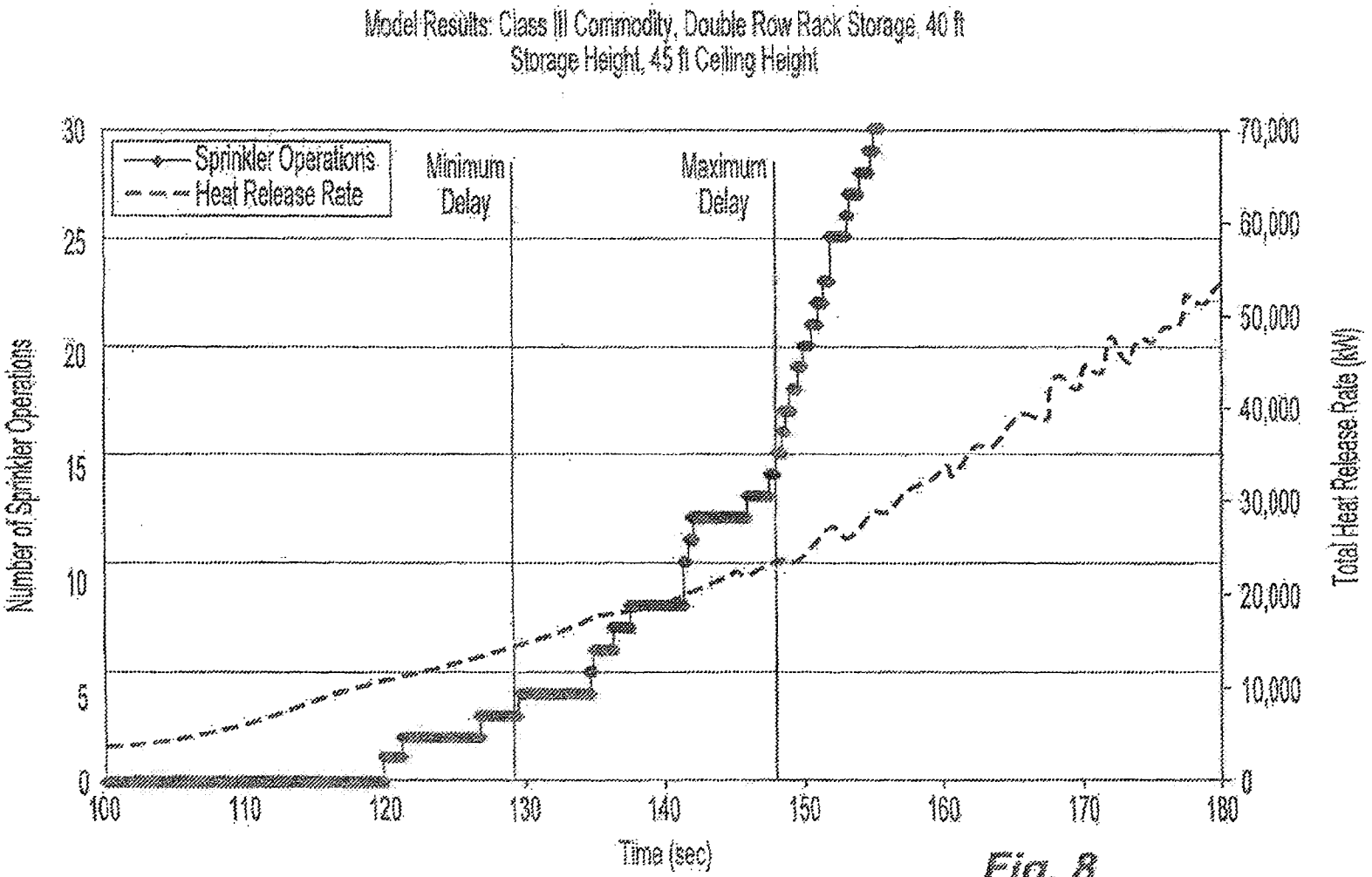
FIG. 8 is another predictive heat release and sprinkler activation profile for another stored commodity in a test storage area.

The test plant was modeled as normalized to develop a predictive heat release and sprinkler activation profile as seen in FIG. 8. From the predictive profiles, eighty percent of the maximum sprinkler operational area 27 having a total of about sixteen (16) sprinklers was predicted to occur following a maximum fluid delivery delay period of about twenty-eight seconds (28 s.). A minimum fluid delivery delay period of about ten seconds (10 s.) was identified as the time lapse to the thermal activation of the four critical sprinklers for the given ceiling height H1 of forty-five feet (45%). The first sprinkler activation was predicted to occur at about two minutes (2:00) after ignition. A fluid delivery delay period of sixteen seconds (16 s.) was selected from the range between the maximum and minimum fluid delivery delay periods for testing.

In the test plant, the main commodity array 50 and its geometric center was stored beneath four sprinklers in an off-set configuration. More specifically, the main array 54 of Class III commodity was stored upon industrial racks utilizing steel upright and steel beam construction. The 32 ft. long by 3 ft. wide rack members were arranged to provide a double-row main rack with four 8 ft. bays. Beam tops were positioned in the racks at vertical tier heights of 5 ft. increments above the floor. Two target arrays 52 were each spaced at a distance of eight feet (8 ft.) about the main array. Each target array 52 consisted of industrial, single-row rack utilizing steel upright and steel beam construction. The 32 ft. long by 3 ft. wide rack system was arranged to provide a single-row target rack with three 8 ft. bays. The beam tops of the rack of the target array 52 were positioned on the floor and at 5 ft. increments above the floor. The bays of the main and target arrays 14, 16 were loaded to provide a nominal six inch longitudinal and transverse flue space throughout the array. The main and target array racks were approximately 38 feet tall and consisted of eight vertical bays. The standard Class III commodity was constructed from paper cups (empty, 8 oz. size) compartmented in single wall, corrugated cardboard cartons measuring 21 in.×21 in.×21 in. Each carton contains 125 cups, 5 layers of 25 cups. The compartmentalization was accomplished with single wall corrugated cardboard sheets to separate the five layers and vertical interlocking single wall corrugated cardboard dividers to separate the five rows and five columns of each layer. Eight cartons are loaded on a two-way hardwood pallet, approximately 42 in.×42 in.×in. The pallet weighs approximately 119 lbs. of which about 20% is paper cups, 43% is wood and 37% is corrugated cardboard. The overall storage-height was 39 ft.-1 in. (nominally 40 ft.), and the movable ceiling was set to 45.25 ft.

An actual fire test was initiated twenty-one inches off-center from the center of the main array 114 and the test was run for a test period T of thirty minutes (30 min). The ignition source were two half-standard cellulose cotton igniters. The igniters were constructed from a three inch by three inch (3 in×3 in) long cellulose bundle soaked with 4-oz. of gasoline and wrapped in a polyethylene bag. Following thermal activation of the first sprinkler in the system 10, fluid delivery discharge was delayed for a period of sixteen seconds (16 s.) by way of a solenoid valve located after the primary water control valve. Table 4 below provides a summary table of both the model and test parameters. In addition, Table 4 provides the predicted sprinkler operational area 26 and selected fluid delivery delay period next to the measured results from the test.

TABLE 4

| PARAMETERS | MODEL | TEST |
|---|---|---|
| Storage Type | Double Row Rack | Double Row Rack |
| Commodity Type | Class III | Class III |
| Nominal Storage Height (H2) | 40 ft | 40 ft |
| Nominal Ceiling Height (H1) | 45.25 ft | 45.25 ft |
| Nominal Clearance (L) | 5 ft | 5 ft |
| Ignition Location | Under 4, Offset | Under 4, Offset |
| Temperature Rating ° F. | 286 | 286 |
| Nominal 5 mm. Glass Bulb - Response Time Index (ft-sec)$^{1/2}$ | 190 | 190 |
| Deflector to Ceiling (S) | 7 in | 7 in |
| Nominal Sprinkler Discharge Coefficient K (gpm/psi$^{1/2}$) | 16.8 | 16.8 |
| Nominal Discharge Pressure (psi) | 30 | 30 |
| Nominal Discharge Density (gpm/ft$^2$) | 0.92 | 0.92 |
| Aisle Width (W) | 8 ft | 8 |
| Sprinkler Spacing (ft × ft) | 10 × 10 | 10 × 10 |
| Fluid delivery Delay Period (Δt) | — | 16 sec. |
| RESULTS | | |
| Length of Test (min:s) | 30:00 | 30:00 |
| First Ceiling Sprinkler Operation (min:s) | 2:00 | 1:29 |
| Water to Sprinklers (min:s) | | 1:45 |
| Number of Sprinklers at Time of Fluid delivery | Approx 6 | — |
| Last Ceiling Sprinkler Operation (min:s) | | 5:06 |
| System Pressure at 30 psi | | 1:50 |
| Number of Operated Ceiling Sprinklers at Time of System Pressure | 8 | 19 |
| Peak Gas Temperature at Ceiling Above Ignition ° F. | | 1600 |
| Maximum 1 Minute Average Gas Temperature at Ceiling Above Ignition ° F. | | 1017 |
| Peak Steel Temperature at Ceiling Above Ignition ° F. | | 339 |
| Maximum 1 Minute Average Steel Temperature Above Ignition ° F. | | 228 |
| Fire Spread Across Aisle | | Yes |
| Fire Spread Beyond Extremities | | No |

The predictive profiles identified a fire growth corresponding to about thirteen (13) predicted sprinkler activations following a sixteen second (16 s.) fluid delivery delay. However, for the purpose of analyzing the predictive model for this test and the impact of the sixteen second fluid delivery delay on addressing the fire, the relevant period for analysis is the time from first sprinkler activation to the moment full operating pressure is achieved. For this relevant period the model predicted eight sprinkler activations. According to the fire test, four sprinklers were activated from the moment of first sprinkler activation to the moment water was delivered at the operating pressure of 30 psi. Additional sprinkler activations occurred following the system achieving operating pressure. A total of nineteen sprinklers were operating at system pressure three minutes and thirty-seven seconds (3:37) after the first sprinkler activation to significantly impact fire growth. Accordingly, a total of nineteen (19) sprinklers were activated to form a sprinkler operational area 26, three minutes and thirty-seven seconds (3:37) following the first sprinkler activation.

Employing a fluid delivery delay period in the system 10 resulted in the formation of an actual sprinkler operational area 26, made up of nineteen (19) activated sprinklers, which effectively addressed the fire. Additional features of dry sprinkler system 10 performance were observed such as, for example, the extent of the damage to the commodity of the behavior of the fire relative to the storage. For the test summarized in Table 4, it was observed that the fire traveled from the main array 54 to the target array 56; however the damage was not observed to travel to the ends of the arrays.

EXAMPLE 5

In a fifth fire test, a sprinkler system 10 for the protection of Group A. Plastic storage commodity was modeled and tested in the test plant room. The system parameters included Group A commodity in a double-row rack arrangement stored to a height of about twenty feet (20 ft.) located in a storage area having a ceiling height of about thirty feet (30 ft). The dry sprinkler system 10 included one hundred 16.8 K-factor upright specific application storage sprinklers having a nominal RTI of 190 $(\text{ft-sec.})^{1/2}$ and a thermal rating of 286° F. on ten foot by ten foot (10 ft.×10 ft.) spacing. The sprinkler system was located about seven inches (7 in.) beneath the ceiling.

Figure 9A:
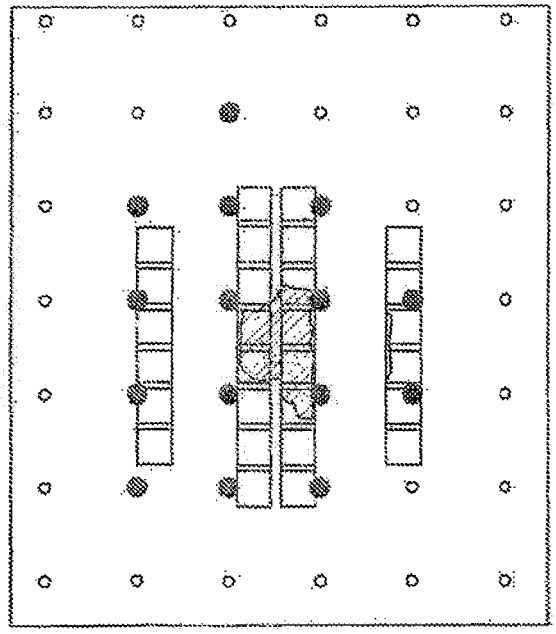
FIG. 9A is a sprinkler activation profile from an actual fire test of the stored commodity of FIG. 9.
Figure 9:
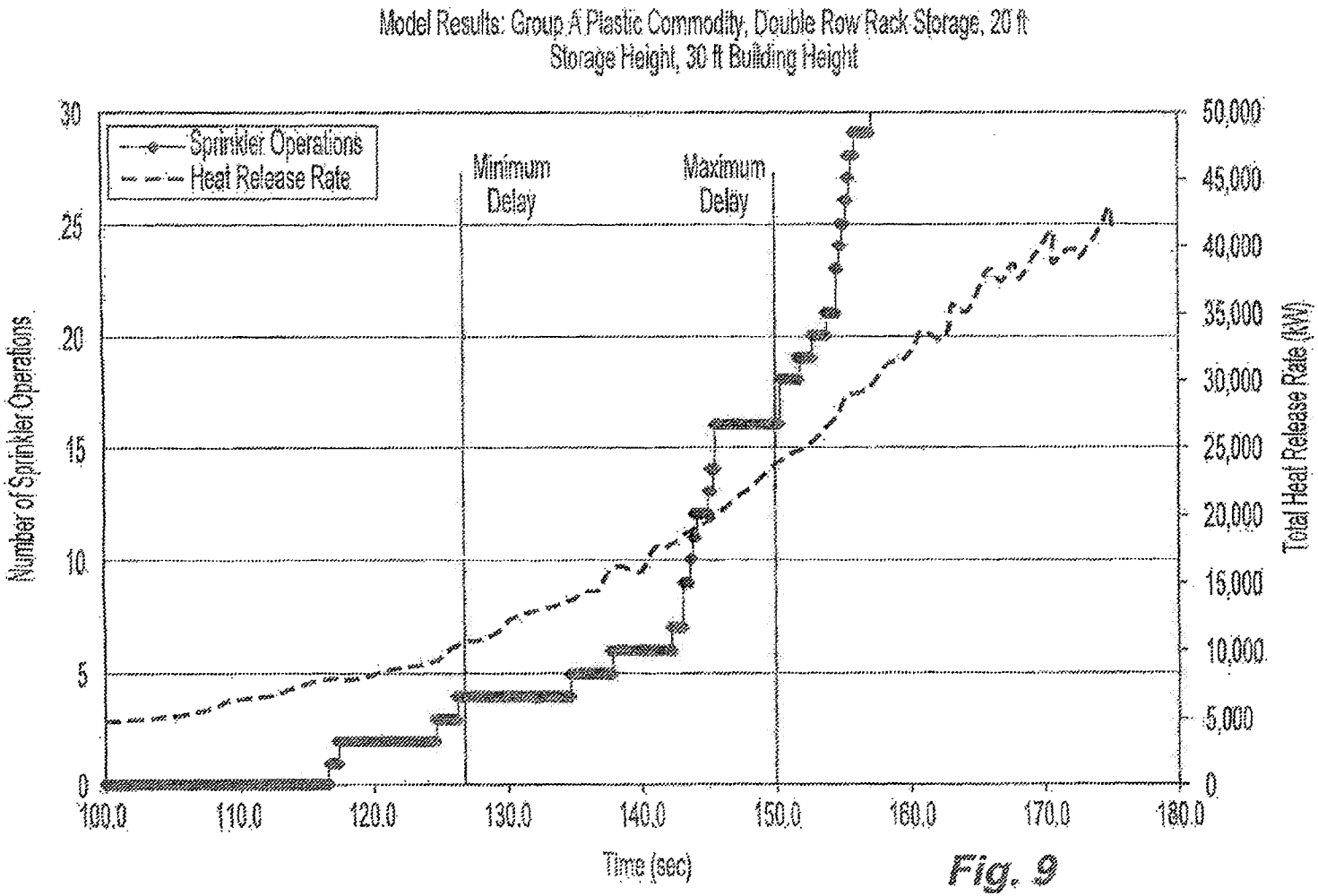
FIG. 9 is yet another predictive heat release and sprinkler activation profile for another stored commodity in a test storage area.

The test plant was modeled as normalized to develop a predictive heat release and sprinkler activation profile in FIG. 9. From the predictive profiles, eighty percent of the specified maximum sprinkler operational area 27, totaling about sixteen (16) sprinklers, was predicted to occur following a maximum fluid delivery delay period of about thirty-five seconds (35 s.). A minimum fluid delivery delay period of about ten seconds (10 s.) was identified as the time lapse to the thermal activation of the four critical sprinklers for the given ceiling height H1 of thirty feet (30 ft.). The first sprinkler activation was predicted to occur at about one minute, fifty-five seconds (1:55-1:56) after ignition. A fluid delivery delay period of twenty-nine seconds (29 s.) was selected from the range between the maximum and minimum fluid delivery delay periods for testing.

In the test plant, the main commodity array 50 and its geometric center was stored beneath four sprinklers in an off-set configuration. More specifically, the main array 54 of Group A commodity was stored upon industrial racks utilizing steel upright and steel beam construction. The 32 ft. long by 3 ft. wide rack members were arranged to provide a double-row-main rack with four 8 ft. bays. Beam tops were positioned in the racks at vertical tier heights of 5 ft. increments above the floor. Two target arrays 52 were each spaced at a distance of eight feet (8 ft.) about the main array. Each target array 52 consisted of industrial, single-row rack utilizing steel upright and steel beam construction. The 32 ft. long by 3 ft. wide rack system was arranged to provide a single-row target rack with three 8 ft. bays. The beam tops of the rack of the target array 52 were positioned on the floor and at 5 ft. increments above the floor. The bays of the main and target arrays 14, 16 were loaded to provide a nominal six inch longitudinal and transverse flue space throughout the array. The main and target array racks were approximately 19 feet tall and consisted of eight vertical bays. The standard Group A Plastic commodity was constructed from rigid crystalline polystyrene cups (empty, 16 oz. size) packaged in compartmented, single-wall, corrugated cardboard cartons. Cups are arranged in five layers, 25 per layer for a total of 125 per carton. The compartmentalization was accomplished with single wall corrugated cardboard sheets to separate the five layers and vertical interlocking single-wall corrugated cardboard dividers to separate the five rows and five columns of each layer. Eight 21-in. cube cartons, arranged 2×2×2 form a pallet load. Each pallet load is supported by a two-way, 42 in., by 42 in. by 5 in., slatted deck hardwood pallet. A pallet weighs approximately 165 lbs., of which about 40% is 31% is wood and 29% is corrugated cardboard. The overall storage height was nominally 20 ft., and the movable ceiling was set to 30 ft.

An actual fire test was initiated twenty-one inches off-center from the center of the main array 114 and the test was run for a test period T of thirty minutes (30 min). The ignition source were two half-standard cellulose cotton igniters. The igniters were constructed from a three inch by three inch (3 in×3 in) long cellulose bundle soaked with 4-oz. of gasoline and wrapped in a polyethylene bag. Following thermal activation of the first sprinkler in the system 10, fluid delivery and discharge was delayed for a period of twenty-nine seconds (29 s.) by way of a solenoid valve located after the primary water control valve. Table 5 below provides a summary table of both the model and test parameters. In addition, Table 5 provides the predicted sprinkler operational area 26 and selected fluid delivery delay period next to the measured results from the test.

TABLE 5

| PARAMETERS | MODEL | TEST |
|---|---|---|
| Storage Type | Double Row Rack | Double Row Rack |
| Commodity Type | Group A | Group A |
| Nominal Storage Height (H2) | 20 ft | 20 ft |
| Nominal Ceiling Height (H1) | 30 ft | 30 ft |
| Nominal Clearance (L) | 10 ft | 10 ft |
| Ignition Location | Under 4, Offset | Under 4, Offset |
| Temperature Rating ° F. | 286 | 286 |
| Nominal 5 mm. Glass Bulb - Response Time Index $(\text{ft-sec})^{1/2}$ | 190 | 190 |
| Deflector to Ceiling (S) | 7 in | 7in |
| Nominal Sprinkler Discharge Coefficient K $(\text{gpm/psi}^{1/2})$ | 16.8 | 16.8 |
| Nominal Discharge Pressure (psi) | 22 | 22 |
| Nominal Discharge Density $(\text{gpm/ft}^2)$ | 0.79 | 0.79 |
| Aisle Width (W) | 4 ft | 4 ft |
| Sprinkler Spacing (ft × ft) | 10 × 10 | 10 × 10 |
| Fluid delivery Delay Period (Δt) | — | 29 sec |
| RESULTS | | |
| Length of Test (min:s) | 30:00 | 30:00 |
| First Ceiling Sprinkler Operation (min:s) | 1:56 | 1:47 |
| Water to Sprinklers (min:s) | | 2:11 |
| Number of Sprinklers at Time of Fluid delivery | | — |
| Last Ceiling Sprinkler Operation (min:s) | | 2:26 |
| System Pressure at 22 psi | | 2:50 |

TABLE 5-continued

| PARAMETERS | MODEL | TEST |
|---|---|---|
| Number of Operated Ceiling Sprinklers at Time of System Pressure | | 15 |
| Peak Gas Temperature at Ceiling Above Ignition ° F. | | 1905 |
| Maximum 1 Minute Average Gas Temperature at Ceiling Above Ignition ° F. | | 1326 |
| Peak Steel Temperature at Ceiling Above Ignition ° F. | | 588 |
| Maximum 1 Minute Average Steel Temperature Above Ignition ° F. | | 454 |
| Fire Spread Across Aisle | | Yes |
| Fire Spread Beyond Extremities | | No |

According to the test results, the sprinkler system was within five percent of system operating pressure (22 psi.) thirty seconds (30 s.) following the first sprinkler activation, and system pressure was attained within 3 minutes alter ignition. The 22 psi. discharge pressure was obtained by the system such that the sprinkler 16 discharge density equaled about 0.79 gpm/ft.$^2$ substantially corresponding to the specified design criteria. Over the thirty second period following first sprinkler activation, thirteen sprinkler activations occurred. The predictive profiles identified a fire growth resulting in about twelve to thirteen (12-13) sprinkler activations following a twenty-nine second (29 s.) fluid delivery delay. A total of fifteen sprinklers were operating thirty-nine seconds (39 s.) after the first sprinkler activation to significantly impact fire growth. Accordingly, a total of fifteen (15) sprinklers were activated to form a sprinkler operational area 26, thirty-nine seconds (39 s.) following the first sprinkler activation. Thus, less than 20% of the total available sprinklers were activated. All fifteen (15) activated sprinklers were activated within a range between 110 sec. and 250 sec. after the initial ignition.

Employing a fluid delivery delay period in the system 10 resulted in the formation of an actual sprinkler operational area 26, made up of fifteen (15) activated sprinklers, which effectively addressed the fire. Additional features of dry sprinkler system 10 performance were observed such as, for example, the extent of the damage to the commodity or the behavior of fire relative to the storage. For the test summarized in Table 5, it was observed that the fire traveled from the main array 54 to the target array 56; however the fire did not breach the extremities of the test arrangement.

Shown in FIG. 9A is the graphical plot of the sprinkler activations indicating the location of each actuated sprinkler relative to the ignition locus. The graphical plot shows two concentric rings of sprinkler activation radially emanating from the ignition locus. No sprinkler skipping is observed.

EXAMPLE 6

In a sixth fire test, a sprinkler system 10 for the protection of Class II storage commodity was modeled and tested in the test plant room. The system parameters included Class II commodity in doable-row rack arrangement stored to a height of about thirty-four feet (34 ft.) located in a storage area having a ceiling height of about forty feet (40 ft.), The dry sprinkler system 10 included one hundred 16.8 K-factor upright specific application storage sprinklers 20 in a looped piping system having a nominal RTI of 190 (ft-sec.)$^{1/2}$ and a thermal rating of 286° F. on ten foot by ten foot (10 ft.×10 ft.) spacing. The sprinkler system 10 was located about seven inches (7 in.) beneath the ceiling. The sprinkler system 10 was configured to provide a fluid delivery having a nominal discharge density of about 0.8 gpm/ft$^2$ at a nominal discharge pressure of about 22 psi.

Figure 10A:
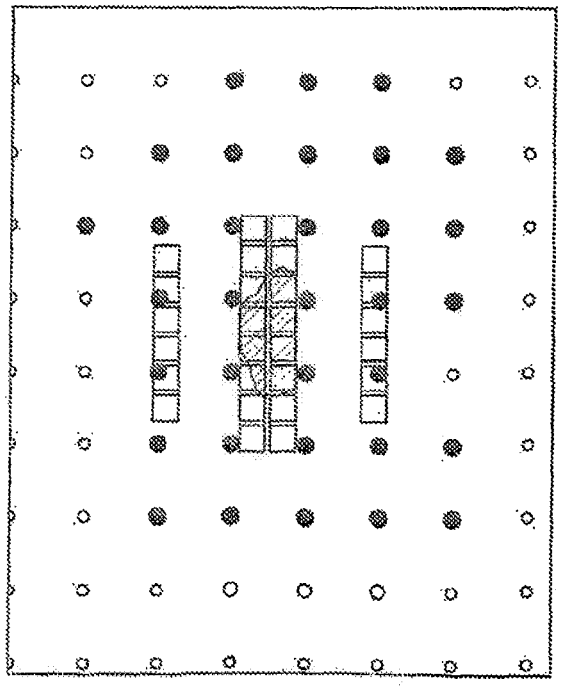
FIG. 10A is a sprinkler activation profile from an actual fire test of the stored commodity of FIG. 10.
Figure 10:
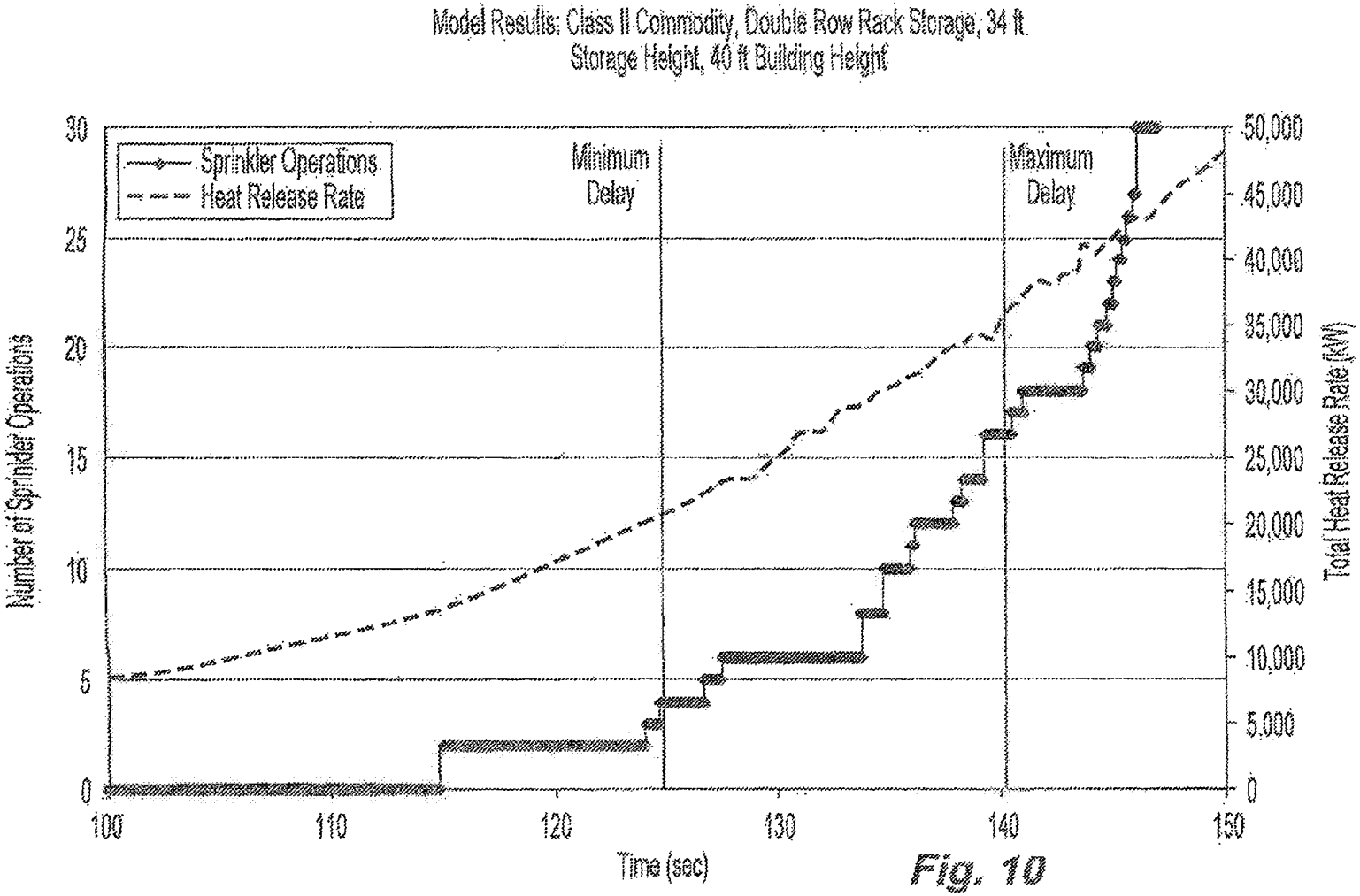
FIG. 10 is another predictive heat release and sprinkler activation profile for another stored commodity in a test storage area.

The test plant was modeled to develop the predictive heat release and sprinkler activation profile as seen in FIG. 10. From the predictive profiles, eighty percent of the specified maximum sprinkler operational area 26 totaling about sixteen (16) sprinklers was predicted to form following a maximum fluid delivery delay period of about twenty-five seconds (25 s.). A minimum fluid delivery delay period of about ten seconds (10 s.) was identified as the time lapse to the predicted thermal activation of the minimum sprinkler operational area 28 formed by four critical sprinklers for the given ceiling height H1 of forty feet (40 ft.). The first sprinkler activation was predicted to occur at about one minute and fifty-five seconds (1:55) after ignition. A fluid delivery delay period of thirty-one seconds (31 s.), outside the predicted fluid delivery delay range of the maximum and minimum fluid delivery delay periods for testing.

In the test plant, the main commodity array 50 and its geometric center was stored beneath four sprinklers in an off-set configuration. More specifically, the main array 54 of Class II commodity was stored upon industrial racks utilizing steel upright and steel beam construction. The 32 ft. long by 3 ft. wide rack members were arranged to provide a double-row main rack with four 8 ft. bays. Beam tops were positioned in the racks at vertical tier heights of 5 ft. increments above the floor. Two target arrays 52 were each spaced at a distance of eight feet (8 ft.) about the main array. Each target array 52 consisted of industrial, single-row rack utilizing steel upright and steel beam construction. The 32 ft. long by 3 ft. wide rack system was arranged to provide a single-row target rack with three 8 ft. bays. The beam tops of the rack of the target array 52 were positioned on the floor and at 5 ft increments above the floor. The bays of the main and target arrays 14, 16 were loaded to provide a nominal six inch longitudinal and transverse flue space throughout the array. The main and target array racks were approximately 33 feet tall and consisted of seven vertical bays. The Class II commodity was constructed from double tri-wall corrugated cardboard cartons with five sided steel stiffeners inserted for stability. Outer carton measurements were a nominal 42 in. wide×42 in. long×42 in tall on a single nominal 42 in wide×42 in. long×5 in. tall hardwood two-tray entry pallet. The double tri-wall cardboard carton weighed about 84 lbs. and each pallet weighed approximately about 52 lbs. The overall storage height was 34 ft.-2 in. (nominally 34 ft.), and the movable ceiling was set to 40 ft.

An actual fire test was initiated twenty-one inches off-center from the center of the main array 54 and the test was run for a test period T of thirty minutes (30 min). The ignition source were two half-standard cellulose cotton igniters. The igniters were constructed from a three inch by three inch (3 in×3 in.) long cellulose bundle soaked with 4-oz. of gasoline and wrapped in a polyethylene bag. Following thermal activation of the first sprinkler in the system 10, fluid delivery and discharge was delayed for a period of thirty seconds (30 s.) by way of a solenoid valve located after the primary water control valve. Table 6 below provides a summary table of both the model and test parameters. In addition Table 6 provides fire predicted sprinkler operational area and fluid-delivery delay period next to the measured results from the test.

TABLE 6

| PARAMETERS | MODEL | TEST |
|---|---|---|
| Storage Type | Double Row Rack | Double Row Rack |
| Commodity Type | Class II | Class II |
| Nominal Storage Height (H2) | 34 ft | 34 ft |
| Nominal Ceiling Height (H1) | 40 ft | 40 ft |
| Nominal Clearance (L) | 6 ft | 6 ft |
| Ignition Location | Under 4, Offset | Under 4, Offset |
| Temperature Rating ° F. | 286 | 286 |
| Nominal 5 mm. Glass Bulb - Response Time Index (ft-sec)$^{1/2}$ | 190 | 190 |
| Deflector to Ceiling (S) | 7 in | 7 in |
| Nominal Sprinkler Discharge Coefficient K (gpm/psi$^{1/2}$) | 16.8 | 16.8 |
| Nominal Discharge Pressure (psi) | 22 | 22 |
| Nominal Discharge Density (gpm/ft$^2$) | 0.79 | 0.79 |
| Aisle Width (W) | 8 ft | 8 ft |
| Sprinkler Spacing (ft × ft) | 10 × 10 | 10 × 10 |
| Fluid delivery Delay Period (Δt) | 25 sec | 31 sec |
| RESULTS | | |
| Length of Test (min:s) | 30:00 | 30:00 |
| First Ceiling Sprinkler Operation (min:s) | | 2:13 |
| Water to Sprinklers (min:s) | | 2:44 |
| Number of Sprinklers at Time of Fluid delivery | | |
| Last Ceiling Sprinkler Operation (min:s) | | 3:00* |
| System Pressure at 22 psi | | 3:11 |
| Number of Operated Ceiling Sprinklers at Time of System Pressure | | 36 |
| Peak Gas Temperature at Ceiling Above Ignition ° F. | | 1738 |
| Maximum 1 Minute Average Gas Temperature at Ceiling Above Ignition ° F. | | 1404 |
| Peak Steel Temperature at Ceiling Above Ignition ° F. | | 596 |
| Maximum 1 Minute Average Steel Temperature Above Ignition ° F. | | 466 |
| Fire Spread Across Aisle | | No |
| Fire Spread Beyond Extremities | | No |

*At 3:00 the sprinkler discharge pressure was about 15 psig (80% of design discharge rate).

The sprinkler system achieved the discharge press of 15 psi. at about three minutes following ignition. A total of thirty-six sprinklers were activated to form a sprinkler operational area 26 thirty-eight seconds (38 sec.) following the sprinkler activation. It should be noted that the system did achieve an operating pressure of about 13 psig at about two minutes forty-nine seconds (2:49) following ignition, and manual adjustment of the pump speed was provided at from 2:47 to about 3:21. At three minutes following ignition, the sprinkler discharge pressure was about fifteen 15 psig.

The sprinkler activation result of Example 6 demonstrates a scenario in which a surround and drown sprinkler operating area was formed; however, the operating area was formed by thirty-six sprinkler operations which is less efficient than a preferred sprinkler operating area of twenty-six and more preferably twenty or fewer sprinklers. It should be further noted that all thirty-six sprinkler operations were operated and discharging at designed operating-pressure within an acceptable time frame for a dry sprinkler system configured to address a fire with a surround and drown configuration. More specifically, the complete sprinkler operating area was formed and discharging at designed operating pressure in under five minutes—three minutes eleven seconds (3:11). Additional features of dry sprinkler system 10 performance were observed such as, for example, the extent of the damage to the commodity or the behavior of the fire relative to the storage. For the test summarized in Table 6, it was observed that the fire and damage remained limited to the main commodity array 50.

Shown in FIG. 10A is the graphical plot of the sprinkler actuations indicating the location of each actuated sprinkler relative to the ignition locus. The graphical plot shows two concentric rings of sprinkler activation radially emanating from the ignition locus. No sprinkler skipping is observed.

EXAMPLE 7

In a seventh fire test, a sprinkler system 10 for the protection of Class III storage commodity was modeled and tested in the test plant room. The systems parameters included Class III commodity in a double-row rack arrangement stored to a height of about thirty-five feet (35 ft.) located in a storage area having a ceiling height of about forth-five feet (45 ft.). The dry sprinkler system 10 included one hundred 16.8 K-factor upright specific application storage sprinklers on a looped piping system having a nominal RTI of 190 (ft-sec.)$^{1/2}$ and a thermal rating of 286° F. on ten foot by ten foot (10 ft.×10 ft.) spacing. The Sprinkler system was located such that the deflectors of the sprinklers were about seven inches (7 in.) beneath the ceiling.

Figure 11:
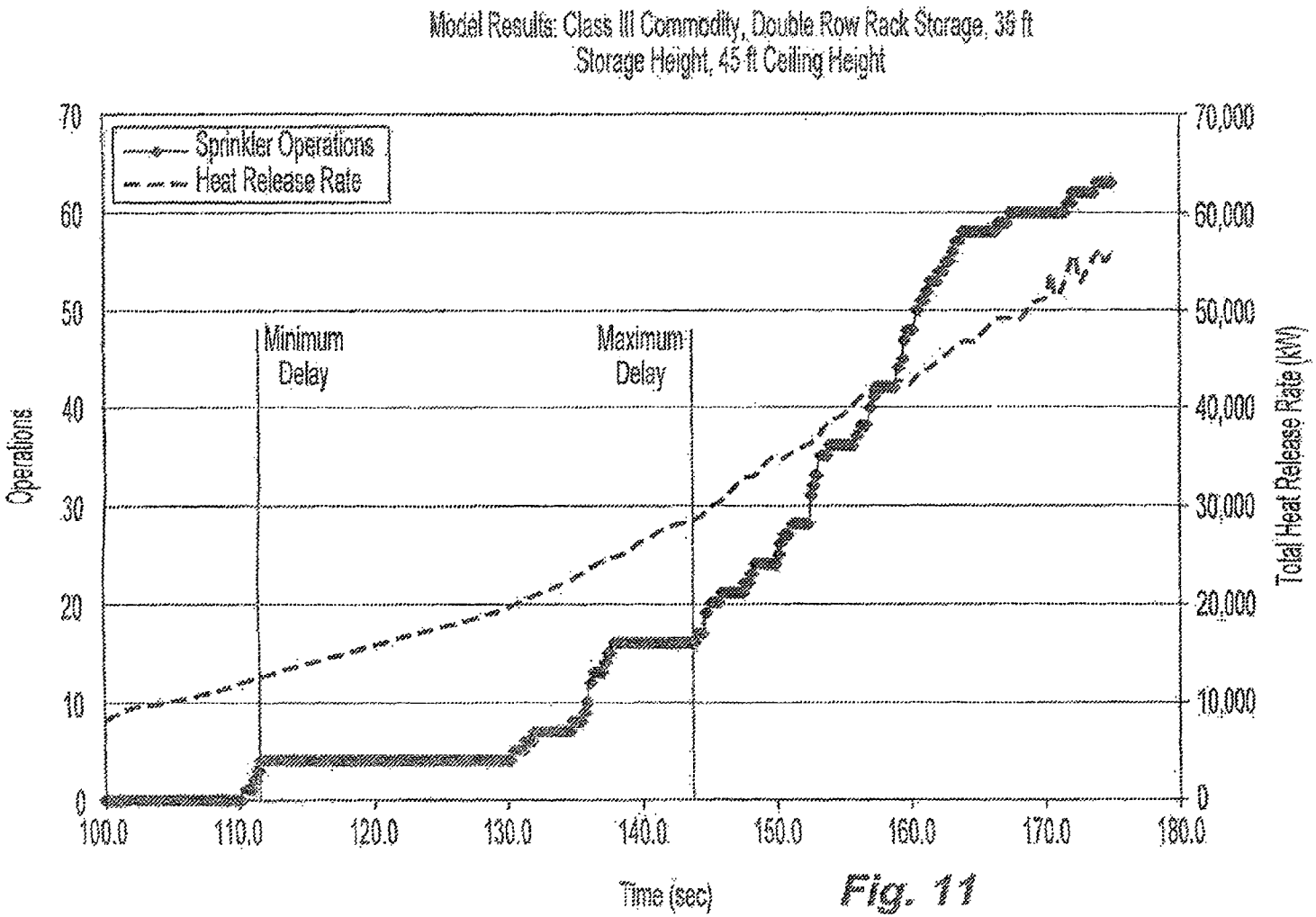
FIG. 11 is yet another predictive heat release and sprinkler activation profile for another stored commodity in a test storage area.

The test plant was modeled as normalized to develop a predictive heat release and sprinkler activation profile as seen in FIG. 11. From the predictive profiles, eighty percent of the maximum sprinkler operational area 27 having a total of about sixteen (16) sprinklers was predicted to occur following a maximum fluid delivery delay period of about twenty-six to about thirty-two seconds (26-32 s.). A minimum fluid delivery delay period of about one to two seconds (1-2 s.) was identified as the time lapse to the thermal activation of the four critical sprinklers for the given ceiling height H1 of forty-five feet (45 ft.). The first sprinkler activation was predicted to occur at about one minute fifty seconds (1:50) after ignition. A fluid delivery delay period of about twenty-three seconds (23 s.) was tested from the range between the maximum and minimum fluid delivery delay periods for testing.

In the test plant, the main commodity array 50 and its geometric center was stored beneath four sprinklers in an off-set configuration. More specifically, the main array 54 of Class III commodity was stored upon industrial racks utilizing steel upright and steel beam construction. The 32 ft. long by 3 ft. wide rack members were arranged to provide a double-row main rack with four 8 ft. bays. Beam tops were positioned in the racks at vertical tier heights of 5 ft. increments above the floor. Two target arrays 52 were each spaced at a distance of eight feet (8 ft.) about the main array. Each target array 52 consisted of industrial, single-row rack utilizing steel upright and steel beam construction. The 32 ft. long by 3 ft. wide rack system was arranged to provide a single-row target rack with three 8 ft. bays. The beam tops of the rack of fire target array 52 were positioned on the floor and at 5 ft. increments above the floor. The bays of the main and target arrays 14, 16 were loaded to provide a nominal six inch longitudinal and transverse flue space throughout the array. The main and target array racks were approximately 33 feet tall and consisted of seven vertical bays. The standard Class III commodity was constructed from paper caps (empty, 8 oz. size) compartmented in single wall, corrugated cardboard cartons measuring 21 in.×21 in.×21 in. Each carton contains 125 cups, 5 layers of 25 cups. The compartmentalization was accomplished with single wall corrugated cardboard sheets to separate the five layers and vertical interlocking single wall corrugated cardboard dividers to separate the five rows and five columns of each layer. Eight cartons are loaded on a two-way hardwood pallet, approximately 42 in.×42 in.×5 in. The pallet weighs approximately 119 lbs. of which about 20% is paper cups, 43% is wood and 37% is corrugated cardboard.

The overall storage height was 34 ft.-2 in. (nominally 35 ft.), and the movable ceiling was set to 45 ft.

An actual fire test was initiated twenty-one inches off-center from thecenter of the main array 114 and the test was run for a test period T of thirty minutes (30 min.). The ignition source were two half-standard cellulose cotton igniters. The igniters were constructed from a three inch by three inch (3 in×3 in) long cellulose bundle soaked with 4-oz. of gasoline and wrapped in a polyethylene bag. Following thermal activation of the first sprinkler in the system 10, fluid delivery and discharge was delayed for a period of twenty-three seconds (23 s.) by way of a solenoid, valve located after the primary water control valve. Table 7 below provides a summary table of both the model and test parameters. In addition, Table 7 provides the predicted sprinkler operational area 26 and selected fluid delivery delay period next to the measured results from the test.

TABLE 7

| PARAMETERS | MODEL | TEST |
|---|---|---|
| Storage Type | Double Row Rack | Double Row Rack |
| Commodity Type | Class III | Class III |
| Nominal Storage Height (H2) | 35 ft | 35 ft |
| Nominal Ceiling Height (H1) | 45 ft | 45 ft |
| Nominal Clearance (L) | 10 ft | 10 ft |
| Ignition Location | Under 4, Offset | Under 4, Offset |
| Temperature Rating ° F. | 286 | 286 |
| Nominal 5 mm. Glass Bulb - Response Time Index (ft-sec)$^{1/2}$ | 190 | 190 |
| Deflector to Ceiling (S) | 7 in | 7 in |
| Nominal Sprinkler Discharge Coefficient K (gpm/psi$^{1/2}$) | 16.8 | 16.8 |
| Nominal Discharge Pressure (psi) | 30 | 30 |
| Nominal Discharge Density (gpm/ft$^2$) | 0.92 | 0.92 |
| Aisle Width (W) | 8 ft | 8 ft |
| Sprinkler Spacing (ft × ft) | 10 × 10 | 10 × 10 |
| Fluid delivery Delay Period (Δt) | 23 sec. | 23 sec. |
| RESULTS | | |
| Length of Test (min:s) | 30:00 | 30:00 |
| First Ceiling Sprinkler Operation (min:s) | | 2:02 |
| Water to Sprinklers (min:s) | | 2:25 |
| Number of Sprinklers at Time of Fluid delivery | | |
| Last Ceiling Sprinkler Operation (min:s) | | 2:32 |
| System Pressure at 30 psi | | 2:29* |
| Number of Operated Ceiling Sprinklers at Time of System Pressure | | 14 |
| Peak Gas Temperature at Ceiling Above Ignition ° F. | | 1697 |
| Maximum 1 Minute Average Gas Temperature at Ceiling Above Ignition ° F. | | 1188 |
| Peak Steel Temperature at Ceiling Above Ignition ° F. | | 485 |
| Maximum 1 Minute Average Steel Temperature Above Ignition ° F. | | 333 |
| Fire Spread Across Aisle | | No |
| Fire Spread Beyond Extremities | | No |

*The 30 psig design pressure was achieved at 2:29 and full pressure at 40 psig was achieved at 2:32 after which, the pressure was reduced for the subsequent 24 seconds down to 30 psig.

The predictive profiles identified a fire growth corresponding to about sixteen (16) predicted sprinkler activations following a twenty-six to thirty-two second fluid delivery delay. According to observations of the fire test, a total of twelve sprinklers were operating at system pressure twenty-nine seconds (29 s.) after the first sprinkler activation to significantly impact fire growth. Subsequently, two additional, sprinklers were activated to form a sprinkler operational area 26 totaling fourteen sprinklers thirty seconds (30 s.) following the first sprinkler activation.

Employing a fluid delivery delay period in the system 10 resulted in the formation of an actual sprinkler operational area 26, made up of fourteen (14) activated sprinklers, which effectively addressed the fire. Additional features of dry sprinkler system 10 performance were observed such as, for example, the extent of the damage to the commodity or the behavior of the fire relative to the storage. For the test summarized in Table 7, it was observed that the fire spread was limited to the two center bays of main array 54, and prewetting of the target arrays 56 prevented ignition. No sprinkler skipping was observed.

EXAMPLE 8

In an eighth fire test, a sprinkler system 10 for the protection of Class III storage commodity was modeled and tested. The system parameters included Class III commodity in a double-row rack arrangement stored to a height of about thirty-five feet (35 ft.) located in a storage area having a ceiling height of about forty feet (40 ft.). The dry sprinkler system 10 included one hundred 16.8 K-factor upright specific application storage sprinklers on a looped piping system having a nominal RTI of 190 (ft-sec.)$^{1/2}$ and a thermal rating of 286° F. on ten foot by ten foot (10 ft.×10 ft.) spacing. The sprinkler system was located such that the deflectors of the sprinklers were about seven inches (7 in.) beneath the ceiling.

Figure 12A:
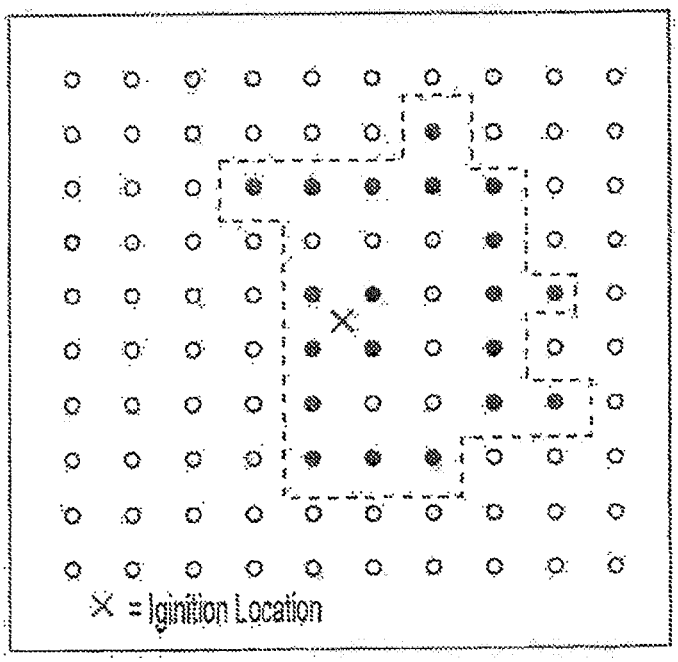
FIG. 12A is a sprinkler activation profile from an actual fire test of the stored commodity of FIG. 12.
Figure 12:
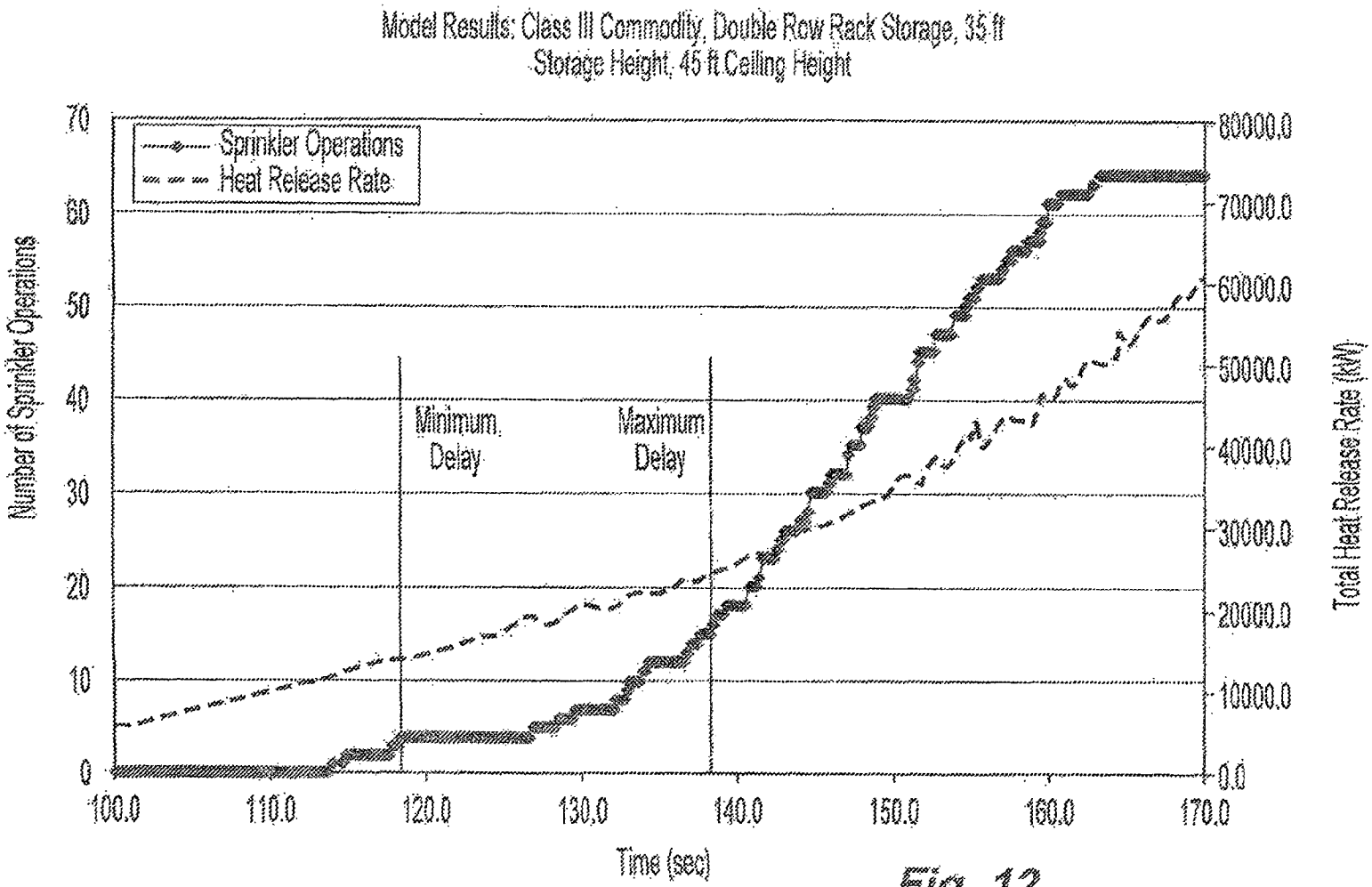
FIG. 12 is yet another predictive heat release and sprinkler activation profile for another stored commodity in a test storage area.

The test plant was modeled as normalized to develop a predictive heat release and sprinkler activation profile as seen in FIG. 12. From the predictive profiles, eighty percent of the maximum sprinkler operational area 27 having a total of about sixteen (16) sprinklers was predicted to occur following a maximum fluid delivery delay period of about twenty-seven seconds (27 s.). A minimum fluid delivery delay period of about sex seconds (6 s.) was identified as the time lapse to the thermal activation of the four critical sprinklers for the given ceiling height H1 of forty feet (40 ft.). The first sprinkler activation was predicted to occur at about one minute fifty-four seconds (1:54) after ignition. A fluid delivery delay period of twenty-seven seconds (27 s.) was selected from the range between the maximum and minimum fluid delivery delay periods for testing.

In the test plant, the main commodity array 50 and its geometric center was stored beneath four sprinklers in an off-set configuration. More specifically, the main array 54 of Class III commodity was stoned upon industrial racks utilizing steel upright and steel beam construction. The 32 ft. long by 3 ft. wide rack members were arranged to provide a double-row main rack with four 8 ft. bays. Beam tops were positioned in the racks at vertical tier heights of 5 ft. increments above the floor. Two target arrays 52 were each spaced at a distance of eight feet (8 ft.) about the main array. Each target array 52 consisted of industrial, single-row rack utilizing steel upright and steel beam construction. The 32 ft. long by 3 ft. wide rack system was arranged to provide a single-row target rack with three 8 ft. bays. The beam tops of the rack array 52 were positioned on the floor and at 5 ft. increments above the floor. The bays of the main and target arrays 14, 16 were loaded to provide a nominal six inch longitudinal and transverse flue space throughout the array. The main and target array racks were approximately 33 feet fall and consisted of seven vertical bays. The standard Class III commodity was constructed from paper cups (empty, 8 oz. size) compartmented in single wall, corrugated cardboard cartons measuring 21 in.×21 in.×21 in. Each carton contains 125 cups, 5 layers of 25 cups. The compartmentalization was accomplished with single wall corrugated cardboard sheets to separate the five layers and vertical interlocking single wall corrugated cardboard dividers to separate the five rows and five columns of each layer. Eight cartons are loaded on a two-way hardwood pallet, approximately. 42 in.×42 in.×5 in. The pallet weighs approximately 119 lbs. of which about 20% is paper cups, 43% is wood and 37% is corrugated cardboard. The overall storage height was 34 ft.-2 in. (nominally 35 ft.), and the movable ceiling was set to 40 ft.

An actual fire test was initiated twenty-one inches off-center from the center of the main array 114 and the test was run for a test period T of thirty minutes (30 min). The ignition source were two half-standard cellulose cotton igniters. The igniters were constructed from a three inch by three inch (3 in×3 in) long cellulose bundle soaked with 4-oz. of gasoline and wrapped in a polyethylene bag. Following thermal activation of the first sprinkler in the system 10, fluid delivery and discharge was delayed for a period of twenty-seven seconds (27 s.) by way of a solenoid valve located after the primary water control valve. Table 8 below provides a summary table of both the model and test parameters. In addition, Table 8 provides the predicted sprinkler operational area 26 and selected fluid delivery delay period next to the measured results from the test.

TABLE 8

| PARAMETERS | MODEL | TEST |
|---|---|---|
| Storage Type | Double Row Rack | Double Row Rack |
| Commodity Type | Class III | Class III |
| Nominal Storage Height (H2) | 35 ft | 35 ft |
| Nominal Ceiling Height (H1) | 40 ft | 40 ft |
| Nominal Clearance (L) | 10 ft | 10 ft |
| Ignition Location | Under 4, Offset | Under 4, Offset |
| Temperature Rating ° F. | 286 | 286 |
| Nominal 5 mm. Glass Bulb - Response Time Index (ft-sec)$^{1/2}$ | 190 | 190 |
| Deflector to Ceiling (S) | 7 in | 7 in |
| Nominal Sprinkler Discharge Coefficient K (gpm/psi$^{1/2}$) | 16.8 | 16.8 |
| Nominal Discharge Pressure (psi) | 22 | 22 |
| Nominal Discharge Density (gpm/ft+hu 2+l ) | 0.79 | 0.79 |
| Aisle Width (W) | 8 ft | 8 |
| Sprinkler Spacing (ft × ft) | 10 × 10 | 10 × 10 |
| Fluid delivery Delay Period (Δt) | 27 sec. | 27 sec. |
| RESULTS | | |
| Length of Test (min:s) | 30:00 | 30:00 |
| First Ceiling Sprinkler Operation (min:s) | | 1:41 |
| Water to Sprinklers (min:s) | | 2:08 |
| Number of Sprinklers at Time of Fluid delivery | | |
| Last Ceiling Sprinkler Operation (min:s) | | 2:13 |
| System Pressure at 30 psi | | 2:22 |
| Number of Operated Ceiling Sprinklers at Time of System Pressure | | 26 |
| Peak Gas Temperature at Ceiling Above Ignition ° F. | | 1627 |
| Maximum 1 Minute Average Gas Temperature at Ceiling Above Ignition ° F. | | 1170 |
| Peak Steel Temperature at Ceiling Above Ignition °F. | | 528 |
| Maximum 1 Minute Average Steel Temperature Above Ignition ° F. | | 401 |
| Fire Spread Across Aisle | | Yes |
| Fire Spread Beyond Extremities | | No |

The predictive profiles identified a fire growth corresponding to about sixteen (16) predicted sprinkler activations following a twenty-second (27 s.) fluid delivery delay. According to observations of the fire test, all twenty-six activated sprinklers were activated prior to the system achieving system pressure at thirty-two seconds (32 s.) following the first sprinkler activation to significantly impact fire growth. Accordingly, twenty-six sprinklers were activated to form a sprinkler operational area 26 two minutes and thirteen seconds (2:13) following the initial ignition.

Employing a fluid delivery delay period in the system 10 resulted in the formation of an actual sprinkler operational area 26, made up of twenty-six (26) activated sprinklers, which effectively addressed the fire. Additional features of dry sprinkler system 10 performance were observed such as, for example, the extent of the damage to the commodity or the behavior of the fire relative to the storage. For the test summarized in Table 8, it was observed that the fire spread across the aisle to the top of the target array 52 but was immediately extinguished upon fluid discharge.

Each of the tests verify that a dry sprinkler system, configured with an appropriate mandatory delay, can respond to a fire growth 72 with the thermal activation of a sufficient number of sprinklers to form a sprinkler operational area 26. Water discharging at system pressure from the sprinkler operational area 26 was further shown to surround and drown the growth 72 by overwhelming and subduing the fire from above.

Generally each of the resultant sprinkler operational areas 26 were formed by twenty-six or fewer sprinklers. The resultant sprinkler operational areas and performances demonstrate that storage occupancy fires can be effectively addressed with ceiling only systems where in-rack systems have traditionally been required. Moreover, where resultant sprinkler operational areas 26 were formed by twenty or fewer sprinklers, the tests results indicate that dry/preaction systems can be configured with smaller hydraulic design areas than previously required under NFPA (2002). By minimizing hydraulic demand the overall volume of water discharge into the storage space is preferably minimized. Finally, the tests demonstrate that delaying fluid delivery to allow for adequate fire growth can localize sprinkler activation to an area proximate the fire and avoid or otherwise minimize the sprinkler activations remote from the fire which do not necessarily directly impact the fire and add additional discharge volume.

Because each of the tests resulted in the successful formation and response of a sprinkler operational area 26, each of the tests define at least one mandatory fluid delivery delay period for the corresponding storage commodity condition. These tests were conducted for those commodities known to have high hazard and/or combustible properties, and the tests were conducted for a variety of storage configurations and heights and for a variety of ceiling to commodity clearances. In addition, these tests were conducted with a preferred embodiment of the sprinkler 20 at two different operating or discharge pressures. Accordingly, the overall hydraulic demand of a dry/preaction sprinkler system 10 is preferably a function of one of more factors of storage occupancies, including: the actual fluid delivery delay period, commodity class, sprinkler K-factor, sprinkler hanging style, sprinkler thermal response, sprinkler discharge pressure and total number of activated sprinklers. Because the above eight fire tests were conducted with the same sprinkler and sprinkler configuration, the resultant number of sprinkler operations in any given test was a function of one or more of: the actual fluid delivery delay period, commodity class, storage configuration and operating or sprinkler discharge pressure.

With regard to Class II and Class III commodities, because Class II is considered to present a less challenging fire than Class III, a system 10 configured for the protection of Class III is applicable to the storage occupancies for Class II. The test results demonstrate that a double-row rack configuration presents a faster fire growth as compared to a multi-row arrangement. Thus, if presented with the same fluid delivery delay period and more specifically, the same actual fluid delivery delay period, more sprinklers would be expected to operate before operating pressure is achieved in the double-row rack scenario as compared to the multi-row arrangement.

Each of the tests were conducted on rack storage arrangements, and its each test, the resultant sprinkler operational area 26 effectively overwhelmed and subdued the fire. The test systems 10 were all ceiling-only sprinkler systems unaided by in-rack sprinklers. Based on the results of the test, it is believed that dry sprinkler systems configured to address a fire with a sprinkler operational area 26, can be used as ceiling-only sprinkle protection systems for rack storage, thereby eliminating the need for in-rack sprinklers.

Because the tested mandatory fluid delivery delay periods resulted in the proper formation of sprinkler operational areas 26 having preferably fewer than thirty sprinklers more often fewer than twenty sprinklers, it is believed that storage occupancies protected by dry sprinkler system having a mandatory fluid delivery delay period can be hydraulically supported or designed with smaller hydraulic capacity. In terms of sprinkler operational area, the resultant sprinkler operational areas have been shown to be equal to or smaller than hydraulic design areas used in current wet or dry system design standards. Accordingly, a dry sprinkler system having a mandatory fluid delivery delay period can produce a surround and drown effect in response to a fire growth and can be further hydraulically configured or sized with a smaller water volume than current dry systems.

It should be further noted that all the sprinklers that serve to provide the surround and drown effect are thermally actuated within a predetermined time period. More specifically, the sprinkler system is configured such that the last activated sprinkler occurs within ten minutes following the first thermal sprinkler activation in the system. More preferably, the last sprinkler is activated within eight minutes and more preferably, the last sprinkler is activated within five minutes of the first sprinkler activation in the system. Accordingly, even where the dry sprinkler system includes a mandatory fluid delivery delay period outside the preferred minimum and maximum fluid delivery range which provides a more hydraulically efficient operating area, a sprinkler operational area can be formed to respond to a fire with a surround and drown effect, as seen for example in test No. 6, although a greater number of sprinklers may be thermally activated.

The above test further illustrates that the preferred methodology can provide for a dry sprinkler system that eliminates or at least minimizes the effect of sprinkler skipping. Of the activation plots provided, only one plot (FIG. 7A) showed a single sprinkler skip. For comparative purposes a wet system fire test was conducted and the sprinkler activation plotted. For the wet system test, sprinkler system 10 for the protection of Class III storage commodity was modeled and tested. The system parameters included Class III commodity in a double-row rack arrangement stored to a height of about forty feet (40 ft.) located in a storage area having a ceiling height of about forty-five feet (45 ft.). The wet sprinkler system 10 included one hundred 16.8 K-factor upright specific application storage sprinklers having a nominal RTI of 190 $(\text{ft-sec.})^{1/2}$ and a thermal rating of 286° F. on ten foot by ten foot (10 ft.×10 ft.) spacing. The sprinkler system was located such that the detectors of the sprinklers were about seven inches (7 in.) beneath the ceiling. The wet pipe system 10 was set as closed-head and pressurized.

In the test plant, the main commodity array 50 and its geometric center was stored beneath four sprinklers in an off-set configuration. More specifically, the main array 54 of Class III commodity was stored upon industrial racks utilizing steel upright and steel beam construction. The 32 ft. long by 3 ft. wide rack members were arranged to provide a double-row main rack with four 8 ft. bays. Beam tops were positioned in the racks at vertical tier heights in 5 ft. increments above the floor. A target array 52 was spaced at a distance of eight feet (8 ft.) from the main array. The target array 52 consisted of industrial, single-row rack utilizing steel upright and steel beam construction. The 32 ft. long by 3 ft. wide rack system was arranged to provide a single-row target rack with three 8 ft. bays. The beam tops were positioned in the racks of the target array 52 at vertical tier heights in 5 ft. increments above the floor. The bays of the main and target arrays 14, 16 were loaded to provide a nominal six inch longitudinal and transverse flue space throughout the arrays. The main and target racks of the arrays 50, 52 were approximately 38 ft. tall and consisted of eight vertical bays. The overall storage height was 39 ft. 1 in. (40 ft. nominally) and the movable ceiling height was set to 45 ft. Standard Class III commodity loaded in each of the main and target arrays 50, 52. The standard Class III commodity was constructed from paper cups (empty, 8 oz. size) carton contains 125 cups, 5 layers of 25 cups. The compartmentalization was accomplished with single wall corrugated cardboard sheets to separate the five layers and vertical interlocking single wall corrugated cardboard dividers to separate the five rows and five columns of each layer. Eight cartons are loaded on a two-way hardwood pallet, approximately 42 in.×42 in.×5 in. The pallet weighs approximately 119 lbs. of which about 20% is paper cups, 43% is wood and 37% is corrugated cardboard. Samples were taken from the commodity to determine approximate moisture content. The samples were initially weighed, placed in an oven at 220° F. for approximately 36 hours and then weighed again. The approximate moisture content of the commodity is as follows: box—7.8% and cup 6.9%.

An actual fire test was initiated twenty-one inches off-center from the center of the main array 114 using two half-standard cellulose cotton igniters, and the test was run for a test period T of thirty minutes (30 min). The 3 in.×3 in. long cellulose bundle soaked with 4 oz of gasoline wrapped in a polyethylene bag. Table 9 below provides a summary table of the test parameters and results.

TABLE 9

| PARAMETERS | TEST |
|---|---|
| Storage Type | Double Row Rack |
| Commodity Type | Class III |
| Nominal Storage Height (H2) | 40 ft |
| Nominal Ceiling Height (H1) | 45 ft |
| Nominal Clearance (L) | 5 ft |
| Ignition Location | Under 4, Offset |
| Temperature Rating 0 F. | 286 |
| Nominal 5 mm. Glass Bulb - Response Time Index $(\text{ft-sec})^{1/2}$ | 190 |
| Deflector to Ceiling (S) | 7 in |
| Nominal Sprinkler Discharge Coefficient K $(\text{gpm/psi}^{1/2})$ | 16.8 |
| Nominal Discharge Pressure (psi) | 30 |
| Nominal Discharge Density $(\text{gpm/ft}^2)$ | 0.92 |
| Aisle Width (W) | 8 |
| Sprinkler Spacing (ft × ft) | 10 × 10 |
| Length of Test (min:s) | 32:00 |
| First Ceiling Sprinkler Operation (min:s) | 2:12 |
| Last Ceiling Sprinkler Operation (min:s) | 6:26 |
| Number of Operated Ceiling Sprinklers | 20 |
| Peak Gas Temperature at Ceiling Above Ignition ° F. | 1488 |
| Maximum 1 Minute Average Gas Temperature at Ceiling Above Ignition ° F. | 550 |
| Peak Steel Temperature at Ceiling Above Ignition ° F. | 372 |

TABLE 9-continued

| PARAMETERS | TEST |
|---|---|
| Maximum 1 Minute Average Steel Temperature Above Ignition ° F. | 271 |
| Fire Spread Across Aisle | Yes |
| Fire Spread Beyond Extremities | No |

According to observations of the fire test, the first five (5) sprinklers operated within a thirty second (30 sec.) interval. These five sprinklers were unable to adequately address the fire which grew and thermally actuated an additional fourteen (14) sprinklers 185 seconds after the first operation. The last sprinkler operation occurred 254 seconds after the first sprinkler operation. It was further observed that with the exception of the fifth sprinkler operation, the entire second ring of sprinklers relative to the ignition locus was subject to wetting from the initial group of actuated sprinklers and did not activate (sprinkler skipping). Once the third ring of sprinklers operated, sufficient water flow was provided to prohibit the activation of additional sprinklers. The third ring of sprinklers is located at a minimum of about twenty-five feet (25 ft.) from the axis of the ignition location, and sprinklers as far away as thirty-five feet (35 ft.) from the ignition were actuated. FIG. 12A shows a graphic plot of the sprinkler activations in the wet system test. Just by observational comparison to this wet system test, it would appear that the preferred method and system of a dry sprinkler system configured to address a fire with a surround and drown configuration using a mandatory fluid delivery delay period could provide less sprinkler skipping over a wet system that delivers fluid immediately.

Hydraulically Configuring System for Storage Occupancy

Schematically shown in FIG. 1A, the dry sprinkler system 10 includes one or more hydraulically remote sprinklers 21 defining a preferred hydraulic design area 25 to support the system 10 in responding to a fire event with a surround and drown configuration. The preferred hydraulic design area 25 is a sprinkler operational area designed into the system 10 to deliver a specified nominal discharge density D, from the most hydraulically remote sprinklers 21 at a nominal discharge pressure P. The system 10 is preferably a hydraulically designed system having a pipe size selected on a pressure loss basis to provide a prescribed water density, in gallons per minute per square foot, or alternatively a prescribed minimum discharge pressure or flow per sprinkler, distributed with a reasonable degree of uniformity over a preferred hydraulic design area 25. The hydraulic design area 25 for the system 10 is preferably designed or specified for a given commodity and storage ceiling height to the most hydraulically remote sprinklers or area in the system 10.

Generally, the preferred hydraulic design area 25 is sized and configured about the most hydraulically remote sprinklers in the system 10 to ensure that the hydraulic demand of the remainder of the system is satisfied. Moreover, the preferred hydraulic design area 25 is sized and configured such that a sprinkler operational area 26 can be effectively generated anywhere in the system 10 above a fire growth. Preferably, the preferred hydraulic design area 25 can be derived from successful fire testing such as those previously described hereinabove. In a stressful fire test, fluid delivery through the activated sprinklers preferably overwhelms and subdues the fire growth and the fire remains localized to the area of ignition, i.e. the fire preferably does not jump the array or otherwise migrate, down the main and target arrays 50, 52.

The results from successful fire testing, used to evaluate the effectiveness of a fluid delivery delay to form a sprinkler operational area 26, further preferably define fire hydraulic sprinkler operational area 25. Summarizing the activation results of the eight tests discussed above, the following table was produced:

Summary Table of Design Areas

| | | Design Area (No. of Sprinklers) | | | |
|---|---|---|---|---|---|
| Storage Height | Ceiling Height | Class II - Dbl-row | Class II - Multi-row | Class III - Dbl-row | Group A - Dbl-row |
| 20 | 30 | E | E | E | 15 |
| 30 | 35 | E | E | 16 | E |
| 34 | 40 | 36 | 14 | E | E |
| 35 | 45 | E | E | 14 | E |
| 35 | 40 | E | E | 26 | E |
| 40 | 43 | E | E | 20 | E |
| 40 | 45.25 | E | E | 19 | E |

The number of identified activated sprinklers, along with their known sprinkler spacing, each identify a preferred hydraulic design area 25 for a given commodity, at the given storage and ceiling heights to support a ceiling-only dry sprinkler system 10 configured to address a fire event with a surround and drown configuration. A review of the results further show that the number of sprinkler activations range generally from fourteen to twenty sprinklers. Applying the above described modeling methodology, coupled with the selection of an appropriately thermally rated and sensitive sprinkler capable of producing adequate flow for an anticipated level of fire challenge, a hydraulic design area 25 for a dry ceiling-only fire protection system can be identified which could address a fire event in a storage occupancy with a surround and drown configuration. Thus, a range of values can be extrapolated E, where indicated in the table above, to identify a preferred hydraulic design area 25. Therefore, preferred hydraulic design areas 25 can be provided for all permutations of commodities, storage and ceiling heights, for example, those storage conditions listed but not tested in the Summary Table of Design Areas. In addition, hydraulic design areas can further be extrapolated for those conditions neither tested nor listed above.

As noted above, a preferred hydraulic sprinkler operational area 25 may range from about fourteen to about twenty sprinklers and more preferably from about eighteen to about twenty sprinklers. Adding a factor of safety to the extrapolation, it is believed that the hydraulic sprinkler operational area 25 can be sized from about twenty to about twenty-two sprinklers. On a sprinkler spacing of ten-by-ten feet, this translates to a preferred hydraulic design area of about 2000 square feet to about 2500 square feet and more preferably about 2200 square feet.

Notably, current NFPA-13 standards specify design areas to the most hydraulically remote area of wet sprinkler systems in the protection of storage areas to about 2000 square-feet. Accordingly, it is believed that a sprinkler system 10 configured to address a fire with a sprinkler operational area 26 can be configured with a design area at least equal to that of wet systems under NFPA-13 for similar storage conditions. As already shown, a sprinkler system configured to address a fire with a surround and drown effect can reduce the hydraulic demands on the system 10 as compared to current dry sprinkler systems incorporating the safety or "penalty" design factor. Preferably, the preferred hydraulic design area 25 of the system 10 can be reduced further such that the preferred hydraulic design area 25 less than design areas for known wet sprinkler systems. In at least one test listed above, it was shown that a dry sprinkler system for the protection of Group A plastics beneath a ceiling height of thirty feet or less can be hydraulically supported by fifteen sprinklers which define a hydraulic design area less than the 2000 square feet specified under the design standards for wet systems.

More specifically, it is believed that the fire test data demonstrates that a double-row rack of Group A plastics at 20 ft. high storage, arguably having high protection demands, is protected with a dry pipe sprinkler system based on opening a limited number of sprinklers. It is further believed that the design criteria for wet systems was established based on test results that opened a similar number of sprinklers as the test result for Group A plastic described above. Thus, it has been demonstrated that the design area of a dry sprinkler system can be the same or less than the design area of a wet sprinkler system. Because rack storage testing is generally known to be more severe than palletized testing, the results are also applicable to palletized testing, and to high challenge fires in general. Moreover, based on applicant's demonstration that the design area for a dry sprinkler system can be equal to or less than that of a wet system, if is believed that the design area can be extended to commodities having less stringent protection demands.

Because the system 10 preferably utilizes the activation of a small number of sprinklers 20 to produce a surround and drown effect to overwhelm and subdue a fire, the preferred hydraulic design area 25 of the dry sprinkler system 10 can also be based upon a reduced hydraulic design areas for dry sprinkler systems specified under NFPA-13. Thus where, for example, Section 12.2.2.1.4 of NFPA-13 specifies for control mode protection criteria for palletized, solid piled, bin box or shelf storage of class I through IV commodities, a design area 2600 square feet having a water density of 0.15 gpm/ft$^2$, the preferred hydraulic design area 25 is preferably specified under the wet standard at 2000 square feet having a density of 0.15 gpm/ft$^2$. Accordingly, the preferred hydraulic design area 25 is preferably smaller than design areas for known dry sprinkler systems 10. The design densities for the system 10 are preferably the same as those specified under Section 12 of NFPA-13 for a given commodity, storage height and ceiling height. The reduction of current hydraulic design areas used in the design and construction of dry sprinkler systems can reduce the requirements and/or the pressure demands of pumps or other devices in the system 10. Consequently the pipes and device of the system can be specified to be smaller. It should be appreciated however that dry sprinkler systems 10 can have a preferred hydraulic design area 25 sized to be as large as design areas specified under the current available standards of NFPA-13 for dry sprinkler systems. Such systems 10 can still manage a fire with a surround and drown effect and minimize water discharge provided the system 10 incorporates a fluid delivery delay period as discussed above. Accordingly, a range of design areas exists for sizing a preferred hydraulic design area 25. At a minimum, the preferred hydraulic design area 25 can be at a minimum the size of an activated sprinkler operational area 26 provided by available fire test data and the hydraulic design area 25 can be at a maximum as large as the system permits provided the fluid delivery delay period requirements can be satisfied.

According to the test results, configuring dry sprinkler systems 10 with a sprinkler operational area 26 formed by the inclusion of a mandatory fluid delivery delay period can overcome the design penalties conventionally associated with dry sprinkler systems. More specifically, dry sprinkler systems 10 can be designed and configured with preferred hydraulic design areas 25 equal to the sprinkler operational design areas specified for wet piping systems in NFPA-13. Thus, the preferred hydraulic design area 25 can be used to design and construct a dry pipe sprinkler system that avoids the dry pipe "penalties" previously discussed as prescribed by NFPA-13 by being designed to perform hydraulically at least the same as a wet system designed in accordance with NFPA-13. Because if is believed that dry pipe fire protection systems can be designed and installed without incorporation of the design penalties, previously perceived as a necessity, under NFPA-13, the design penalties for dry pipe systems can be minimized or otherwise eliminated. Moreover, the tests indicate that the design methodology can be effectively used for dry sprinkler system fire protection of commodities where there is no existing standard for any system. Specifically, mandatory fluid delivery delay periods and preferred hydraulic design areas can be incorporated into a dry sprinkler system design so as to define a hydraulic performance criteria where no such criteria is known. For example, NFPA-13 provides only wet system standards for certain classes of commodities such as Class III commodities. The preferred methodology can be used to establish a ceiling-only dry sprinkler system standard for Class III commodities by specifying a requisite hydraulic design area and mandatory fluid delivery delay period.

A mandatory fluid delivery delay period along with the a preferred hydraulic design area 25 can provide design criteria from which a dry sprinkler system can preferably be designed and constructed. More preferably, maximum and minimum mandatory fluid delivery delay periods along with the preferred hydraulic design area 25 can provide design criteria from which a dry sprinkler system can preferably be designed and constructed. For example, a preferred dry sprinkler system 10 can be designed and constructed for installation in a storage space 70 by identifying or specifying the preferred hydraulic design area 25 for a given set of commodity parameters and storage space specifications. Specifying the preferred hydraulic design area 25 preferably includes identifying the number of sprinklers 20 at the most hydraulically remote area of the system 10 that can collectively satisfy the hydraulic requirements of the system. As discussed above, specifying the preferred hydraulic design area 25 can be extrapolated from fire testing or otherwise derived from the wet system design areas provide in the NFPA-13 standards.

Method of Implementing System for Storage Occupancy

Method for Generating System Design Criteria

A preferred methodology for designing a fire protection system provides designing a dry sprinkler system for protecting a commodity, equipment or other items located in a storage area. The methodology includes establishing design criteria around which the preferred sprinkler system configured for a surround and drown response can be modeled, simulated and constructed. A preferred sprinkler system design methodology can be employed to design the sprinkler system 10. The design methodology preferably generally includes establishing at least three design criteria or parameters: the preferred hydraulic design area 25 and the minimum and maximum mandatory fluid delivery delay periods for the system 10 using predictive heat release and sprinkler activation profiles for the stored commodity being protected.

Figure 13:
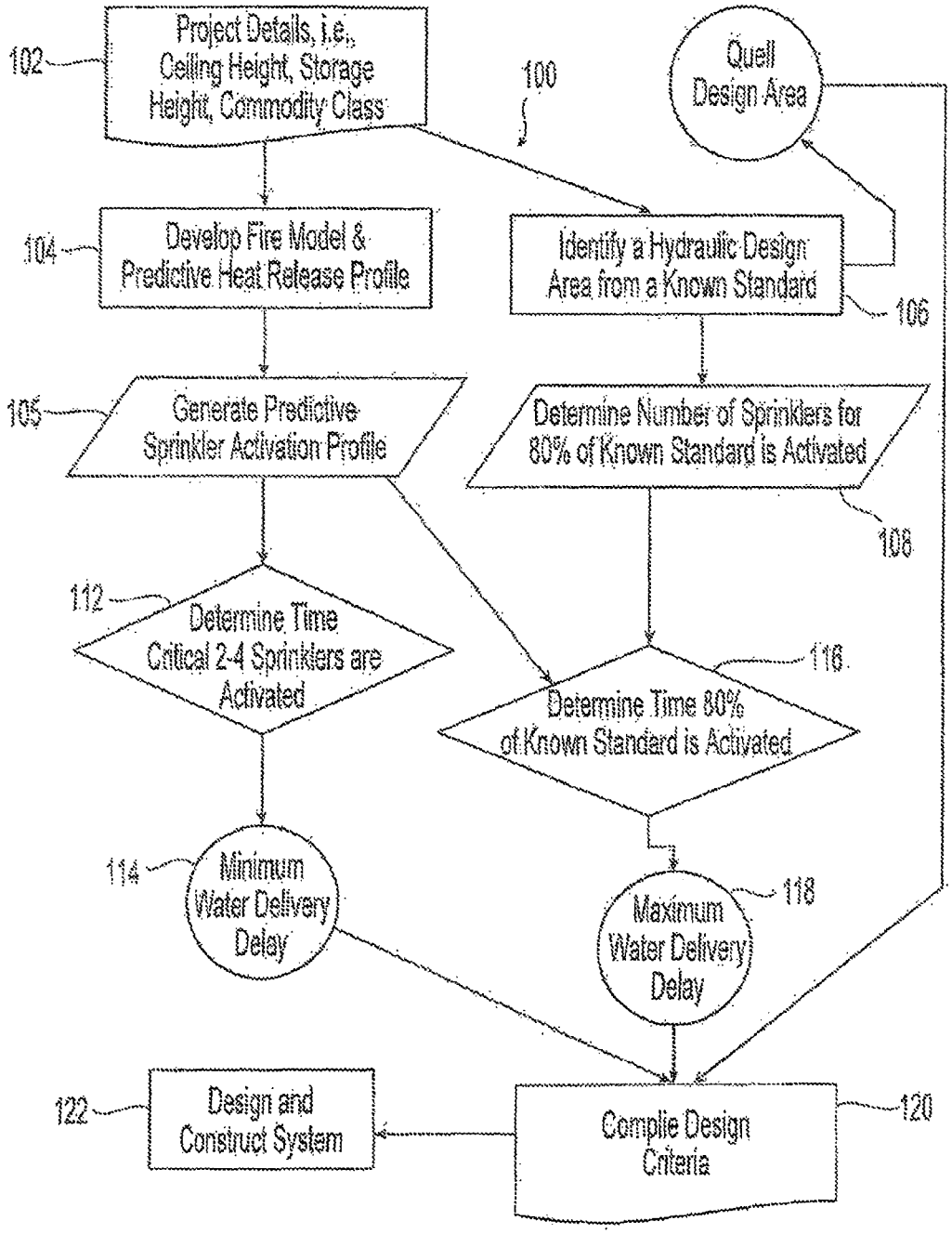
FIG. 13 is an illustrative flowchart of a preferred design methodology.

Shown in FIG. 13 is a flowchart 100 of the preferred methodology for designing and constructing the dry sprinkler system 10 having a sprinkler operational area 26. The preferred methodology preferably includes a compiling step 102 which gathers the parameters of the storage and commodity to be protected. These parameters preferably include the commodity class, the commodity configuration, the storage ceiling height and any other parameters that impact fire growth and/or sprinkler activation. The preferred method further includes a developing step 104 to develop a fire model and a predictive heat release profile 402 as seen, for example, in FIG. 4 and described above. In a generating step 105, the predictive heat release profile is used to solve for the predicted sprinkler activation times to generate a predictive sprinkler activation profile 402 as seen in FIG. 4 and described above. The storage and commodity parameters compiled in step 102 are further utilized to identify a preferred hydraulic design area 25, as indicated in step 106. More preferably, the preferred hydraulic design area 25 is extrapolated from available fire test data, as described above, or alternatively is selected from known hydraulic design areas provided by NFPA-13 for wet sprinkler systems. The preferred hydraulic design area 25 of step 106 defines the requisite number of sprinkler activations through which the system 10 must be able to supply at least one of: (i) a requisite flow rate of water or other fire fighting material; or (ii) a specified density such as, for example, 0.8 gallons per minute per foot squared.

Thus, in one preferred embodiment of the methodology 100, design criteria for a dry sprinkler fire protection systems that protects a stored commodity is provided and can be substantially the same as that of a wet system specified under NFPA-13 for a similar commodity. Preferably, the commodity for which the dry system is preferably designed is a 25 ft. high double-row rack of Group A plastic commodity. Alternatively, the commodity can be any class or group of commodity listed under NFPA-13 Ch. 5.6.3 and 5.6.4. Further in the alternative, Additionally, other commodities such as aerosols and flammable liquids can be protected. For Example, NFPA-30 Flammable and Combustible Liquids Code (2003 ed.) and NFPA 30 b Code for the Manufacture and Storage of Aerosol Products (2002 ed.), each of which is incorporated in its entirety by reference. Furthermore, per NFPA-13, additional commodities to be protected can include for example, rubber tires, staked pallets, baled cotton, and rolled paper. More preferably, the preferred method 100 includes designing the system as a ceiling-only dry pipe sprinkler system for protecting the rack in an enclosure. The enclosure preferably has a 30 ft. high ceiling. Designing the dry sprinkler includes preferably specifying a network grid of sprinklers having a K-factor of about 16.8. The network grid includes a preferred sprinkler operational design area of about 2000 sq. ft, and the method can further include modifying the model so as to preferably be at least the hydraulic equivalent of a wet system as specified by NFPA-13. For example, the model can incorporate a design area so as to substantially correspond to the design criteria under NFPA-13 for wet system protection of a dual row rack storage of Group A plastic commodity stacked 25 ft high under a ceiling height of 30 ft.

Figure 13A:
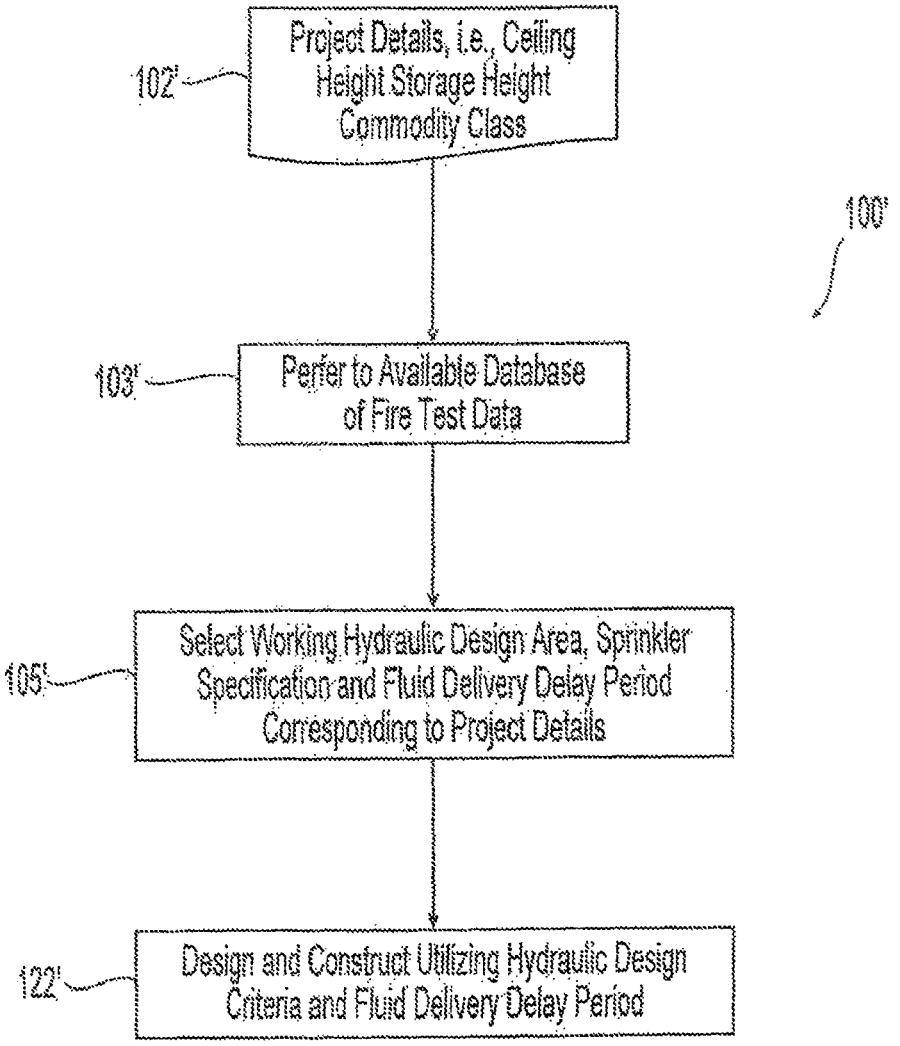
FIG. 13A is an alternative illustrative flowchart for designing a preferred sprinkler system.
Figure 13B:
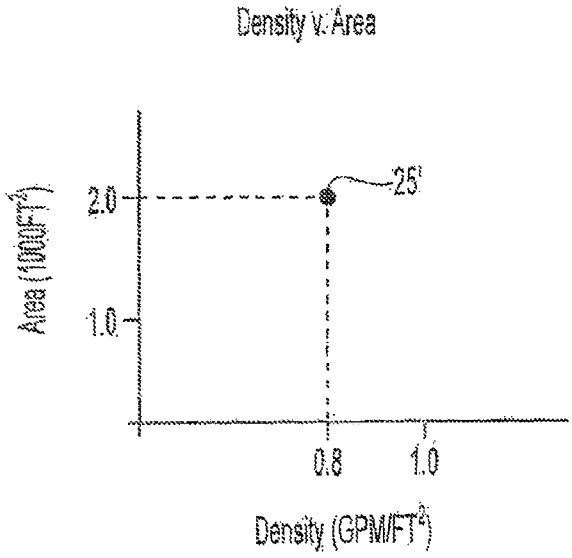
FIG. 13B is a preferred hydraulic design point and criteria.

The design methodology 100 and the extrapolation from available fire test data, as described above, can further provide a preferred hydraulic design point. Shown in FIG. 13B is an illustrative density-area graph for use in designing fire sprinkler systems. More specifically shown is a design point 25' having a value of 0.8 gallons per minute per square foot (gpm/ft$^2$) to define a requisite amount of water discharged out of a sprinkler over a given period of time and a given area provided that the sprinkler spacing for the system is appropriately maintained. According to the graph 10, the preferred design area is about 2000 sq. ft., thus defining a design or sprinkler operational area requirement in which a preferred dry sprinkler system can be designed so as to provide 0.8 gpm/ft2 per 2000 sq. ft. The design point 25' can be a preferred area-density point used in hydraulic calculations for designing a dry pipe sprinkler system in accordance with the preferred methodology described herein. The preferred design point 25' described above has been shown to overcome the 125% area penalty increase because the design 25' provides for dry system performance at least equivalent to the wet system performance. Accordingly, a design methodology incorporating the preferred design area and a system constructed in accordance with the preferred methodology demonstrates that dry pipe fire protection systems can be designed and installed without incorporation of the design penalties, previously perceived as a necessity, under NFPA-13. Accordingly, applicant asserts that the need for penalties in designing dry pipe systems has been eliminated.

In addition to providing a dry sprinkler protection system with a desired water delivery, the preferred design methodology 100 can be configured to meet other requirements of NFPA-13 such as, for example, required water delivery times. Thus, the preferred design area 25 and methodology 100 can be configured so as to account for fluid delivery to the most hydraulically remote activated sprinklers within a range of about 15 seconds to about 60 seconds of sprinkler activation. More preferably, the methodology 100 identifies a preferred mandatory fluid delivery delay period as previously discussed so as to configure the system 10 for addressing a fire event with a surround and drown configuration. Accordingly, the design methodology 100 preferably includes a buffering step 108 which identifies a fraction of the specified maximum sprinkler operational area 27 to be formed by maximum fluid delivery delay period. Preferably, the maximum sprinkler operational area 27 is equal to the minimum available preferred hydraulic design area 25 for the system 10. Alternatively, the maximum sprinkler operational area is equal to the design area specified under NFPA-13 for a wet system protecting the same commodity, at the same storage and ceiling height.

The buffering step preferably provides that eighty percent of the specified maximum sprinkler operational area 27 is to be activated by the maximum fluid delivery delay period. Thus, for example, where the maximum fluid delivery delay period is specified to be twenty sprinklers or 2000 square feet, the buffering step identifies that initial fluid delivery should occur at the predicted moment that sixteen sprinklers would be activated. The buffering step 108 reduces the number of sprinkler activations required to initiate or form the full maximum sprinkler operational area 27 so that water can be introduced into the storage space 70 earlier than if 100 percent of the sprinklers in the maximum sprinkler operational area 27 were required to be activated prior to fluid delivery. Moreover, the earlier fluid delivery allows the discharging water to come up to a desired system pressure, i.e. compression time, to produce the required flow rate at which time, preferably substantially all the required sprinklers of the maximum sprinkler operational area 27 are activated.

In determining step 116, the time is determined for which eighty percent of the maximum sprinkler operational area 27 is predicted to be formed. Referring again to FIG. 4, the time lapse measured from the predicted first sprinkler activation in the system 10 to the last of the activation forming the preferred eighty percent (80%) of the maximum sprinkler operational area 27 defines the maximum fluid delivery delay $\Delta t_{max}$ as provided in step 118. The use of the buffering step 108 also accounts for any variables and their impact on sprinkler activation that are not easily captured in the predictive heat release and sprinkler activation profiles. Because the maximum sprinkler operational area 27 is believed to be the largest sprinkler operational area for the system 10 that can effectively address a fire with a surround and drown effect, water is introduced into the system earlier rather than later thereby minimizing the possibility that water is delivered too late to form the maximum sprinkler operational area 27 and address the anticipated fire growth. Should water be introduced too late, the growth of the fire may be too large to be effectively addressed by the sprinkler operational area or otherwise the system may revert to a control mode configuration in which the heat release rate is decreased.

Referring again to the flowchart 190 of FIG. 13 and the profile 400 of FIG. 4, the time at which the minimum sprinkler operational area 28 is formed can be determined in step 112 using the time-based predictive heat release and sprinkler activation profiles. Preferably, the minimum sprinkler operational area 28 is defined by a critical number sprinkler activations for the system 10. The critical number of sprinkler activations preferably provide for a minimum initial sprinkler operation area that addresses a fire with a water or liquid discharge to which the fire continues to grow in response such that an additional number of sprinklers are thermally activated to form a complete sprinkler operational area 26. The critical number of sprinkler activations are preferably dependent upon the height of the sprinkle system 10. For example, where the height to the sprinkler is less than thirty feet, the critical number of sprinkler activations is about two to four (2-4) sprinklers. In storage areas where the sprinkler system is installed at a height of thirty feet or above, the critical number of sprinkler activations is about four sprinklers. Measured from the first predicted sprinkler activation, this time to predicted critical sprinkler activation, i.e. two to four sprinkler activations preferably defines the minimum mandatory fluid delivery delay period $\Delta t_{min}$ as indicated in step 114. To introduce water into the storage area prematurely may perhaps impede the fire growth thereby preventing thermal activation of all the critical sprinklers in the minimum sprinkler operational area.

Thus, a dry sprinkler systems can be provided with design criteria to produce a surround and drown effect using the method described above. It should be noted that the steps of the preferred method can be practiced in any random order provided that the steps are practiced to generate the appropriate design criteria. For example, the minimum fluid delivery delay period can be determined before the maximum fluid delivery delay period determining step, or the hydraulic design area can be determined before either the minimum or the maximum fluid delivery delay periods. Multiple systems can be designed by collecting multiple inputs and parameters for one or more storage occupancies to be protected. The multiple designed systems can be used to determine the most practical and/or economical configuration to protect the occupancy. In addition, if a series of predictive models are developed, one can use portions of the method to evaluate and/or determine the acceptable maximum and minimum fluid delivery delay periods.

Moreover, in a commercial practice, one can use the series of models to create a database of look-up tables for determining the minimum and maximum fluid delivery delay periods for a variety of storage occupancy and commodity conditions. Accordingly, the database can simplify the design process by eliminating modeling steps. As seen, for example, in FIG. 13A is a simplified methodology 100' for designing and constructing a system 10. With a database of fire test data, an operator or designer can design and/or construct a sprinkler system 10. An initial step 102' provides for identifying and compiling project details such as, for example, parameters of the storage and commodity to be protected. These parameters preferably include the commodity class, the commodity configuration, the storage ceiling height. A referring step 103' provides for consulting a database of fire test data for one or more storage occupancy and stored commodity configurations. From the database, a selection step 105 can be performed to identify a hydraulic design area and fluid deliver delay period that were effective for a storage occupancy and stored commodity configuration corresponding to the parameters compiled in the compiling step 102' to support and create a sprinkler operational area 26 for addressing a test fire. The identified hydraulic design areas and fluid delivery delay period can be implemented in a system design for the construction of ceiling-only dry sprinkler system capable of protecting a storage occupancy with a surround and drown effect.

Method of Using Design Criteria to Develop System Parameters for Storage Occupancy The preferred methodology 100 accordingly identifies the three design criteria as discussed earlier: a preferred hydraulic design area, a minimum fluid delivery delay period and a maximum fluid delivery delay period. Incorporation of the minimum and maximum fluid delivery delay period into the design and construction of the sprinkler system 10 is preferably an iterative process by which the a system 10 can be dynamically modeled to determine if the sprinklers within the system 10 experiences a fluid delivery delay that falls within the range of the identified maximum and minimum mandatory delay periods. Preferably, all the sprinklers experience a fluid delivery delay period within the range of the identified maximum and minimum fluid delivery delay periods. Alternatively, however, the system 10 can be configured such that one or a selected few of the sprinklers 20 are configured with a mandatory fluid delivery delay period which provides for the thermal actuation of a minimum number of sprinklers surrounding each of the select sprinklers to form a sprinkler operational area 26.

Preferably, a dry sprinkler system 10 having a hydraulic design area 25 to support a surround and drown effect can be mathematically modeled so as to include one or more activated sprinklers. The model can further characterize the flow of liquid and gas through the system 10 over time following an event which triggers a trip of the primary water control valve. The mathematical model can be utilized to solve for the liquid discharge pressures and discharge times from any activated sprinkler. The water discharge times from the model can be evaluated to determine system compliance with the mandatory fluid delivery times. Moreover, the modeled system can be altered and the liquid discharge characteristics can be repeatedly solved to evaluate changes to the system 10 and to bring the system into compliance with the design criteria of a preferred hydraulic design area and mandatory fluid delivery delay period. To facilitate modeling of the dry sprinkler system 10 and to solve for the liquid discharge times and characteristics, a user can utilize computational software capable of building and solving for the hydraulic performance of the sprinkler 10. Alternatively, to iteratively designing and modeling the system 10, a user can physically build a system 10 and modify the system 10 by changing, for example, pipe lengths or introducing other devices to achieve the designed fluid delivery delays for each sprinkler on the circuit. The system can then be tested by activating any sprinkler in the system and determining whether the fluid delivery from the primary water control valve to the test sprinkler is within the design criteria of the minimum and maximum mandatory fluid delivery delay periods.

The preferred hydraulic design area 25 and mandatory fluid delivery delay periods define design criteria that can be incorporated for use in the compiling step 120 of the preferred design methodology 100 as shown in the flow chart of FIG. 10. The criteria of step 120 can be utilized in a design and construction step 122 to model and implement the system 10. More specifically, a dry pipe sprinkler system 10 for protection of a stored commodity can be modeled so as to capture the pipe characteristics, pipe fittings, liquid source, risers, sprinklers and various tree-type or branching configurations while accounting for the preferred hydraulic design area and fluid delivery delay period. The model can further include changes in pipe elevations, pipe branching, accelerators, or other fluid control devices. The designed dry sprinkler system can be mathematically and dynamically modeled to capture and simulate the design criteria, including the preferred hydraulic design area and the fluid delivery delay period. The fluid delivery delay period can be solved and simulated using a computer program described, for example, in U.S. patent application Ser. No. 10/942,817 filed Sep. 17, 2004, published as U.S. Patent Publication No. 2005/0216242, and entitled "System and Method for Evaluation of Fluid Flow in a Piping System," which is incorporated by reference in its entirety. To model a sprinkler system in accordance with the design criteria, another software program can be used that is capable of sequencing sprinkler activation and simulating fluid delivery to effectively model formation and performance of the preferred hydraulic design area 25. Such a software application is described in PCT International Patent Application filed on Oct. 3, 2006 entitled, "System and Method For Evaluation Of Fluid Flow in a Piping System," having Docket Number S-FB-0091 WO (73434-029WO) and claiming priority to U.S. Provisional Patent Application 60/722,401 filed on Oct. 3, 2005. Described therein is a computer program and its underlying algorithm and computational engines that performs sprinkler system design, sprinkler sequencing and simulates fluid delivery. Accordingly, such a computer program can design and dynamically model a sprinkler system for the protection of a given commodity in a given storage area. The designed and modeled sprinkler system can further simulate and sequence of sprinkler activations in accordance with the time-based predictive sprinkler activation profile 404, discussed above, to dynamically model the system 10. The preferred software application/computer program is also shown and described in the user manual entitled "SprinkFDT™ SprinkCALC™: SprinkCAD Studio User Manual" (September 2006).

The dynamic model can, based upon sprinkler activation and piping configurations, simulate the water travel through the system 10 at a specified pressure to determine if the hydraulic design criteria and the minimum and maximum mandatory fluid delivery time criteria are satisfied. If water discharge fails to occur as predicted, the model can be modified accordingly to deliver water within the requirements of the preferred hydraulic design area and the mandatory fluid delivery periods. For example, piping in the modeled system can be shortened or lengthened in order that water is discharged at the expiration of the fluid delivery delay period. Alternatively, the designed pipe system can include a pump to comply with the fluid delivery requirements. In one aspect, the model can be designed and simulated with sprinkler activation at the most hydraulically remote sprinkler to determine if fluid delivery complies with the specified maximum fluid delivery time such that the hydraulic design area 25 can be thermally triggered. Moreover, the simulated system can provide for sequencing the thermal activations of preferably the four most hydraulically remote sprinklers to solve for a simulated fluid delivery delay period. Alternatively, the model can be simulated with activation at the most hydraulically close sprinkler to determine if fluid delivery complies with a minimum fluid delivery delay period so as to thermally trigger the critical number of sprinklers. Again moreover, the simulated system can provide for sequencing the thermal activations of preferably the four most hydraulically close sprinklers to solve for a simulated fluid delivery delay period. Accordingly, the model and simulation of the sprinkler system can verify that the fluid delivery to each sprinkler in the system falls within the range of the maximum and minimum fluid delivery tubes. Dynamic modeling and simulation of a sprinkler system permits iterative design techniques to be used to bring sprinkler system performance in compliance with design criteria rather than relying on after construction modifications of physical plants to correct for non-compliance with design specifications.

Figure 14:
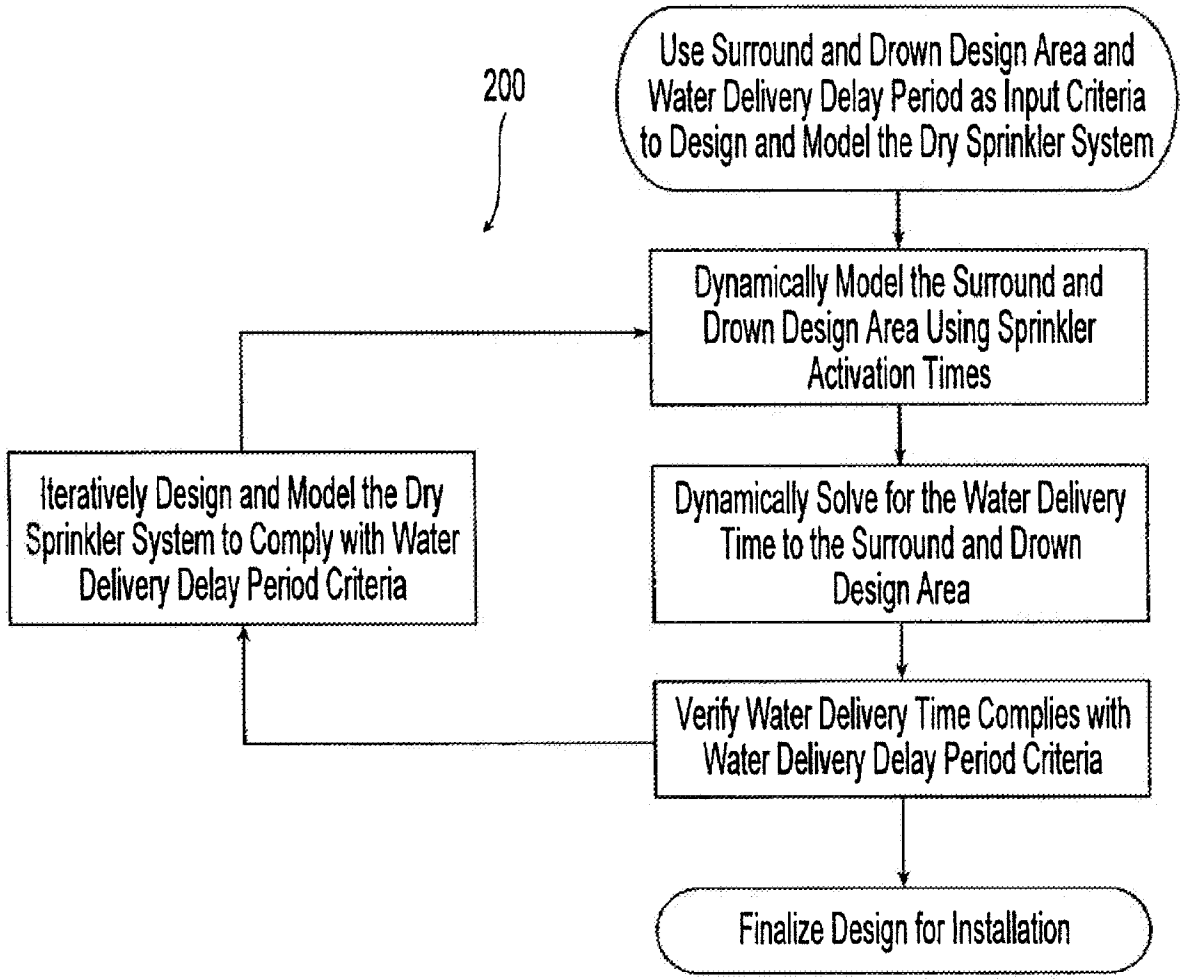
FIG. 14 is an illustrative flowchart for design and dynamic modeling of a sprinkler system.

Shown in FIG. 14 is an illustrative flowchart 200 for iterative design and dynamic modeling of a proposed dry sprinkler system 10. A model can be constructed to define a dry sprinkler system 10 as a network of sprinklers and piping. The grid spacing between sprinklers and branch lines of the system can be specified, for example, 10 ft. by 10 ft., 10 ft. by 8 ft., or 8 ft. by 8 ft. between sprinklers. The system can be modeled to incorporate specific sprinklers such as, for example, 16.8 K-factor 286° F. upright sprinklers having a specific application for storage such as the ULTRA K17 sprinkler provided by Tyco Fire and Building Products and shown and described in TFP331 data sheet entitled "Ultra K17—16.8 K-factor: Upright Specific Application Control Mode Sprinkler Standard Response, 286° F./141° C." (March 2006) which is incorporated in its entirety by reference. However, any suitable sprinkler could be used provided the sprinkler can provide sufficient fluid volume and cooling effect to bring about the surround and drown effect. More specifically, the suitable sprinkler provides a satisfactory fluid discharge volume, fluid discharge velocity vector (direction and magnitude) and fluid droplet size distribution. Examples of other suitable sprinklers include, but are not limited to the following sprinklers provided by Tyco Fire & Building Products: the SERIES ELO-231—11.2 K-Factor upright and pendant sprinklers, standard response, standard coverage (data sheet TFP340 (January 2005)); the MODEL K17-231—16.8 K-Factor upright and pendant sprinklers, standard response, standard coverage (data sheet (January 2005)); the MODEL EC-25—25.2 K-Factor extended coverage area density upright sprinklers (data sheet TFP213 (September 2004); models ESP R-25-25.2 K-factor (data sheet TFP312 (January 2005), ESFR-17—16.8 K-factor (datasheet TFP315 (January 2005)) (data sheet TFP316 (April 2004)), and ESFR-1—14.0 K-factor (data sheet TFP318 (July 2004)) early suppression fast response upright and pendant sprinklers, each of which is shown and described in its respective data sheets which are incorporated by reference in their entirety. In addition, the dry sprinkler system model can incorporate a water supply or "wet portion" 12 of the system connected to the dry portion 14 of the dry sprinkler system 10. The modeled wet portion 12 can include the devices of a primary water control valve, backflow preventer, fire pump, valves and associated piping. The dry sprinkler system can be further configured as a tree or tree with loop ceiling-only system.

The model of the dry sprinkler system can simulate formation of the sprinkler operational area 26 by simulating a set of activated sprinklers for a surround and drown effect. The sprinkler activations can be sequenced according to user defined parameters such as, for example, a sequence that follows the predicted sprinkler activation profile. The model can further incorporate the preferred fluid delivery delay period by simulating fluid and gas travel through the system 10 and out from the activated sprinklers defining the preferred hydraulic design area 25. The modeled fluid delivery times can be compared to the specified mandatory fluid delivery delay periods and the system can be adjusted accordingly such that the fluid delivery times are in compliance with the mandatory fluid delivery delay period. From a properly modeled and compliant system 10, an actual dry sprinkler system 10 can be constructed.

Figure 18:
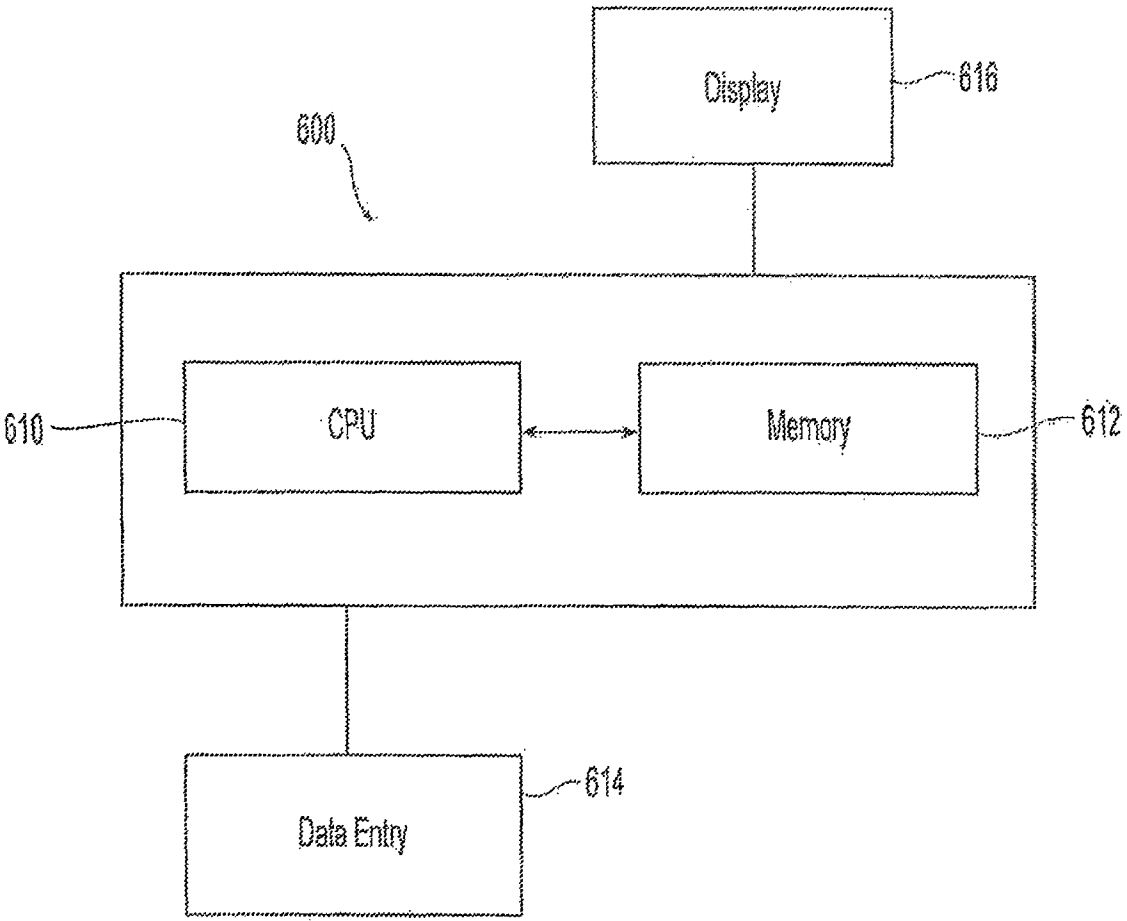
FIG. 18 is a schematic view of a computer processing device for practicing one or more aspects of the preferred systems and methods of fire protection.
Figure 18A:
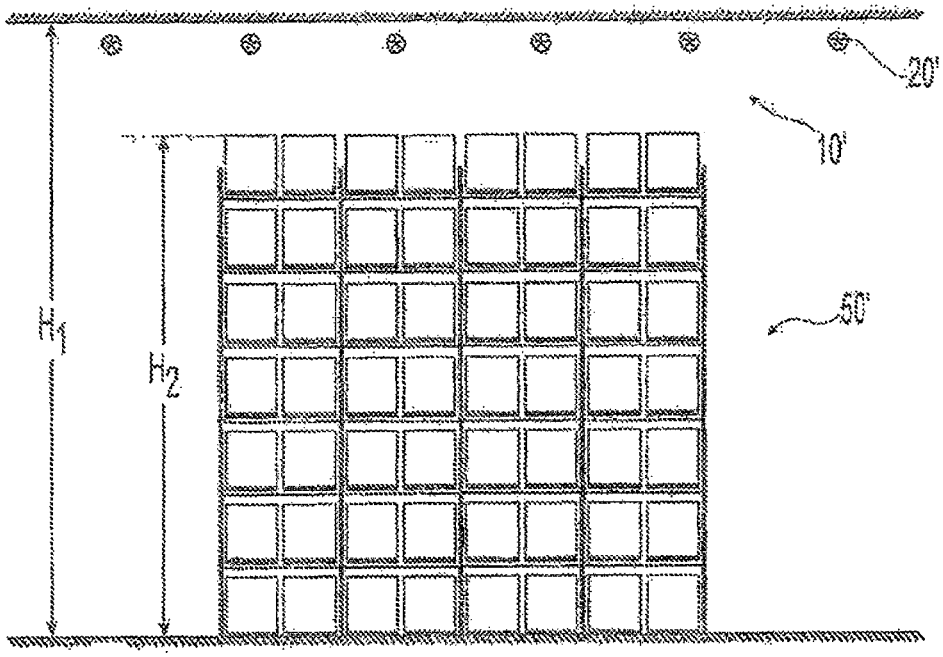
FIGS. 18A-18C are side, front and plan views of a preferred fire protection system.
Figure 18B:
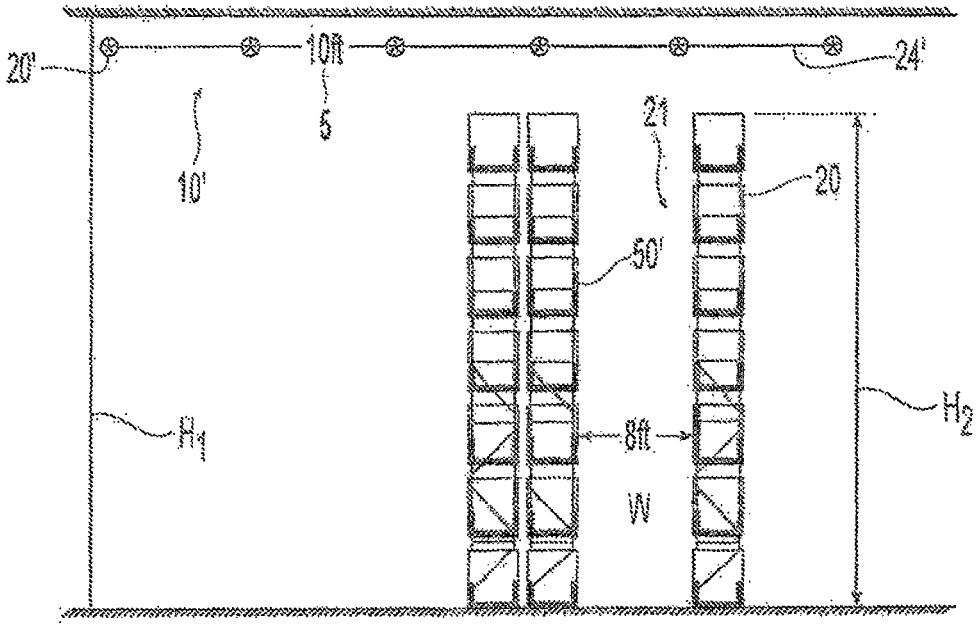
Figure 18C:
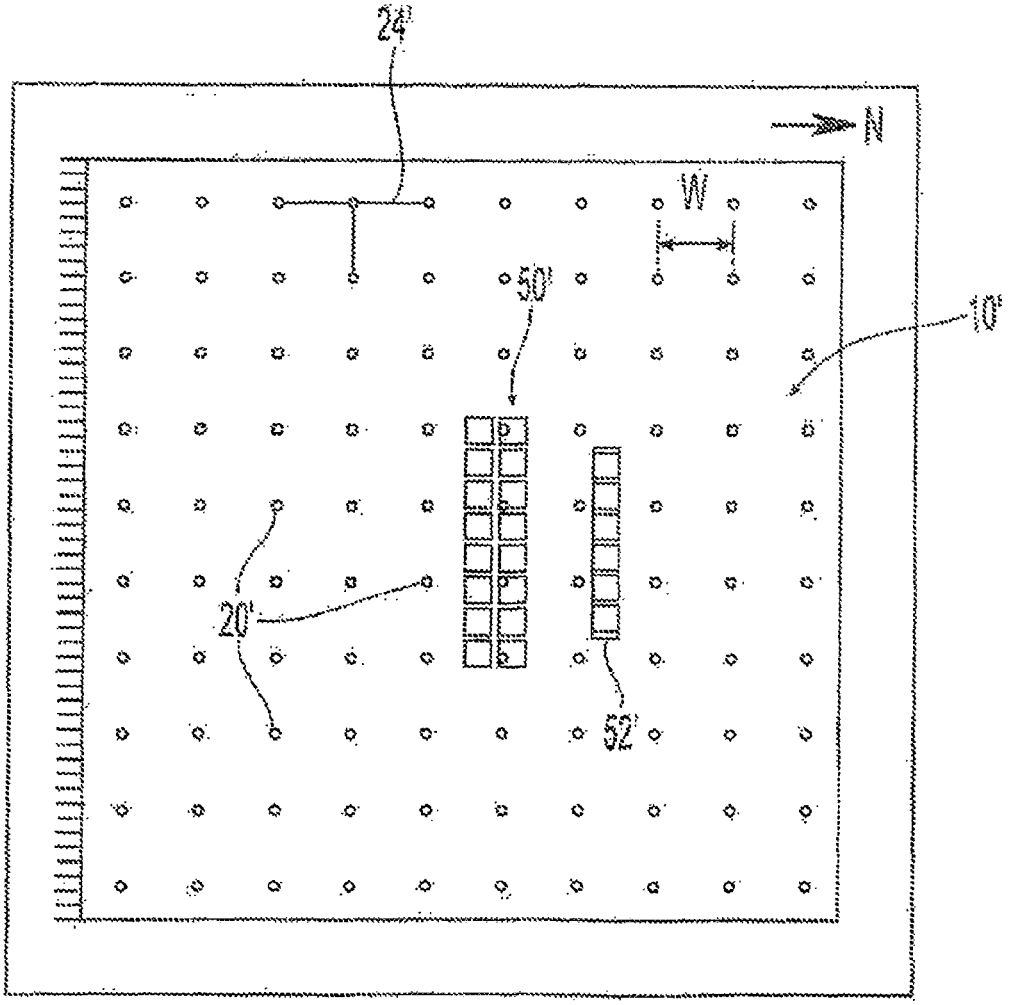

Shown in FIG. 18A, FIG. 18B and FIG. 18C is a preferred dry pipe fire protection system 10' designed in accordance with the preferred design methodology described above. The system 10' is preferably configured for the protection of a storage occupancy. The system 10' includes a plurality of sprinklers 20' disposed over a protection area and beneath a ceiling. Within the storage area is at least one rack 50 of a stored commodity. Preferably, the commodity is categorized under NFPA-13 commodity classes: Class I, Class II, Class III and Class IV and/or Group A, Group B, and Group C plastics. The rack 50 is located between the protection area and the plurality of sprinklers 20'. The system 10' includes a network of pipes 24' that are configured to supply water to the plurality of sprinklers 20'. The network of pipes 24' is preferably designed to deliver water to a hydraulic design area 25'. The design area 25' is configured so as to include the most hydraulically remote sprinkler in the plurality of sprinklers 20'. The network of pipes 24' are preferably filled with a gas until at least one of the sprinklers 20' is activated or a primary control valve is actuated. In accordance with the design methodology described above, the design area preferably corresponds to the design areas provided in NFPA-13 for wet sprinkler systems. More preferably, the design area is equivalent to 2000 sq. ft. In alternative embedment, the design area is less than the design areas provided NFPA-13 for wet sprinkler systems.

Alternatively, as opposed to constructing a new sprinkler system for employing a surround and drown effect, existing wet and dry sprinkler systems can be retrofitted to employ a sprinkler operational area to protect a storage occupancy with the surround and drown effect. For existing wet systems, a conversion to the desired system for a surround and drown effect can be accomplished by converting lie system to a dry system by inclusion of a primary water control valve and necessary components to ensure that a mandatory fluid delivery delay period to the most hydraulically remote sprinkler is attained. Because the inventors have discovered that the hydraulic design area in the preferred embodiment of the preferred surround and drown sprinkler system can be equivalent to the hydraulic design area of a wet system designed under NFPA-13, those skilled in the art can readily apply the teachings of the surround and drown technique to existing wet systems. Thus applicants have provided an economical realistic method for converting existing wet sprinkler systems to preferred dry sprinkler systems.

Furthermore, those of skill can take advantage of the reduced hydraulic discharge of the preferred sprinkler operational area in a surround and drown system to modify existing dry systems to produce the same operational area capable of surrounding and drowning a fire. In particular, components such as, for example, accumulators or accelerators can be added to existing dry sprinkler systems to ensure that the most hydraulically remote sprinkler in the system experiences a mandatory fluid delivery delay upon activation of the sprinklers. The inventors believe an existing wet or dry sprinkler system reconfigured to address a fire with a surround and drown effect can eliminate or otherwise minimize the economic disadvantages of current sprinkler systems. By addressing fires with a surround and drown configuration unnecessary water discharge may be avoided. Moreover, the inventors believe that the fire protection provided by the preferred sprinkler operational area may provide better fire protection than the existing systems.

In view of the inventors' discovery of a system employing a surround and drown configuration to address a fire and the inventors' further development of methodologies for implementing such a system, various systems, subsystems and processes are now available for providing fire protection components systems, design approaches and applications, preferably for storage occupancies, to one or more parties such as intermediate or end users such as, for example, fire protection manufacturers, suppliers, contractors, installers, building owners and/or lessees. For example, a process can be provided for a method of a dry ceiling-only fire protection system that utilizes the surround and drown effect. Additionally or alternatively provided can be a sprinkler qualified for use in such a system. Further provided can be is a complete ceiling-only fire protection system employing a the surround and drown effect and its design approach. Offerings of fire protections systems and its methodologies employing a surround and drown effect can be further embodied in design and business-to-business applications for fire protection products and services.

In an illustrative aspect of providing a device and method of fire protection, a sprinkler is preferably obtained for use in a ceiling-only, preferably dry sprinkler fire protection system for the protection of a storage occupancy. More specifically, preferably obtained is a sprinkler 20 qualified for use in a dry ceiling-only fire protection system for a storage occupancy 70 over a range of available ceiling heights H1 for the protection of a stored commodity 50 having a range of classifications and range of storage heights H2. More preferably, the sprinkler 20 is listed by an organization by an authority having jurisdiction such us, for example, NFPA or UL for use in a dry ceiling-only fire protection system for life protection of, for example, any one of a Class I, II, III and IV commodity ranging in storage height from about twenty feet to about forty feet (20-40 ft.) or alternatively, a Group A plastic commodity having a storage height of about twenty feet. Even more preferably, the sprinkler 20 is qualified for use in a dry ceiling-only fire protection system, such as sprinkler system 10 described above, configured to address a fire event with a surround and drown effect.

Figure 15:
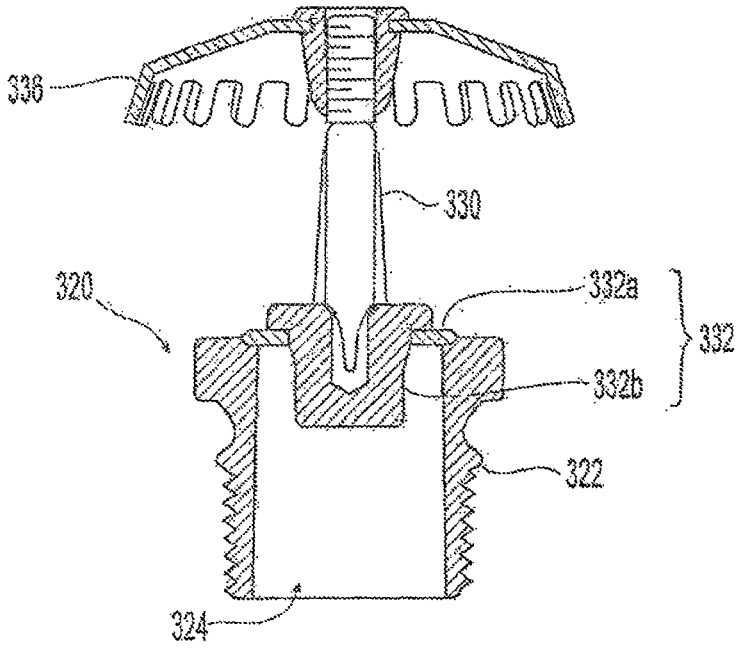
FIG. 15 is cross-sectional view of preferred sprinkler for use to the sprinkler system of FIG. 1.
Figure 16:
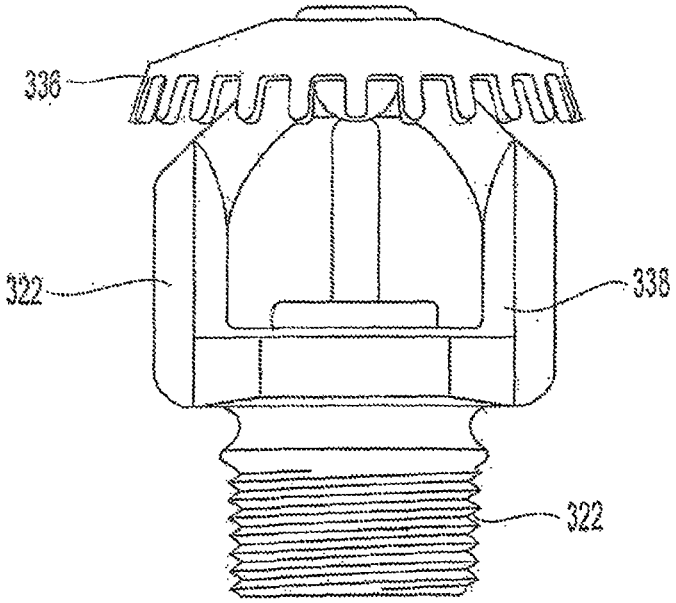
FIG. 16, is a plan view of the sprinkler of FIG. 15.

Obtaining the preferably listed sprinkler can more specifically include designing, manufacturing and/or acquiring the sprinkler 20 for use in a dry ceiling-only fire protection system 10. Designing or manufacturing the sprinkler 20 includes, as seen for example in FIGS. 15 and 16, a preferred sprinkler 320 having a sprinkler body 322 with an inlet 324, outlet 326 and a passageway 328 therebetween to define a K-factor of eleven (11) or greater and more preferably about seventeen and even more preferably of about 16.8. The preferred sprinkler 320 is preferably configured as an upright sprinkler although other installation configurations are possible. Preferably disposed within the outlet 326 is a closure assembly 332 having a plate member 322a and plug member 332b. One embodiment of the preferred sprinkler 320 is provided as the ULTRA K17 sprinkler from Tyco Fire & Building Products, as shown and described in TFP331 data sheet.

The closure assembly 332 is preferably supported in place by a thermally rated trigger assembly 330. The trigger assembly 330 is preferably thermally rated to about 286° F. such that in the face of such a temperature, the trigger assembly 330 actuated to displace the closure assembly 332 from the outlet 326 to permit discharge from the sprinkler body. Preferably, the trigger assembly is configured as a bulb-type trigger assembly with a Response Time Index 190 $(ft\text{-}sec)^{1/2}$. The RTI of the sprinkler can alternatively be appropriately configured to suit the sprinkler conjuration and sprinkler-to-sprinkler spacing of the system.

The preferred sprinkler 320 is configured with a designed operating or discharge pressure to provide a distribution of fluid to effectively address a fire event. Preferably, the design discharge pressure ranges from about fifteen pounds per square inch to about sixty pounds per square inch (15-60 psi), preferably ranging from about fifteen pounds per square inch to about forty-five pounds per square inch (15-45 psi.), more preferably ranging from about twenty pounds per square inch to about thirty five pounds per square inch (20-35 psi) and yet even more preferably ranging from about twenty-two pounds per square inch to about thirty pounds per square inch (22-30 psi). The sprinkler 320 further preferably includes a deflector assembly 336 to distribute fluid over a protection area in a manner that overwhelms and subdues a fire when employed in a dry ceiling-only protection system 10 configured for a surround and drown effect.

Another preferred aspect of the process of obtaining the sprinkler 320 can include qualifying the sprinkler for use in a dry ceiling-only fire protection system 10 for storage occupancy configured to surround and drown a fire. More preferably, the sprinkler 20 can be fire tested in a manner substantiality similar to the exemplary eight fire tests previously described. Accordingly, the sprinkler 320 can be located in a test plant sprinkler system having a storage occupancy at a ceiling height above a test commodity at a storage height. A plurality of the sprinkler 320 is preferably disposed within a sprinkler grid system suspended from the ceiling of the storage occupancy to define a sprinkler deflector-to-ceiling height and further define a sprinkler-to-commodity clearance height. In any given fire test, the commodity is ignited so as to initiate flame growth and initially thermally activate one or more sprinklers. Fluid delivery is delayed for a designed period of delay to the one or more initially thermally actuated sprinklers so as to permit the thermal actuation of a subsequent set of sprinklers to form a sprinkler operational area at designed sprinkler operating or discharge pressure capable of overwhelming and subduing the fire test.

The sprinkler 320 is preferably qualified for use in a dry ceiling-only sprinkler system for a range of commodity classifications and storage heights. For example, the sprinkler 320 is fire tested for any one of Class I, II, III, or IV commodity or Group A, Group B, of Group C plastics for a range of storage heights, preferably ranging between twenty feet and forty feet (20-40 ft.). The test plant sprinkler system can be disposed and fire tested at variable ceiling heights preferably ranging from between twenty-five feet to about forty-five feet (25-45 ft.) so as to define ranges of sprinkler-to-storage clearances. Accordingly, the sprinkler 320 can be fire tested within the test plant sprinkler system for at various ceiling heights, for a variety of commodities, various storage configurations and storage heights so as to qualify the sprinkler for use in ceiling-only fire protection systems of varying tested permutations of ceiling height, commodity classifications, storage configurations and storage height and those combination in between. Instead of testing or qualifying a sprinkle 320 for a range of storage occupancy and stored commodity configurations, the sprinkler 320 can be tested and qualified for a single parameter such as a preferred fluid delivery delay period for a given storage height and ceiling height.

More preferably, the sprinkler 320 can be qualified in such a manner so as to be "listed," which is defined by NFPA 13, Section 3.2.3 (2002) as equipment, material, or services included in a list published by an organization that is acceptable to the authority having jurisdiction and concerned with the evaluation of products or services and whose listing states that the either the equipment, material or service meets appropriate designated standards or has been tested and found suitable for a specific purpose. Thus, a listing organization such as, for example, Underwriters Laboratories, Inc., preferably lists the sprinkler 320 for use in a dry ceiling-only fire protection system of a storage occupancy over the range of tested commodity classifications, storage heights, ceiling heights and sprinkler-to-deflector clearances. Moreover, the listing would provide that the sprinkler 320 is approved or qualified for use in a dry ceiling-only system for a range of commodity classifications and storage configurations at those ceiling heights and storage heights falling in between the tested values.

Figure 17:
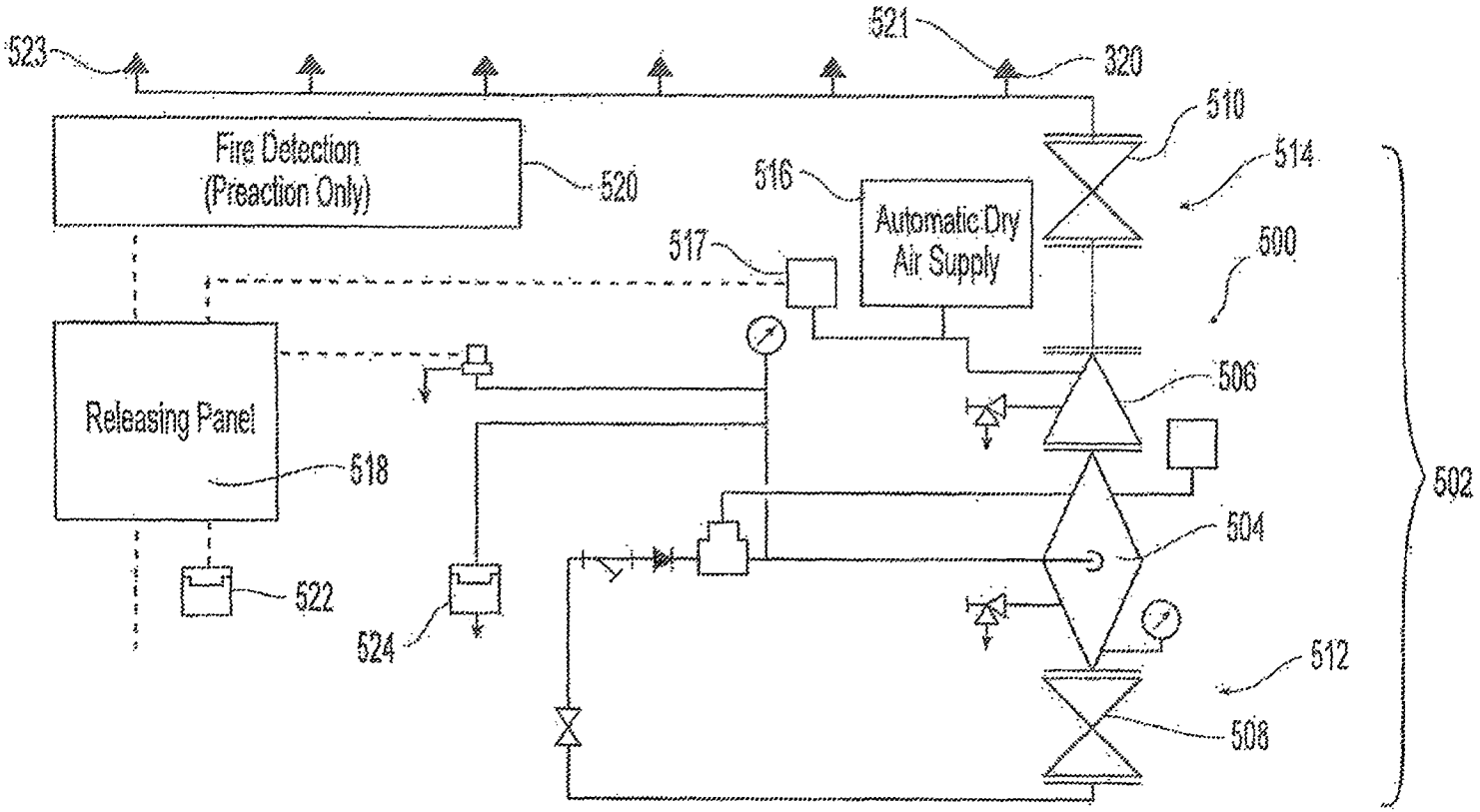
FIG. 17 is a schematic view of a riser assembly installed for use in the system of FIG. 1.

In one aspect of the systems and methods of fire protection, a preferred sprinkler, such as for example, the previously described qualified sprinkler 320, can be embodied, obtained and/or packaged in a preferred ceiling-only fire protection system 500 for use in fire protection of a storage occupancy. As seen for example, in FIG. 17, shown schematically is the system 500 for ceiling-only protection of a storage occupancy to address a fire event with a surround and drown effect. Preferably, the system 500 includes a riser assembly 502 to provide controlled communication between a fluid or wet portion 512 the system 500 and the preferably dry portion of the system 514.

The riser assembly 502 preferably includes a control valve 504 for controlling fluid delivery between the wet portion 512 and the dry portion 514. More specifically, the control valve 504 includes an inlet for receiving the fire fighting fluid from the wet portion 512 and further includes an outlet for the discharge of the fluid. Preferably, the control valve 504 is a solenoid actuated deluge valve actuated by solenoid 505, but other types of control valves can be utilized such as, for example, mechanically or electrically latched control valves. Further in the alternative, the control valve 504 can be an air-over-water ratio control valve, for example, as shown and described in U.S. Pat. No. 6,557,645 which is incorporated in its entirety by reference. One type of preferred control valve is the MODEL DV-5 DELUGE VALVE from Tyco Fire & Building Products, shown and described in the Tyco data sheet TFP1305, entitled, "Model DV-5 Deluge Valve, Diaphragm Style, 1-½ thru 8 Inch (DN40 thru DN200, 250 psi (17.2 bar) Vertical or Horizontal Installation" (March 2006), which is incorporated herein in its entirety by reference. Adjacent the outlet of the control valve is preferably disposed a check-valve to provide an intermediate area or chamber open to atmospheric pressure. To isolate the deluge valve 504, the riser assembly further preferably includes two isolating valves disposed about the deluge valve 504. Other diaphragm control valves 504 that can be used in the riser assembly 502 are shown and described in U.S. Pat. Nos. 6,095,484 and 7,050,578 and U.S. patent application Ser. No. 11,450,891.

Figure 21:
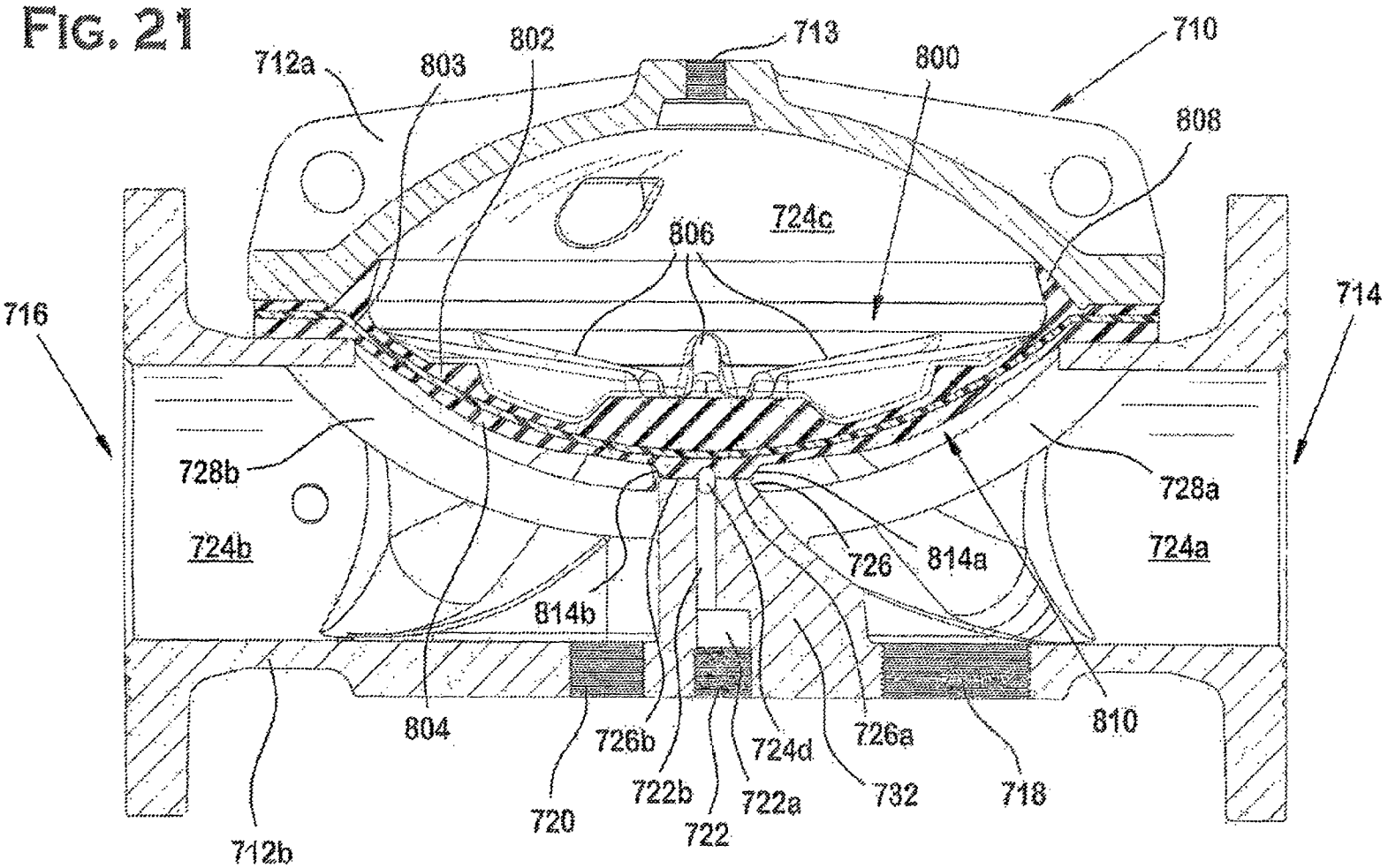
FIG. 21 is a cross-sectional view of a preferred control valve for use in the riser assembly of FIG. 17.

In an alternative configuration, the riser assembly or control valve 504 can include a modified diaphragm style control valve so as to include a separate chamber, i.e. a neutral chamber, to define an air or gas seat thereby eliminating the need for the separate check valve. Shown in FIG. 21 is an illustrative embodiment of a preferred control valve 710. The valve 710 includes a valve body 712 through which fluid can flow in a controlled manner. More specifically, the control valve 710 provides a diaphragm-type hydraulic control valve for preferably controlling the release and mixture of a first fluid volume having a first fluid pressure, such as for example a water main, with a second fluid volume at a second fluid pressure, such as for example, compressed gas contained in a network of pipes. Accordingly, the control valve 710 can provide fluid between liquids, gasses or combinations thereof.

The valve body 712 is preferably constructed from two parts: (I) a cover portion 712a and (ii) a lower body portion 712b. "Lower body" is used herein as a matter of reference to a portion of the valve body 712 coupled to the cover portion 712a when the control valve is fully assembled. Preferably, the valve body 712 and more specifically, the lower body portion 712b includes an inlet 714 and outlet 716.

The valve body 712 also includes a drain 718 diverting the first fluid entering the valve 710 through the inlet 714 to outside the valve body. The valve body 712 further preferably includes an input opening 720 for introducing the second fluid into the body 712 for discharge out the outlet 716. The control valve 710 also includes a port 722. The port 722 can provide means for an alarm system to monitor the valve for any undesired fluid communication from and/or between the inlet 714 and the outlet 716. For example, the port 722 can be used for providing an alarm port to the valve 710 so that individuals can be alerted as to any gas or liquid leak from the valve body 712. In particular, the port 722 can be coupled to a flow meter and alarm arrangement to defect the fluid or gas leak in the valve body. The port 722 is preferably open to atmosphere and in communication with an intermediate chamber 724d disposed between the inlet 714 and the outlet 716.

The fire cover 712a and the lower body 712b each include an inner surface such that when the cover and lower body portion 712a, 712b are joined together, the inner surfaces further define a chamber 724. The chamber 724, being in communication with the inlet 714 and the outlet 716, further defines a passageway through which a fluid, such as water, can flow. Disposed within the chamber 724 is a flexible preferably elastomeric member 800 for controlling the flow of fluid through the valve body 712. The elastomeric member 800 is more preferably a diaphragm member configured for providing selective communication between the inlet 714 and the outlet 716. Accordingly, the diaphragm has at least two positions within the chamber 724: (i) a lower most fully closed or sealing position and (ii) an upper most or fully open position. In the lower most closed or sealing position, the diaphragm 800 engages a seat member 726 constructed or formed as an internal rib or middle flange within the inner surface of the valve body 172 thereby sealing off communication between the inlet 714 and the outlet 716. With the diaphragm 800 in the closed position, the diaphragm 800 preferably dissects the chamber 724 into at least three regions or sub-chambers 724a, 724b and 724c. More specifically formed with the diaphragm member 800 in the closed position is a first fluid supply or inlet chamber 724a in communication with the inlet 714, a second fluid supply or outlet chamber 724b in communication with the outlet 716 and a diaphragm chamber 724c. The cover 712a preferably includes a central opening 713 for introducing an equalizing fluid into the diaphragm chamber 724c to urge and hold the diaphragm member 800 in the closed position.

In operation of the control valve 800, the equalizing fluid can be relieved from the diaphragm chamber 724c in preferably a controlled manner, electrically or mechanically, to urge the diaphragm member 800 to the fully open or actuated position, in which the diaphragm member 800 is spaced from the seat member 726 thereby permitting the flow of fluid between the inlet 714 and the outlet 716. The diaphragm member 800 includes an supper surface 802 and a lower surface 804. Each of the upper and lower surface areas 802, 804 are generally sufficient in size to seal off communication of the inlet and outlet chamber 824a, 824b from the diaphragm chamber 824c. The upper surface 802 preferably includes a centralized of interior ring element and radially extending therefrom are one or more tangential rib members 806. The tangential ribs 806 and interior ring are preferably configured to urge the diaphragm 800 to the sealing position upon, for example, application of an equalizing fluid to the upper surface 802 of the diaphragm member 800. Additionally, the diaphragm 800 preferably includes an outer elastomeric ring element 808 to further urge the diaphragm member 800 to the closed position. The outer preferably angled surface of the flexible ring element 808 engages and provides pressure contact with a portion of the valve body 712 such as, for example, the interior surface of the cover 712a.

In its closed position, the lower surface 804 of the diaphragm member 800 preferably defines a centralized bulged portion 810 thereby presenting a substantially convex surface, and more preferably a spherical convex surface, with respect to the seat member 726 to seal off the inlet and outlet chambers 724a and 724b. The lower surface 804 of the diaphragm member 800 further preferably includes a pair of elongated sealing elements or projections 814a, 814b to form a sealed engagement with the seat member 726 of the valve body 712. The sealing elements 814a, 814b are preferably spaced apart so as to define a void or channel therebetween. The sealing elements 814a, 814b are configured to engage the seat member 726 of the valve body 712 when the diaphragm is in the closed position so as to seal off communication between the inlet 714 and the outlet 716 and more specifically seal off communication between the inlet chamber 724a and the outlet chamber 724b. Furthermore, the sealing members 714a, 714b engage the seat member 726 such that the channel cooperates with the seat member 26 to form an intermediate chamber 724d in a manner described in greater detail herein below.

Extending along in a direction from inlet to outlet are brace or support members 728a, 728b to support the diaphragm member 800. The seat member 726 extends perpendicular to the inlet-to-outlet direction so as to effectively divide the chamber 724 in the lower valve body 712b into the preferably spaced apart and preferably equal sized sub-chambers of the inlet chamber 724a and the outlet chamber 724b. Moreover, the elongation of the seat member 726 preferably defines a curvilinear are having an arc length to mirror the convex surface of the lower surface 804 of the diaphragm 800. Further extending along the preferred are length of the seat member 726 is a groove constructed or formed in the surface of the seat member 726. The groove bisects the engagement surface of the seat member 726 preferably evenly along the seat member length. When the diaphragm member 800 is in the closed positioned, the elongated sealing members 814a, 814b engage the bisected surface of the seat members 726. Engagement of the sealing members 814a, 814b with the engagement surfaces 726a, 726b of the seat member 726 further places the channel of the diaphragm 800 in communication with the groove.

The seat member 726 is preferably formed with a central base member 732 that further separates and preferably spaces the inlet and outlet chambers 724a, 724b and diverts fluid in a direction between the diaphragm 800 and the seat member engagement surfaces 726a, 726b. The port 722 is preferably constructed from one or more voids formed in the base member 732. Preferably, the port 722 includes a first cylindrical portion 722a in communication with a second cylindrical portion 22b each formed in the base member 732. The port 722 preferably intersects and is in communication with the groove of the seat member 726, and wherein when the diaphragm member 800 is in the closed position, the port 722 is further preferably in sealed communication with the channel formed in the diaphragm member 800.

The communication between the diaphragm channel, the seat member groove and the port 722 is preferably bound by the sealed engagement of the sealing elements 814a, 814b with the seat member surfaces 726a, 726b, to thereby preferably define the forth intermediate chamber 724d. The intermediate chamber 724d is preferably open to atmosphere thereby further defining a fluid seat, preferably an air seat to separate the inlet and outlet chambers 724a, 724b. Providing an air seat between the inlet and outlet chambers 724a, 724b allow each of the inlet and outlet chambers to be filled and pressurized while avoiding failure of the sealed engagement between the sealing element 814 and the seat member 726. Accordingly, the preferred diaphragm-type valve 710 can eliminate the need for a downstream check-valve. more specifically, because each sealing element 814 is acted upon by a fluid force on one side of the element and preferably atmospheric pressure on the other, the fluid pressure in the diaphragm chamber 724c is effective to maintain the sealed engagement between the sealing elements 814 and the seat member 726 during pressurization of the inlet and outlet chambers 724a, 724b.

The control valve 710 and the riser assembly 502 to which it is connected can be placed into service by preferably bringing the valve 710 to the normally closed position and subsequently bringing the inlet chamber 724a and the outlet chamber 724b to operating pressure. In one preferred installation, the primary fluid source is initially isolated from the inlet chamber 724a by way of a shut-off control valve such as, for example, a manual control valve located upstream from the inlet 714. The secondary fluid source is preferably initially isolated from the outlet chamber 724b by way of a shut-off control valve located upstream from the input opening 720. An equalizing fluid, such as water from the primary fluid source is then preferably introduced into the diaphragm chamber 724c through the central opening 713 in the cover 712a. Fluid is continuously introduced into the chamber 724c until the fluid exerts enough pressure P1 to bring the diaphragm member 800 to the closed position in which the lower surface 804 engages the seat member 726 and the sealing elements 814a, 814b form a sealed engagement about the seat member 726.

With the diaphragm member 800 in the closed position, the inlet and outlet chambers 724a, 724b can be pressurized respectively by the primary and secondary fluids. More specifically, the shut-off valve isolating the primary fluid can be opened so as to introduce fluid through the inlet 14 and into the inlet chamber 724a to preferably achieve a static pressure P2. The shut-off valve isolating the compressed gas can be opened to introduce the secondary fluid through the input opening 720 to pressurize the outlet chamber 724b be normally closed system coupled to the outlet 716 of the control valve 710 to achieves pressure P3.

The presence of the intermediate chamber 724d separating the inlet and outlet chamber 724a, 724b and which is normally open to atmosphere, maintains the primary fluid pressure P2 to one side of the sealing member 814a and the secondary fluid pressure P3 to one side of the other sealing member 814b. Thus, diaphragm member 800 and its sealing members 814a, 814b are configured so as to maintain the scaled engagement with the seat member 726 under the influence of the diaphragm chamber pressure P1. Accordingly, the upper and lower diaphragm surface areas are preferably sized such that the pressure P1 is large enough to provide a closing force on the upper surface of the diaphragm member 800 so as to overcome the primary and secondary fluid pressures P2, P3 urging the diaphragm member 800 to the open position. However, preferably the ratio of the diaphragm pressure to either the primary fluid pressure P1:P2 or the secondary fluid pressure P1:P3 is minimized such that the valve 710 maintains a fast opening response, i.e. a low trip ratio, to release fluid from the inlet chamber when needed. More preferably, every 1 psi. of diaphragm pressure P1 is at least effective to seal about 1.2 psi of primary fluid pressure P2.

The dry portion 514 of the system 500 preferably includes a network of pipes having a main and one or more branch pipes extending from the main for disposal above a stored commodity. The dry portion 514 of the system 500 is further preferably maintained in its dry state by a pressurized air source 516 coupled to the dry portions 514. Spaced along the branch pipes are the sprinklers qualified for ceiling-only protection in the storage occupancy, such as for example, the preferred sprinkler 320. Preferably, the network of pipes and sprinklers are disposed above the commodity so as to define a minimum sprinkler-to-storage clearance and more preferably a deflector-to-storage clearance of about thirty-six inches. Wherein the sprinklers 320 are upright sprinklers, the sprinklers 320 are preferably mounted relative to the ceiling such that the sprinklers define a deflector-to-ceiling distance of about seven inches (7 in.). Alternatively, the deflector-to-ceiling distance can be based upon known deflector-to-ceiling spacings for existing sprinklers, such as large drop sprinklers as provided by Tyco Fire & Building Products.

The dry portion 514 can include one or more cross mains so as to define either a tree configuration pr more preferably a loop configuration. The dry portion is preferably configured with a hydraulic design area made of about twenty-five sprinklers. Accordingly, the inventor's have discovered a hydraulic design area for a dry ceiling-only sprinkler system. The sprinkler-to-sprinkler spacing can range from a minimum of about eight feet to a maximum of about 12 feet for unobstructed construction, and is more preferably about ten feet for obstructed construction. Accordingly, the dry portion 514 can be configured with a hydraulic design area less than current dry fire protection systems specified under NFPA 13 (2002), Preferably, the dry portion 514 is configured so as to define a coverage area on a per sprinkler bases ranging from about eighty square feet (80 $ft.^2$) to about one hundred square feet (100 $ft.^2$).

As described above, the surround and drown effect is believed to be dependent upon a designed or controlled fluid delivery delay following one or more initially thermally actuated sprinklers to permit a fire event to grow and further thermally actuate additional sprinklers to form a sprinkler operational area to overwhelm and subdue the fire event. The fluid delivery from the wet portion 512 to the dry portion 514 is controlled by actuation of the control valve 506. To control actuation of the control valve, the system 500 preferably includes a releasing control panel 518 to energize the solenoid valve 505 to operate the solenoid valve. Alternatively, the control valve can be controlled, wired or otherwise configured such that the control valve is normally closed by an energized solenoid valve and accordingly actuated open by de-energizing signal to the solenoid valve. The system 500 can be configured as a dry preaction system and is more preferably configured as a double-interlock preaction system based upon in-part, a detection of a drop in air pressure in the dry portion 514. To ensure that the solenoid valve 505 is appropriately energized in response to a loss in pressure, the system 500 further preferably includes an accelerator device 517 to reduce the operating time of the control valve in a preaction system. The accelerator device 517 is preferably configured to detect a small rate of decay in the air pressure of the dry portion 514 to signal the releasing panel 518 to energize the solenoid valve 505. Moreover the accelerator device 517 can be a programmable device to program and effect an adequate minimum fluid delivery delay period. One preferred embodiment of the accelerator device is the Model QRS Electronic Accelerator from Tyco Fire & Building Products as shown and described in Tyco data sheet TFP1100 entitled, "Model QRS Electronic Accelerator (Quick Opening Device) For Dry Pipe or Preaction Systems" (May 2006). Other accelerating devices can be utilized provided that the accelerator device is compatible with the pressurized source and/or the releasing control panel when employed.

Where the system 500 is preferably configured as a dry double-interlock preaction system, the releasing control panel 518 can be configured for communication with one or more fire detectors 520 to inter-lock the panel 518 in energizing the solenoid valve 505 to actuate the control valve 504. Accordingly, one or more fire detectors 520 are preferably spaced from the sprinklers 320 throughout the storage occupancy such that the fire detectors operate before the sprinklers in the event of a fire. The detectors 520 can be any one of smoke, heat or any other type capable to detect the presence of a fire provided the detector 520 can generate signal for use by the releasing control panel 518 to energize the solenoid valve to operate the control valve 504. The system can include additional manual mechanical or electrical pull stations 522, 524 capable of setting conditions at the panel 518 to actuate the solenoid valve 505 and operate the control valve 504 for the delivery of fluid. Accordingly, the control panel 518 is configured as a device capable of receiving sensor information, data, or signals regarding the system 500 and/or the storage occupancy which it processes via relays, control logic, a control processing unit or other control module to send an actuating signal to operate the control valve 504 such as, for example, energize the solenoid valve 505.

In connection with providing a preferred sprinkler for use in a dry ceiling-only fire protection system or alternatively in providing the system itself, the preferred device, system or method of use further provides design criteria for configuring the sprinkler and/or systems to effect a sprinkler operational area having a surround and drown configuration for addressing a fire event in a storage occupancy. A preferred ceiling-only dry sprinkler system configured for addressing a fire event with a surround and drown configuration, such as for example, system 500 described above includes a sprinkler arrangement relative to a riser assembly to define one or more most hydraulically remote or demanding sprinklers 521 and further define one or more hydraulically close or least demanding sprinklers 523. Preferably, the design criteria provides the maximum and minimum fluid delivery delay periods for the system to be respectively located at the most hydraulically remote sprinklers 521 and the most hydraulically close sprinklers 523. The designed maximum and minimum fluid delivery delay periods being configured to ensure that each sprinkler in the system 500 has a designed fluid delivery delay period within the maximum and minimum fluid delivery delay periods to permit fire growth in the presence of a fire even to thermally actuate a sufficient number of sprinklers to form a sprinkler operational area to address the fire event.

Because a dry ceiling-only fire protection system is preferably hydraulically configured with a hydraulic design area and designed operating pressure for a given storage occupancy, commodity classification and storage height, the preferred maximum and minimum fluid delivery periods are preferably functions of the hydraulic configuration, the occupancy ceiling height, and storage height. In addition or alternatively to, the maximum and minimum fluid delivery delay periods can be further configured as a function of the storage configuration, sprinkler-to-storage storage clearance and/or sprinkler-to-ceiling distance.

The maximum and minimum fluid delivery time design criteria can be embodied in a database, data table and/or look-up table. For example, provided below are fluid delivery design tables generated for Class II and Class III commodities at varying storage and ceiling heights for given design pressures and hydraulic design areas. Substantially similarly configured data tables can be configured for other classes of commodities.

Designed Fluid Deliver Delay Period Table - Class II

| STORAGE HGT (FT.)/ CEILING HGT (FT.) | DESIGN PRESSURE (PSI) | HYD. DESIGN AREA (NO SPRINKLERS) | MAX FLUID DELIVERY PERIOD (SEC.) | MIN FLUID DELIVERY PERIOD (SEC.) | SEQUENTIAL OPENING FOR MINIMUM FLUID DELIVERY DELAY PERIOD (SEC) | | | |
|---|---|---|---|---|---|---|---|---|
| | | | | | $1^{ST}$ | $2^{nd}$ | 3rd | $4^{th}$ |
| 20/30 | 22 | 25 | 30 | 9 | 0 | 3 | 6 | 10 |
| 25/30 | 22 | 25 | 30 | 9 | 0 | 3 | 6 | 9 |
| 20/35 | 22 | 25 | 30 | 9 | 0 | 3 | 6 | 10 |
| 25/35 | 22 | 25 | 30 | 9 | 0 | 3 | 6 | 10 |
| 30/35 | 22 | 25 | 30 | 9 | 0 | 3 | 6 | 9 |
| 20/40 | 22 | 25 | 30 | 9 | 0 | 3 | 6 | 10 |
| 25/40 | 22 | 25 | 30 | 9 | 0 | 3 | 6 | 10 |
| 30/40 | 22 | 25 | 30 | 9 | 0 | 3 | 6 | 10 |
| 35/40 | 22 | 25 | 30 | 9 | 0 | 3 | 6 | 9 |
| 20/45 | 30 | 25 | 25 | 9 | 0 | 3 | 6 | 10 |
| 25/45 | 30 | 25 | 25 | 9 | 0 | 3 | 6 | 10 |
| 30/45 | 30 | 25 | 25 | 9 | 0 | 3 | 6 | 10 |
| 35/45 | 30 | 25 | 25 | 9 | 0 | 3 | 6 | 10 |
| 40/45 | 30 | 25 | 25 | 9 | 0 | 3 | 6 | 9 |

Designed Fluid Deliver Delay Period Table - Class III

| STORAGE HGT (FT.)/ CEILING HGT (FT.) | DESIGN PRESSURE (PSI) | HYD. DESIGN AREA (NO SPRINK) | MAX FLUID DELIVERY PERIOD (SEC.) | MIN FLUID DELIVERY PERIOD (SEC.) | SEQUENTIAL OPENING FOR MINIMUM FLUID DELIVERY DELAY PERIOD (SEC) | | | |
|---|---|---|---|---|---|---|---|---|
| | | | | | $1^{ST}$ | $2^{nd}$ | 3rd | $4^{th}$ |
| 20/30 | 30 | 25 | 25 | 8 | 0 | 3 | 5 | 7 |
| 25/30 | 30 | 25 | 25 | 8 | 0 | 3 | 5 | 7 |
| 20/35 | 30 | 25 | 25 | 8 | 0 | 3 | 5 | 7 |
| 25/35 | 30 | 25 | 25 | 8 | 0 | 3 | 5 | 7 |
| 30/35 | 30 | 25 | 25 | 8 | 0 | 3 | 5 | 7 |
| 20/40 | 30 | 25 | 25 | 8 | 0 | 3 | 5 | 7 |
| 25/40 | 30 | 25 | 25 | 8 | 0 | 3 | 5 | 7 |
| 30/40 | 30 | 25 | 25 | 8 | 0 | 3 | 5 | 7 |
| 35/40 | 30 | 25 | 25 | 8 | 0 | 3 | 5 | 7 |
| 20/45 | 30 | 25 | 25 | 8 | 0 | 3 | 5 | 7 |
| 25/45 | 30 | 25 | 25 | 8 | 0 | 3 | 5 | 7 |
| 30/45 | 30 | 25 | 25 | 8 | 0 | 3 | 5 | 7 |
| 35/45 | 30 | 25 | 25 | 8 | 0 | 3 | 5 | 7 |
| 40/45 | 30 | 25 | 25 | 8 | 0 | 3 | 5 | 7 |

The above tables preferably provide the maximum fluid delivery delay period for the one or more most hydraulically remote sprinklers 521 in a system 500. More preferably the data table is configured such that the maximum fluid delivery delay period is designed to be applied to the four most hydraulically remote sprinklers. Even more preferably the table is configured to iteratively verify that the fluid delivery is appropriately delayed at the time of sprinkler operation. For example, when running a simulation of system operation, the four most hydraulically remote sprinklers are sequenced and the absence of fluid discharge and more specifically, the absence of fluid discharge at design pressure is verified at the time of sprinkler actuation. Thus, the computer simulation can verify that fluid discharge at designed operating pressure is not present at the first most hydraulically remote sprinkler at zero seconds, that fluid discharge at designed operating pressure is not present at the second most hydraulically close sprinkler three seconds later, that fluid discharge at designed operating pressure is not present at the third most hydraulically remote sprinkler five to six seconds after the first actuation depending upon the class of the commodity, and that fluid discharge at designed operating pressure is not present at the fourth most hydraulically remote sprinkler seven to eight seconds after actuation of the first sprinkler depending upon the class of the commodity. More preferably, the simulation verifies that no fluid is discharged at the designed operating pressure from any of the four most remote sprinklers prior to or at the moment of activation of the fourth most hydraulically remote sprinkler.

The minimum fluid delivery period preferably presents the minimum fluid delivery period to the four critical sprinklers hydraulically most close to the riser assembly. The data table further presents the four minimum fluid delivery times to the respective four hydraulically close sprinklers. More preferably, the data table presents a sequence of sprinkler operation for simulating system operation and verify that the fluid flow is delayed appropriately, i.e. fluid is not present or at least not discharged at designed operating pressure at the first most hydraulically close sprinkler at zero seconds, fluid is not discharged at designed operating pressure at the second most hydraulically close sprinkler at three seconds after first sprinkler activation, fluid is not discharged at designed operating pressure at the second most hydraulically close sprinkler three seconds after first sprinkler activation, fluid is not discharged at designed operating pressure at the third most hydraulically close sprinkler five to six seconds after first sprinkler activation depending upon the class of the commodity, and fluid is not discharged at designed operating pressure at the fourth most hydraulically close sprinkler seven to eight seconds after first sprinkler activation depending upon the class of commodity. More preferably, the simulation verifies that fluid is not discharged at designed operating pressure from any of the four most hydraulically close sprinklers prior to or at the moment of activation of the fourth most hydraulically close sprinkler.

Figure 17A:
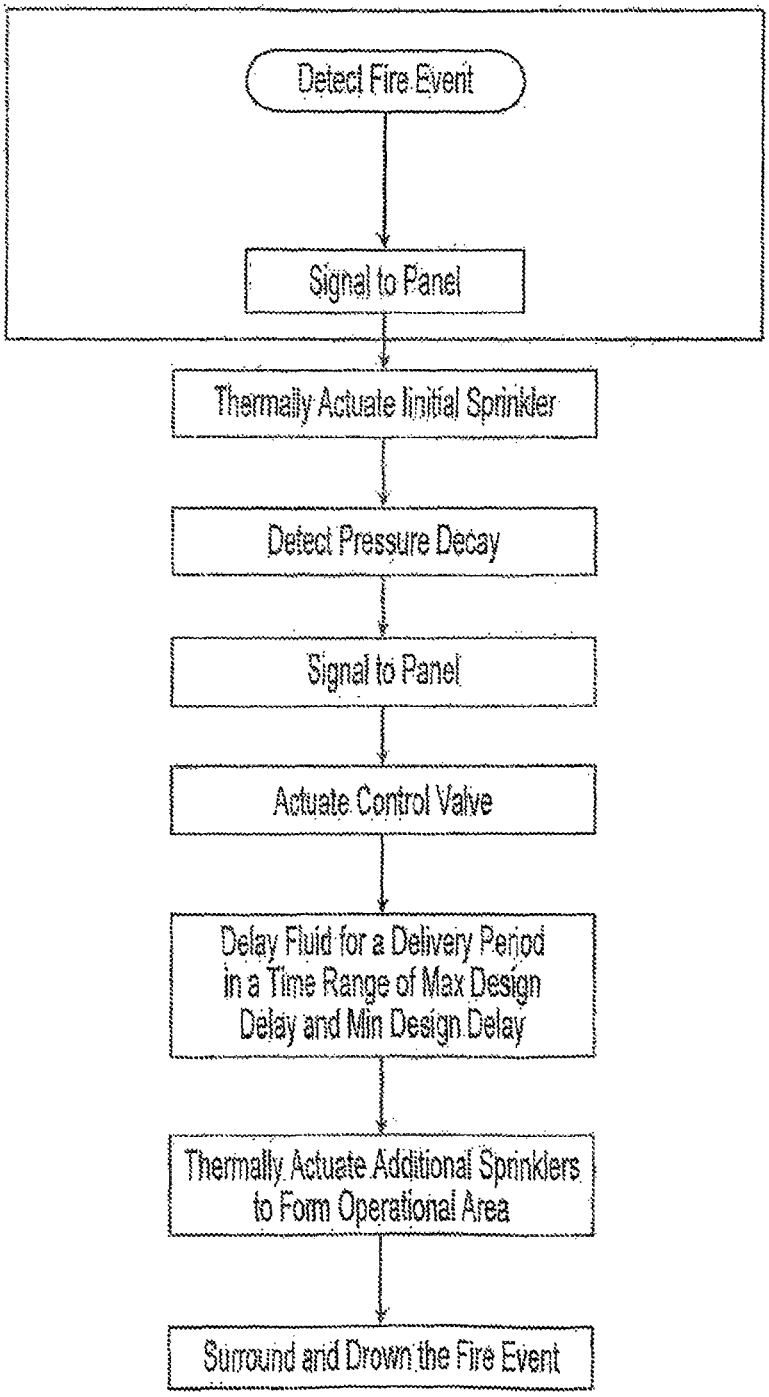
FIG. 17A is an illustrative operation flowchart for the system and riser assembly of FIG. 17.

In the preferred embodiment of the data table, the maximum and minimum fluid delivery delay periods are preferably a function of sprinkler-to-storage clearance. Preferred embodiments of the data table and system shown and described in product data sheet TFP370 from Tyco Fire & Building Products entitled, "QUELL™ Systems: Preaction and Dry Pipe Alternatives For Eliminating In-Rack Sprinklers" (August, 2006 Rev. A), which is incorporated here in its entirety by reference. Shown in FIG. 17A, is a preferred flowchart of a method of operation for a preferred system configured to address a fire event with a surround and drown effect.

Accordingly, a preferred data-table includes a first data array characterizing the storage occupancy, a second data array characterizing a sprinkler, a third data array identifying a hydraulic design area as a function of the first and second data arrays, and a fourth data array identifying a maximum fluid delivery delay period and a minimum fluid delivery delay period each being a function of the first, second and third data arrays. The data table can be configured as a look-up table in which any one of the first second, and third data arrays determine the fourth data array. Alternatively, the database can be simplified so as to present a single specified maximum fluid delivery delay, period to be incorporated into a ceiling-only dry sprinkler system to address a fire in a storage occupancy with a sprinkler operational areas having surround and drown configuration about the fire event for a given ceiling height, storage height, and/or commodity classification. The preferred simplified database can embodied in a data sheet for a sprinkler providing a single-fluid delivery delay period that provides a surround and drown fire protection coverage for one or more commodity classifications and storage configuration stored in occupancy having a defined maximum ceiling height up to a defined maximum storage height. For example, one illustrative embodiment of a simplified data sheet is FM Engineering Bulletin 01-06 (Feb. 20, 2006) which is incorporated herein in its entirety by reference. The exemplary simplified data sheet provides a single maximum fluid deliver delay period of thirty seconds (30 sec.) for protection of Class I and II commodities up to thirty-feet (35 ft.) in a forty foot (40 ft.) storage occupancy using a 16.8 K control mode specific application sprinkler. The data sheet can further preferably specify that fluid delivery delay period is to be experienced at the four most hydraulically remote sprinklers so as to bring about a surround and drown effect.

Given the above described sprinkler performance data, system design criteria, and known metrics for characterizing piping systems and piping components, configurations, fire protection systems, a fire protection configured for addressing a fire event with a sprinkler operational area in a surround and drown configuration can be modeled in system modeling/fluid simulation software. The sprinkler system and its sprinklers can be modeled and the sprinkle system can be sequenced iteratively design a system capable of fluid delivery in accordance with the designed fluid delivery periods. For example, a dry ceiling-only sprinkler system configured for addressing a fire event with a surround and drown configuration can be modeled in a software package such as described in PCT International Patent Application filed on Oct. 3, 2006 entitled, "System and Method For Evaluation of Fluid Flow in a Piping System," having Docket Number S-FB-0091 WO (73434-029WO) which is incorporated by reference in its entirety. Hydraulically remote and most hydraulically close sprinkler activations can be preferably sequenced in a manner as provided in a data table as shown above to verify that fluid delivery occurs accordingly.

Alternatively to designing, manufacturing and/or qualifying a preferred ceiling-only dry sprinkler system having a surround and drown response to a fire, or any of its subsystems or components, the process of obtaining the preferred system or any of its qualified components can entail, for example, acquiring such a system, subsystem or component. Acquiring the qualified sprinkler can further include receiving a qualified sprinkler 320, a preferred dry sprinkler system 500 or the designs and methods of such a system as described above from, for example, a supplier or manufacturer in the course of a business-to-business transaction, through a supply chain relationship such as between, for example, a manufacturer and supplier; between a manufacturer and retail supplier; or between a supplier and contractor/installer. Alternatively acquisition of the system and/or its components can be accomplished through a contractual arrangement, for example, a contractor/installer and storage occupancy owner/operator, property transaction such as, for example, sale agreement between seller and buyer, or lease agreement between leasor and leasee.

Figure 20:
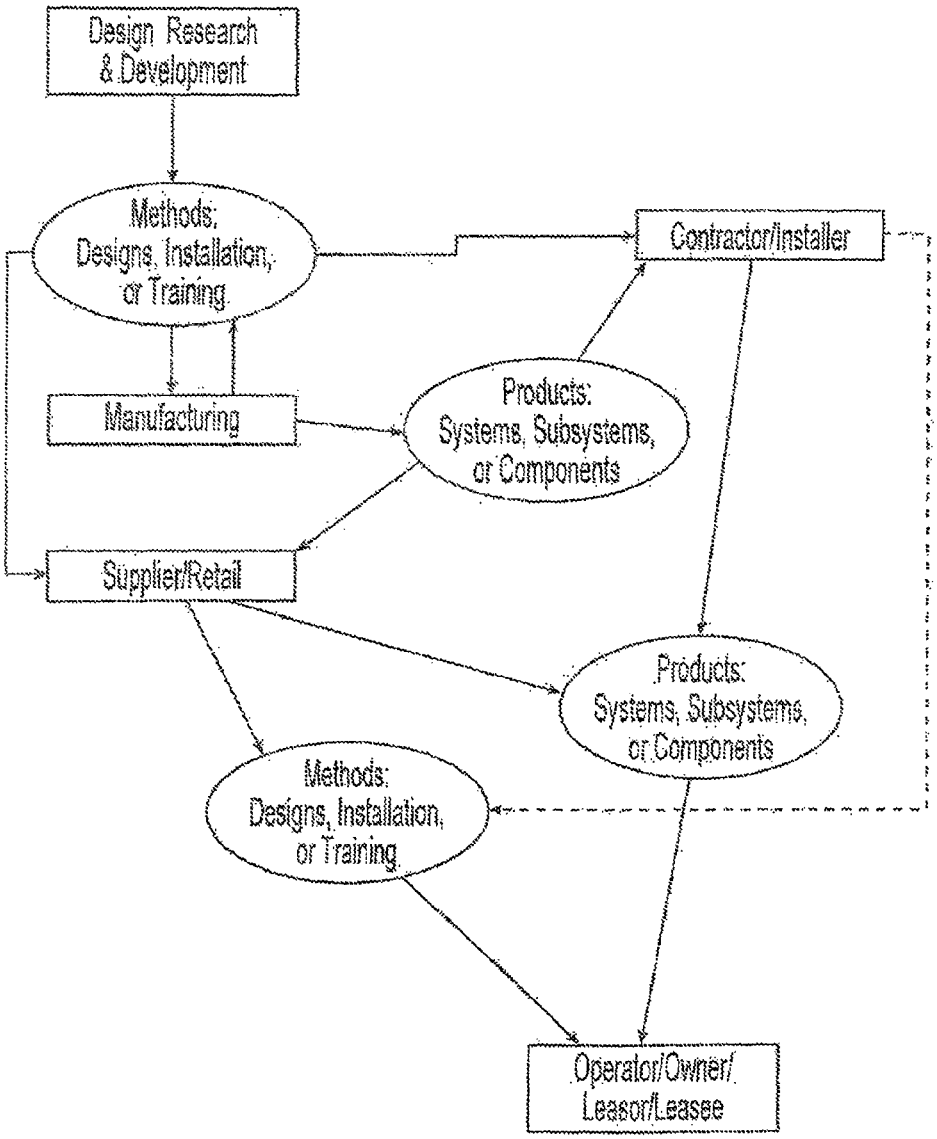
FIG. 20 is a schematic flow diagram of the lines of distribution of the preferred systems and methods.

In addition, fire preferred process of providing a method, of fire-protection can include distribution of the preferred ceiling-only dry sprinkler system with a surround and drown thermal response, its subsystems, components and/or its methods of design, configuration and use in connection with the transaction of acquisition as described above. The distribution of the system, subsystem, and/or components, and/or its associated methods can includes the process of packaging, inventorying or warehousing and/or shipping of the system, subsystem, components and/or its associated methods of design, configuration and/or use. The shipping can include individual or bulk transport of the sprinkler 20 over air, land or water. The avenues of distribution of preferred products and services can include those schematically shown, for example, in FIG. 20. FIG. 20 illustrates how the preferred systems, subsystems, components and associated preferred methods of fire protection can be transferred from one party to another party. For example, the preferred sprinkler design for a sprinkler qualified to be used in a ceiling-only dry sprinkler for storage occupancy configured for addressing a fire event with a surround and drown configuration can be distributed from a designer to a manufacturer. Methods of installation and system designs for a preferred sprinkler system employing the surround and drown effect can be transferred from a manufacture to a contractor/installer.

In one preferred aspect of the process of distribution, the process can further include publication of the preferred sprinkler system having a surround and drown response configuration, the subsystems, components and/or associated sprinklers, methods and applications of fire protection. For example, the sprinkler 320 can be published in a catalog for a sales offering by any one of a manufacturer and/or equipment supplier. The catalog can be a hard copy media, such as a paper catalog or brochure or alternatively, the catalog can be in electronic format. For example, the catalog can be an on-line catalog available to a prospective buyer or user over a network such as, for example a LAN, WAN or Internet.

FIG. 18 shows a computer processing device 600 having a central processing unit 610 for performing memory storage functions with a memory storage device 611, and further for performing data processing for running simulations or solving calculations. The processing unit and storage device can be configured to store, for example, a database of fire test data to build a database of design criteria for configuring and designing a sprinkler system employing a fluid delivery delay period for generating a surround and drown effect. Moreover, the device 600 can be perform calculating functions such as, for example, solving for sprinkler activation time and fluid distribution times from a constructed sprinkler system model. The computer processing device 600 can further include, a data entry device 612, such as for example, a computer keyboard and a display device, such as for example, a computer monitor in order perform such processes. The computer processing device 600 can be embodied as a workstation, desktop computer, laptop computer, handheld device, or network server.

Figure 19:
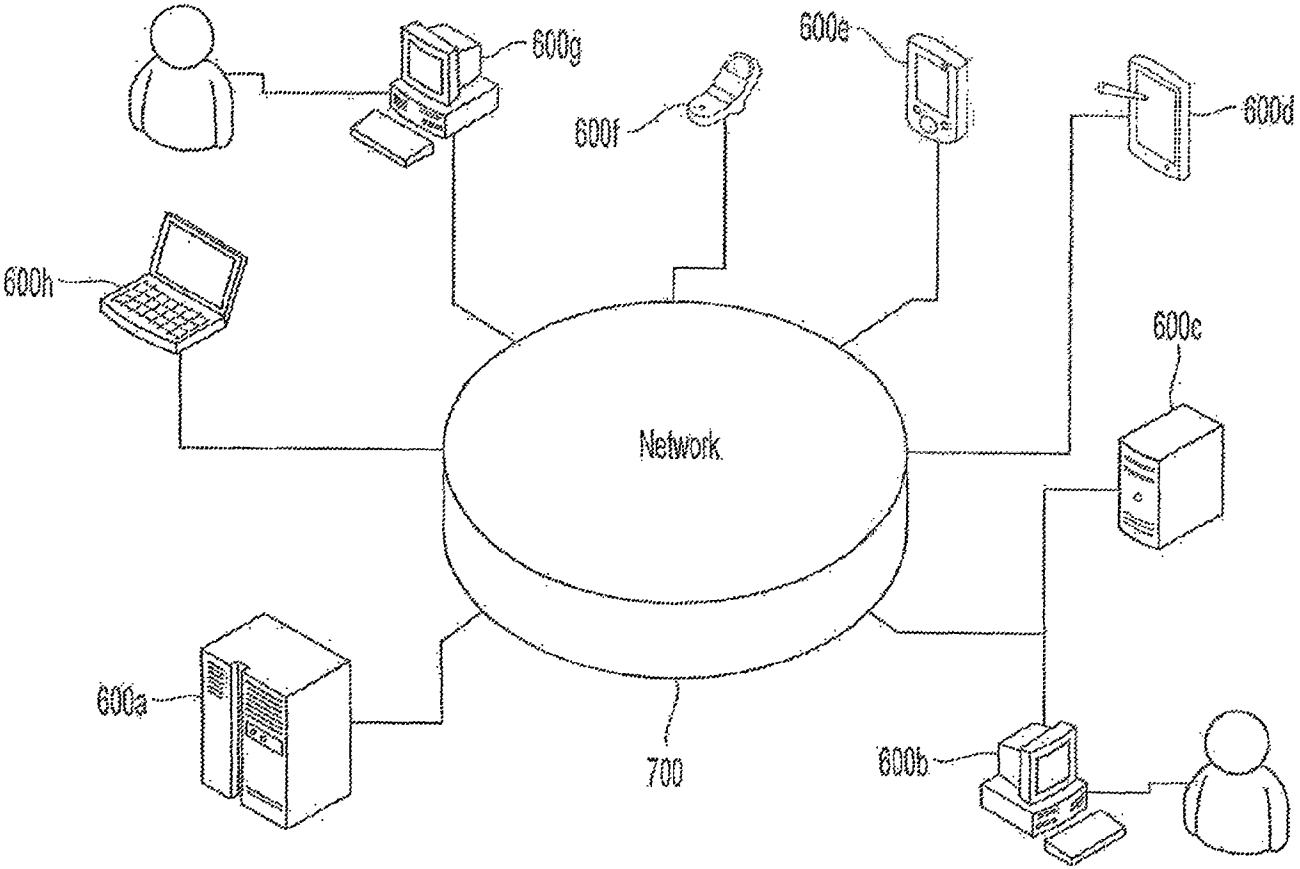
FIG. 19 is schematic view of a network for practicing one or more aspects of the preferred systems and methods of fire protection.

One or more computer processing devices 600a-600h can be networked over a LAN, WAN, or Internet as seen, for example as seen, in FIG. 19 for communication to effect distribution of preferred fire protection products and services associated with addressing a fire with a surround and drown effect. Accordingly, a system and melted is preferably provided for transferring fire protection systems, subsystems, system components and/or associated methods employing the surround and drown effect such as, for example, a sprinkler 320 for use in a preferred ceiling-only sprinkler system to protect a storage occupancy. The transfer can occur between a first party using a first computer processing device 600b and a second party using a second computer processing device 600c. The method preferably includes offering a qualified sprinkler for use in a dry ceiling-only sprinkler system for a storage occupancy up to a ceiling height of about forty-five feet having a commodity stored up to about forty feet and delivering the qualified sprinkler in response to a request for a sprinkle for use in ceiling only fire protection system.

Offering a qualified sprinkler preferably includes publishing the qualified sprinkler in at least one of a paper publication and an on-line publication. Moreover, the publishing in an on-line publication preferably includes hosting a data array about the qualified sprinkler on a computer processing device such as, for example, a server 600a and its memory storage device 612a, preferably coupled to the network for communication with another computer processing device 600g such as for example, 600d. Alternatively any other computer processing device such as for example, a laptop 600h, cell phone 600f, personal digital assistant 600e, or tablet 600d can access the publication to receive distribution of the sprinkler and the associated data array. The hosting can further include configuring the data array so as to include a listing authority element, a K-factor data element, a temperature rating data element and a sprinkler data configuration element. Configuring the data array preferably includes configuring the listing authority element as for example, being UL, configuring the K-factor data element as being about seventeen, configuring the temperature rating data element as being about 286° F., and configuring the sprinkler configuration data element as upright. Hosting a data array can further include identifying parameters for the dry ceiling-only sprinkler system, the parameters including: a hydraulic design area including a sprinkler-to-sprinkler spacing; a maximum fluid delivery delay period to a most hydraulically remote sprinkler, and a minimum fluid delivery delay period to the most hydraulically close sprinkler.

The preferred process of distribution can further include distributing a method for designing a fire protection system for a surround and drown effect. Distributing the method can include publication of a database of design criteria as an electronic data sheet, such as for example, at least one of an .html file, .pdf, or editable text file. The database can further include, in addition to the data elements and design parameters described above, another data array identifying a riser assembly for use with the sprinkler of the first data array, and even further include a sixth data array identifying a piping system to couple the control valve of the fifth data array to the sprinkler of the first data array.

An end or intermediate user of fire protection products and services can access a server or workstation of a supplier of such products or services over a network as seen in FIG. 19 to download, upload, access or interact with a distributed component or system brochure, software applications or design criteria for practicing, learning, implementing, or purchasing the surround and drown approach to fire protection audits associated products. For example, a system designer or other intermediate user can access a product data sheet for a preferred ceiling-only fire protection system configured to address a fire event in a surround and drown response, such as for example TFP370 (August 2006 Rev. A) in order to acquire or configure such a sprinkler system for response to a fire event with a surround and drown configuration. Furthermore a designer can download or access data tables for fluid delivery delay periods, as described above, and further use or license simulation software, such as for example the described in PCT International Patent Application filed on Oct. 3, 2006 entitled, "System and Method For Evaluation of Fluid Flow In a Piping System," having Docket Number S-FB-0091WO (73434-029WO), iteratively design a fire protection system having a surround and drown effect.

Where the process of distribution provides for publication of the preferred ceiling-only dry sprinkler systems having a surround and drown response configuration, its subsystems and its associated methods in a hard copy media format, the distribution process can further include, distribution of the cataloged information with the product or service being distributed. For example, a paper copy of the data sheet for the sprinkler 320 can include in the packaging for the sprinkler 320 to provide installation or configuration information to a user. Alternatively, a system data sheet, such as for example, TFP 370 (August 2006 Rev. A), can be provided with a purchase of a preferred system riser assembly to support and implement the surround and drown response configuration. The hard copy data sheet preferably includes the necessary data tables and hydraulic design criteria to assist a designer, installer, or end user to configure a sprinkler system for storage occupancy employing the surround and drown effect.

Accordingly, applicants have provided an approach to fire protection based upon addressing a fire event with a surround and drown effect. This approach can be embodied in systems, subsystems, system components and design methodologies for implementing such systems, subsystems and components. While the present invention has been disclosed with reference to certain embodiments, numerous modifications, alterations and changes to the described embodiments are possible without departing from the sphere and scope of the present invention, as defined in the appended claims. Accordingly, it is intended that the present invention not be limited to the described embodiments, but that it has the full scope defined by the language of the following claims, and equivalents thereof.

What we claim is:

1. A dry ceiling-only storage occupancy fire protection system comprising:

a grid of control mode sprinklers defining a sprinkler-to-sprinkler spacing ranging from eight feet to twelve feet (8 ft.-12 ft.) so as to define a coverage area per sprinkler ranging from about eighty square feet (80 sq. ft.) to about one hundred square feet (100 sq. ft.), each sprinkler including a sprinkler body having an inlet and an outlet with a passageway disposed therebetween defining a K-factor of at least one of about 17, 19, 22 and 25, a closure assembly, a thermally rated trigger assembly to support the closure assembly adjacent the outlet of the sprinkler body, the trigger assembly having a temperature rating of about 286° F., and a deflector spaced adjacent the outlet to define an upright configuration of the sprinkler; and a network of pipes including at least one main pipe and a plurality of spaced apart branch lines interconnecting the grid of control mode sprinklers, the network of pipes locating the grid of sprinklers relative to a fluid source in which about eighteen to twenty-six (18-26) hydraulically remote sprinklers in the grid of control mode sprinklers define a hydraulic design area of the system, the network of pipes that delivers upon activation of a first hydraulically remote sprinkler a minimum operating pressure ranging from about fifteen to about forty-five pounds per square inch (15 psi. to 45 psi.) of fluid from the fluid source to each of the hydraulically remote sprinklers within twenty-five to thirty seconds (25-30 sec.) to protect a commodity of at least Class I and Class II stored beneath a ceiling having a maximum ceiling height ranging from thirty feet to forty-five feet (30 ft.-45 ft.), the commodity having a storage configuration of any one of rack, palletized, bin box, and shelf storage, the rack storage being any one of single-row, double-row and multi-row rack storage.

2. A dry ceiling-only storage occupancy fire protection system comprising:

a grid of control mode sprinklers defining a sprinkler-to-sprinkler spacing ranging from [eighty] *eight* feet to twelve feet (8 ft.-12 ft.) so as to define a coverage area per sprinkler ranging from about eighty square feet (80 sq. ft.) to about one hundred square feet (100 sq. ft.), each sprinkler including a sprinkler body having an inlet and an outlet with a passageway disposed therebetween defining a K-factor of at least one of about 17, 19, 22 and 25, a closure assembly, a thermally rated trigger assembly to support the closure assembly adjacent the outlet of the sprinkler body, the trigger assembly having a temperature rating of about 286° F., and a deflector spaced adjacent the outlet to define an upright configuration of the sprinkler; and a network of pipes including at least one main pipe and a plurality of spaced apart branch lines interconnecting the grid of control mode sprinklers, the network of pipes being filled with a gas of pressurized air or nitrogen and locating the grid of sprinklers relative to a fluid source in which about eighteen to twenty-six (18-26) hydraulically remote sprinklers in the grid of sprinklers define a hydraulic design area of the system, the network of pipes that delivers upon activation of a first hydraulically remote sprinkler a minimum operating pressure ranging from about fifteen to about forty-five pounds per square inch (15 psi. to 45 psi.) of fluid from the fluid source to each of the hydraulically remote sprinklers within twenty-five to thirty seconds (25-30 sec.) to protect a commodity of Class III stored beneath a ceiling having a maximum ceiling height ranging from thirty feet to forty-five feet (30 ft.-45 ft.), the commodity having a storage configuration of any one of rack, palletized, bin box, and shelf storage, the rack storage being any one of single-row, double-row and multi-row rack storage.

3. The system of claim 1 or 2, wherein the network of pipes includes a main riser pipe including a control valve for controlling the flow of fluid between the fluid source and the grid of sprinklers.

4. The system of claim 1 or 2, wherein the network of pipes define for the system a maximum fluid delivery delay period and a minimum fluid delivery delay period, each sprinkler having a fluid delivery delay period between the maximum fluid delivery delay period and the minimum fluid delivery delay period.

5. The system of claim 1 or 2, wherein the hydraulic design area comprises about twenty-five (25) hydraulically remote sprinklers.

6. The system of claim 1 or 2, wherein the hydraulic design area is less than about 2600 square feet (2600 ft.$^2$).

7. The system of claim 1 or 2, wherein the commodity defines a storage height ranging from about twenty feet to about forty feet (20 ft.-40 ft.).

8. The system of claim 1 or 2, wherein the system is configured as a double-interlock preaction system, the system further including one or more fire detectors spaced relative to the grid of sprinklers such that in the event of a fire, the fire detectors activate before any sprinkler activation, the system including a releasing control panel in communication with a control valve, the control valve being a solenoid actuated control valve, the releasing control panel being configured to receive signals of a fire detection to appropriately energize the solenoid valve for actuation of the control valve.

9. The system of claim 1 or 2, wherein the system is configured as one of a single-interlock and double-interlock preaction system, the system further including a releasing control panel in communication with a control valve, the control valve being a solenoid actuated control valve, the releasing control panel being configured to receive signals of a pressure decay to appropriately energize the solenoid valve for actuation of the control valve; and a quick release device in communication with the releasing control panel capable of detecting a small rate of decay of gas pressure in the network of pipes to signal the releasing control panel of such a decay.

10. The system of claim 1 or 2, wherein the storage occupancy is a freezer storage occupancy.

11. The system of claim 1 or 2, wherein the grid of control mode sprinklers comprises a plurality of upright control mode specific application sprinklers.

12. The system of claim 11, wherein the minimum operating pressure is any one of 15, 22 and 30 psi.

13. The system of claim 1 or 2, wherein the network of pipes define a maximum fluid delivery period of about thirty seconds (30 sec.) and a minimum fluid delivery period of about eight seconds (8 sec.), the maximum fluid delivery period being the maximum time for fluid delivery at the minimum operating pressure to the four most hydraulically demanding sprinklers and the minimum fluid delivery period being the time for fluid delivery at the minimum operating pressure to the four least hydraulically demanding sprinklers.

14. The system of claim 1 or 2, wherein the network of pipes delivers upon simultaneous activation of the four most hydraulically remote sprinklers the minimum operating pressure of fifteen pounds per square inch (15 psi.) of fluid from the fluid source to each of the hydraulically remote sprinklers defining the design area within twenty-five seconds (25 sec.).

15. A method of dry ceiling-only fire protection for a storage occupancy the method comprising:

identifying a maximum ceiling height ranging from thirty feet to forty-five feet (30 ft.-45 ft.) of a ceiling of the storage occupancy in which to store a commodity of any one of Class I, II and III beneath the ceiling in a storage configuration of any one of rack, palletized, bin box, and shelf storage, the rack storage being any one of single-row, double-row and multi-row rack storage; and verifying that a network of pipes in a dry ceiling-only fire protection system that includes at least one main pipe coupled to a fluid source and a plurality of spaced apart branch lines delivers a minimum operating pressure ranging from about fifteen to about forty-five pounds per square inch (15 psi. to 45 psi.) of fluid from a fluid source to at least one hydraulically remote sprinkler defining a hydraulic design area of the system within 25 seconds upon activation of a first hydraulically remote sprinkler, the hydraulic design area being defined by about eighteen to twenty-six (18-26) hydraulically remote sprinklers in a grid of control mode sprinklers coupled to the branch lines, the grid of sprinklers having a maximum sprinkler-to-sprinkler spacing ranging from eight feet to twelve feet (8 ft.-12 ft.) with each sprinkler having a coverage area per sprinkler ranging from about eighty square feet (80 sq. ft.) to about one hundred square feet (100 sq. ft.) and including a sprinkler body having an inlet and an outlet with a passageway disposed therebetween defining a K-factor of at least one of about 17, 19, 22 and 25, a closure assembly, a thermally rated trigger assembly to support the closure assembly adjacent the outlet of the sprinkler body, the trigger assembly having a temperature rating of about 286° F., and a deflector spaced adjacent the outlet to define an upright configuration of the sprinkler relative to the ceiling.

16. The method of claim 15, wherein verifying the delivery of fluid includes using a software program and simulating the activation of the first hydraulically remote sprinklers as a simultaneous activation of four hydraulically remote sprinklers.

17. The method of claim 15, wherein verifying the delivery of fluid includes ensuring that the network of pipes provides a maximum fluid delivery period of about thirty seconds (30 sec.) and a minimum fluid delivery period of about eight seconds (8 sec.), the maximum fluid delivery period being the maximum time for fluid delivery at the minimum operating pressure to the four most hydraulically demanding sprinklers and the minimum fluid delivery period being the minimum time for fluid delivery at the minimum operating pressure to the four least hydraulically demanding sprinklers.

18. A method of protecting a commodity of at least Class I and Class II stored beneath a ceiling having a maximum ceiling height ranging from thirty feet to forty-five feet (30 ft.-45 ft.), the commodity having a storage configuration of any one of rack, palletized, bin box, and shelf storage, the rack storage being any one of single-row, double-row and multi-row rack storage, the method comprising:

providing a plurality of control mode sprinklers, each of the sprinklers including a sprinkler body having an inlet and an outlet with a passageway disposed therebetween defining a K-factor of at least one of about 17, 19, 22 and 25, a closure assembly, a thermally rated trigger assembly to support the closure assembly adjacent the outlet of the sprinkler body, the trigger assembly having a temperature rating of about 286° F., and a deflector spaced adjacent the outlet to define an upright configuration of the sprinkler; and interconnecting the plurality of sprinklers with a network of pipes to define a grid of sprinklers having a sprinkler-to-sprinkler spacing ranging from eight feet to twelve feet (8 ft.-12 ft.) so as to define a coverage area per sprinkler ranging from about eighty square feet (80 sq. ft.) to about one hundred square feet (100 sq. ft.) for a commodity of at least Class I and Class II stored beneath a ceiling having a maximum ceiling height ranging from thirty feet to forty-five feet (30 ft.-45 ft.), the commodity having a storage configuration of any one of rack, palletized, bin box, and shelf storage, the rack storage being any one of single-row, double-row and multi-row rack storage, the interconnecting includes interconnecting the plurality of sprinklers with at least one main pipe and a plurality of spaced apart branch lines filled with a gas of pressurized air or nitrogen so as locate the grid of sprinklers relative to a fluid source such that about eighteen to twenty-six (18-26) hydraulically remote sprinklers in the grid of control mode sprinklers define a hydraulic design area of the system where upon activation of a first hydraulically remote sprinkler a minimum operating pressure ranging from about fifteen to about forty-five pounds per square inch (15 psi. to 45 psi.) of fluid from the fluid source is delivered to each of the hydraulically remote sprinklers within twenty-five to thirty seconds (25-30 sec.).

19. A method of protecting a commodity of Class III stored beneath a ceiling having a maximum ceiling height ranging from thirty feet to forty-five feet (30 ft.-45 ft.), the commodity having a storage configuration of any one of rack, palletized, bin box, and shelf storage, the rack storage being any one of single-row, double-row and multi-row rack storage, the method comprising:

providing a plurality of control mode sprinklers, each of the sprinklers including a sprinkler body having an inlet and an outlet with a passageway disposed therebetween defining a K-factor of at least one of about 17, 19, 22 and 25, a closure assembly, a thermally rated trigger assembly to support the closure assembly adjacent the outlet of the sprinkler body, the trigger assembly having a temperature rating of about 286° F., and a deflector spaced adjacent the outlet to define an upright configuration of the sprinkler; and interconnecting the plurality of sprinklers with a network of pipes to define a grid of sprinklers having a sprinkler-to-sprinkler spacing ranging from eight feet to twelve feet (8 ft.-12 ft.) so as to define a coverage area per sprinkler ranging from about eighty square feet (80 sq. ft.) to about one hundred square feet (100 sq. ft.) for a commodity of Class III stored beneath a ceiling having a maximum ceiling height ranging from thirty feet to forty-five feet (30 ft.-45 ft.), the commodity having a storage configuration of any one of rack, palletized, bin box, and shelf storage, the rack storage being any one of single-row, double-row and multi-row rack storage, the interconnecting includes interconnecting the plurality of sprinklers with at least one main pipe and a plurality of spaced apart branch lines filled with a gas of pressurized air or nitrogen so as locate the grid of sprinklers relative to a fluid source such that about eighteen to twenty-six (18-26) hydraulically remote sprinklers in the grid of control mode sprinklers define a hydraulic design area of the system where upon activation of a first hydraulically remote sprinkler a minimum operating pressure ranging from about fifteen to about forty-five pounds per square inch (15 psi. to 45 psi.) of fluid from the fluid source is delivered to each of the hydraulically remote sprinklers within twenty-five to thirty seconds (25-30 sec.).

20. The method of claim 18 or 19, wherein interconnecting the plurality of sprinklers with the network of pipes includes installing a main riser pipe including a control valve for controlling the flow of fluid between the fluid source and the grid of sprinklers.

21. The method of claim 18 or 19, further comprising defining for the system a maximum fluid delivery delay period and a minimum fluid delivery delay period wherein interconnecting the plurality of sprinklers with the network of pipes is such that each sprinkler has a fluid delivery delay period between the maximum fluid delivery delay period and the minimum fluid delivery delay period.

22. The method of claim 18 or 19, wherein interconnecting the plurality of sprinklers with the network of pipes is such that the hydraulic design area comprises about twenty-five (25) hydraulically remote sprinklers.

23. The method of claim 18 or 19, wherein interconnecting the plurality of sprinklers with the network of pipes is such that the hydraulic design area is less than about 2600 square feet (2600 $ft.^2$).

24. The method of claim 18 or 19, wherein interconnecting the plurality of sprinklers with the network of pipes above the commodity defines a storage height ranging from about twenty feet to about forty feet (20 ft.-40 ft.).

25. The method of claim 18 or 19, further comprising configuring the interconnection of the plurality of sprinklers with the network of pipes as a double-interlock preaction system having one or more fire detectors spaced relative to the plurality of sprinklers such that in the event of a fire, the fire detectors activate before any sprinkler activation, the configuring including placing a releasing control panel in communication with a solenoid actuated control valve such that when the releasing control panel receives signals of a fire detection, the control panel energizes the solenoid valve for actuation of the control valve.

26. The method of claim 18 or 19, further comprising configuring the interconnection of the plurality of sprinklers with the network of pipes as one of a single-interlock and double-interlock preaction system, the configuring including placing a releasing control panel in communication with a solenoid actuated control valve such that when the releasing control panel receives signals of a pressure decay, the control panel energizes the solenoid valve for actuation of the control valve; and the configuring including placing a quick release device capable of detecting a small rate of decay of gas pressure in the network of pipes in communication with the releasing control panel to signal the releasing control panel of such a decay.

27. The method of claim 18 or 19, wherein interconnecting the plurality of sprinklers locates the plurality of sprinklers in a freezer storage occupancy.

28. The method of claim 18 or 19, wherein providing a plurality of control mode sprinklers comprises providing a plurality of upright control mode specific application sprinklers.

29. The method of claim 18 or 19, wherein interconnecting the plurality of sprinklers with a network of pipes provides that the minimum operating pressure is any one of 15, 22 and 30 psi.

30. The method of claim 18 or 19, wherein interconnecting the plurality of sprinklers with a network of pipes defines a maximum fluid delivery period of about thirty seconds (30 sec.) and a minimum fluid delivery period of about eight seconds (8 sec.), the maximum fluid delivery period being the maximum time for fluid delivery at the minimum operating pressure to the four most hydraulically demanding sprinklers and the minimum fluid delivery period being the time for fluid delivery at the minimum operating pressure to the four least hydraulically demanding sprinklers.

31. The method of claim 30, wherein the minimum and maximum fluid delivery periods provide that the plurality of sprinklers define a sprinkler operational area to surround and drown a fire.

32. The method of claim 18 or 19, wherein interconnecting the plurality of sprinklers with a network of pipes provides that upon simultaneous activation of the four most hydraulically remote sprinklers, the minimum operating pressure being fifteen pounds per square inch (15 psi.) of fluid is delivered from the fluid source to each of the hydraulically remote sprinklers within twenty-five seconds (25 sec.).

33. The method of claim 18 or 19, wherein providing the plurality of control mode sprinklers provides that the K-factor is about 25.

34. The method of claim 33, wherein providing the plurality of control mode sprinklers provides that the plurality of sprinklers are control mode specific application sprinklers.

35. The method of claim 34, wherein interconnecting the plurality of sprinklers with the network of pipes is such that the minimum operating pressure is 20 psi.

36. The method of claim 35, wherein interconnecting the plurality of sprinklers with the network of pipes locates the plurality of sprinklers beneath the ceiling wherein further the maximum ceiling height ranges from thirty feet to forty feet (30 ft.-40 ft.).

37. The method of claim 36, wherein interconnecting the plurality of sprinklers with the network of pipes locates the plurality of sprinklers beneath the ceiling wherein further the maximum ceiling height is thirty feet.

38. The method of claim 15, wherein the K-factor is about 25.

39. The method of claim 38, wherein the grid of control mode sprinklers are control mode specific application sprinklers.

40. The method of claim 39, wherein the minimum operating pressure is 20 psi.

41. The method of claim 40, wherein identifying the maximum ceiling height comprises identifying the height ranging from thirty feet to forty feet (30 ft.-40 ft.).

42. The method of claim 41, wherein identifying the maximum ceiling height comprises identifying the height as being thirty feet.

43. The system of claim 1 or 2, wherein the K-factor is about 25.

44. The system of claim 43, wherein the grid of control mode sprinklers are control mode specific application sprinklers.

45. The system of claim 44, wherein the minimum operating pressure is 20 psi.

46. The system of claim 45, wherein the maximum ceiling height ranges from thirty feet to forty feet (30 ft.-40 ft.).

47. The system of claim 46, wherein the maximum ceiling height is thirty feet.

*48. The system of claim 1 or 2, wherein the K-factor is about 25 and the storage configuration is rack storage.*

*49. The system of claim 48, wherein the maximum ceiling height ranges from thirty feet to forty feet (30 ft.-40 ft.), and wherein the ceiling height is greater than thirty feet (30 ft.).*

*50. The system of claim 3, wherein the K-factor is about 25 and the storage configuration is rack storage.*

*51. The system of claim 4, wherein the K-factor is about 25 and the storage configuration is rack storage.*

*52. The system of claim 5, wherein the K-factor is about 25 and the storage configuration is rack storage.*

*53. The system of claim 52, wherein the maximum ceiling height ranges from thirty feet to forty feet (30 ft.-40 ft.), and wherein the ceiling height is greater than thirty feet (30 ft.).*

*54. The system of claim 6, wherein the K-factor is about 25 and the storage configuration is rack storage.*

*55. The system of claim 54, wherein the maximum ceiling height ranges from thirty feet to forty feet (30 ft.-40 ft.), and wherein the ceiling height is greater than thirty feet (30 ft.).*

*56. The system of claim 7, wherein the K-factor is about 25 and the storage configuration is rack storage.*

*57. The system of claim 56, wherein the maximum ceiling height ranges from thirty feet to forty feet (30 ft.-40 ft.), and wherein the ceiling height is greater than thirty feet (30 ft.).*

*58. The system of claim 8, wherein the K-factor is about 25 and the storage configuration is rack storage.*

*59. The system of claim 58, wherein the maximum ceiling height ranges from thirty feet to forty feet (30 ft.-40 ft.), and wherein the ceiling height is greater than thirty feet (30 ft.).*

*60. The system of claim 9, wherein the K-factor is about 25 and the storage configuration is rack storage.*

*61. The system of claim 60, wherein the maximum ceiling height ranges from thirty feet to forty feet (30 ft.-40 ft.), and wherein the ceiling height is greater than thirty feet (30 ft.).*

*62. The system of claim 10, wherein the K-factor is about 25 and the storage configuration is rack storage.*

*63. The system of claim 11, wherein the K-factor is about 25 and the storage configuration is rack storage.*

*64. The system of claim 12, wherein the K-factor is about 25 and the storage configuration is rack storage.*

*65. The system of claim 64, wherein the maximum ceiling height ranges from thirty feet to forty feet (30 ft.-40 ft.), and wherein the ceiling height is greater than thirty feet (30 ft.).*

*66. The system of claim 13, wherein the K-factor is about 25 and the storage configuration is rack storage.*

*67. The system of claim 14, wherein the K-factor is about 25 and the storage configuration is rack storage.*

*68. The system of claim 67, wherein the maximum ceiling height ranges from thirty feet to forty feet (30 ft.-40 ft.), and wherein the ceiling height is greater than thirty feet (30 ft.).*

*69. The method of claim 15, 16, or 17 wherein the identifying is for a storage configuration consisting of rack storage, and the verifying the network of pipes delivers the minimum operating pressure to each sprinkler of the hydraulic design area, wherein the K-factor is about 25.*

*70. The method of claim 18 or 19, wherein providing the plurality of control mode sprinklers provides that the K-factor is about 25, and the interconnecting is for a storage configuration consisting of rack storage.*

*71. The method of claim 70, wherein the interconnecting provides that the maximum ceiling height ranges from thirty feet to forty feet (30 ft.-40 ft.), and the ceiling height is greater than thirty feet (30 ft.).*

*72. The method of claim 22, wherein providing the plurality of control mode sprinklers provides that the K-factor is about 25, and the interconnecting is for a storage configuration consisting of rack storage.*

*73. The method of claim 72, wherein the interconnecting provides that the maximum ceiling height ranges from thirty feet to forty feet (30 ft.-40 ft.), and the ceiling height is greater than thirty feet (30 ft.).*

*74. The method of claim 23, wherein providing the plurality of control mode sprinklers provides that the K-factor is about 25, and the interconnecting is for a storage configuration consisting of rack storage.*

*75. The method of claim 74, wherein the interconnecting provides that the maximum ceiling height ranges from thirty feet to forty feet (30 ft.-40 ft.), and the ceiling height is greater than thirty feet (30 ft.).*

*76. The method of claim 24, wherein providing the plurality of control mode sprinklers provides that the K-factor is about 25, and the interconnecting is for a storage configuration consisting of rack storage.*

*77. The method of claim 76, wherein the interconnecting provides that the maximum ceiling height ranges from thirty feet to forty feet (30 ft.-40 ft.), and the ceiling height is greater than thirty feet (30 ft.).*

*78. The method of claim 25, wherein providing the plurality of control mode sprinklers provides that the K-factor is about 25, and the interconnecting is for a storage configuration consisting of rack storage.*

*79. The method of claim 78, wherein the interconnecting provides that the maximum ceiling height ranges from thirty feet to forty feet (30 ft.-40 ft.), and the ceiling height is greater than thirty feet (30 ft.).*

*80. The method of claim 26, wherein providing the plurality of control mode sprinklers provides that the K-factor is about 25, and the interconnecting is for a storage configuration consisting of rack storage.*

*81. The method of claim 80, wherein the interconnecting provides that the maximum ceiling height ranges from thirty feet to forty feet (30 ft.-40 ft.), and the ceiling height is greater than thirty feet (30 ft.).*

*82. The method of claim 27, wherein providing the plurality of control mode sprinklers provides that the K-factor is about 25, and the interconnecting is for a storage configuration consisting of rack storage.*

*83. The method of claim 28, wherein providing the plurality of control mode sprinklers provides that the K-factor is about 25, and the interconnecting is for a storage configuration consisting of rack storage.*

*84. The method of claim 29, wherein providing the plurality of control mode sprinklers provides that the K-factor is about 25, and the interconnecting is for a storage configuration consisting of rack storage.*

*85. The method of claim 84, wherein the interconnecting provides that the maximum ceiling height ranges from thirty feet to forty feet (30 ft.-40 ft.), and the ceiling height is greater than thirty feet (30 ft.).*

*86. The method of claim 31, wherein providing the plurality of control mode sprinklers provides that the K-factor is about 25, and the interconnecting is for a storage configuration consisting of rack storage.*

*87. The method of claim 32, wherein providing the plurality of control mode sprinklers provides that the K-factor is about 25, and the interconnecting is for a storage configuration consisting of rack storage.*

*88. The method of claim 87, wherein the interconnecting provides that the maximum ceiling height ranges from thirty feet to forty feet (30 ft.-40 ft.), and the ceiling height is greater than thirty feet (30 ft.).*

* * * * *